United States Patent [19]

Nakagawa et al.

[11] Patent Number: 5,341,295
[45] Date of Patent: Aug. 23, 1994

[54] VEHICLE TRANSMISSION SHIFT CONTROL APPARATUS HAVING MEANS FOR SUITABLY DETERMINING COMPENSATING COEFFICIENT USED IN DETERMINING SHIFTING OF THE TRANSMISSION

[75] Inventors: Norihisa Nakagawa, Numazu; Hiroki Matsuoka, Susono, both of Japan

[73] Assignee: Toyota Jidosha Kabushiki Kaisha, Toyota, Japan

[21] Appl. No.: 916,362

[22] Filed: Jul. 21, 1992

[30] Foreign Application Priority Data

| Jul. 23, 1991 | [JP] | Japan | 3-206325 |
| Jul. 23, 1991 | [JP] | Japan | 3-206326 |
| Jul. 23, 1991 | [JP] | Japan | 3-206327 |
| Jul. 23, 1991 | [JP] | Japan | 3-206328 |
| Jul. 23, 1991 | [JP] | Japan | 3-206329 |
| Jul. 31, 1991 | [JP] | Japan | 3-216145 |
| Aug. 2, 1991 | [JP] | Japan | 3-217806 |
| Nov. 8, 1991 | [JP] | Japan | 3-321203 |
| Nov. 8, 1991 | [JP] | Japan | 3-321205 |
| Dec. 25, 1991 | [JP] | Japan | 3-357759 |

[51] Int. Cl.$^5$ .................... G06F 15/50; G06G 7/70
[52] U.S. Cl. .................... 364/424.1; 364/424.02; 477/97; 477/120; 477/902
[58] Field of Search ........... 364/424.1, 426.04, 424.02, 364/431.05, 167.01, 424.07, 424–431; 74/866, 867, 844, 865, 859; 123/97, 90

[56] References Cited

U.S. PATENT DOCUMENTS

| 3,786,792 | 1/1974 | Pelizzoni et al. | 123/97 |
| 4,474,081 | 10/1984 | Kinugasa et al. | 74/844 |
| 4,739,485 | 4/1988 | Hayashi | 364/431.07 |
| 4,742,462 | 5/1988 | Fujimori et al. | 364/431.08 |
| 4,748,567 | 5/1988 | Sumizawa et al. | 364/431.11 |
| 4,841,447 | 6/1989 | Hayashi et al. | 364/431.07 |
| 4,976,239 | 12/1990 | Hosaka | 123/399 |
| 5,101,350 | 3/1992 | Tokoro | 364/424.1 |
| 5,184,293 | 2/1993 | Middleton et al. | 364/167.01 |
| 5,197,325 | 3/1993 | Tamura et al. | 73/117.3 |

FOREIGN PATENT DOCUMENTS 2266155 10/1990 Japan .

Primary Examiner—Thomas G. Black
Assistant Examiner—Jacques H. Louis-Jacques
Attorney, Agent, or Firm—Oblon, Spivak, McClelland, Maier & Neustadt

[57] ABSTRACT

An apparatus automatically shifts a vehicle transmission, according to a shift pattern and on the basis of a detected parameter of the pattern. The shift pattern or the detected parameter is compensated by a compensating coefficient determined from an actual intake air quantity of the engine, and a required intake air quantity calculated from the throttle opening and the engine speed. The apparatus includes an arrangement for adjusting the compensating coefficient so as to prevent busy shifting actions of the transmission upon changing of the throttle opening, or an arrangement for determining the compensating coefficient so as to reflect the driver's desire for accelerating the vehicle, preferably depending upon the vehicle running condition. An arrangement adjusts compensating coefficient so as to reduce an influence of errors in the required and actual intake air quantity, or an influence of chronological change of the engine, or prevent unnecessary shift-up action of the transmission when the air conditioner is on. A further arrangement replaces the calculated compensating coefficient by a lower or upper limit or a standard value if the calculated coefficient is abnormally small or large.

75 Claims, 46 Drawing Sheets

FIG. 4 (a)  FIG. 4 (b)  FIG. 4 (c)
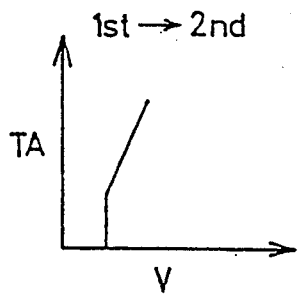
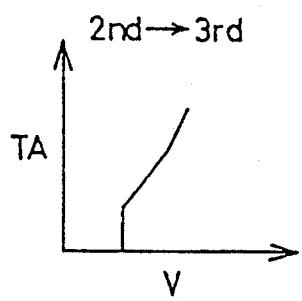
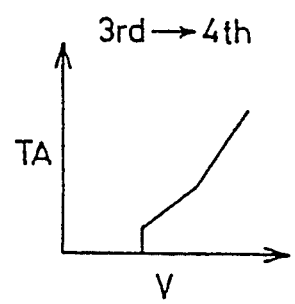
FIG. 5 (a)  FIG. 5 (b)  FIG. 5 (c)
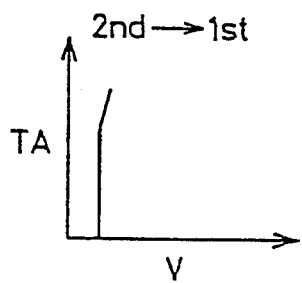
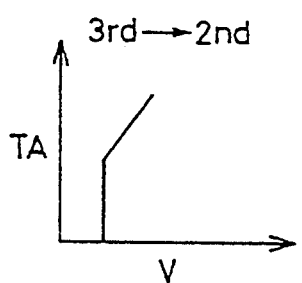
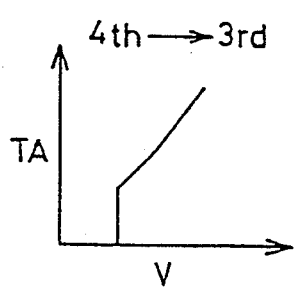

FIG. 6
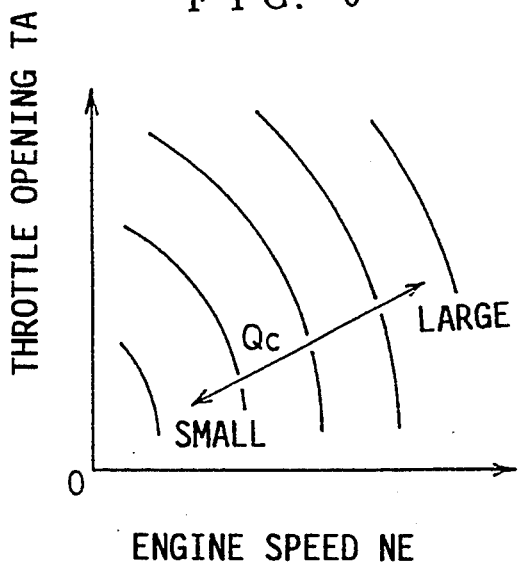
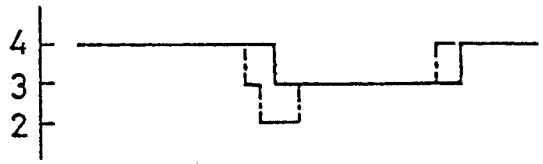
FIG. 7 (a)
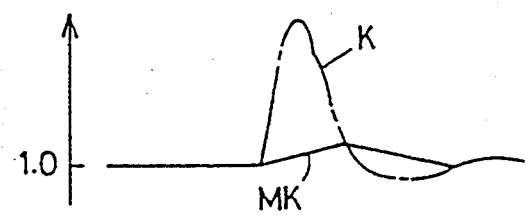
FIG. 7 (b)
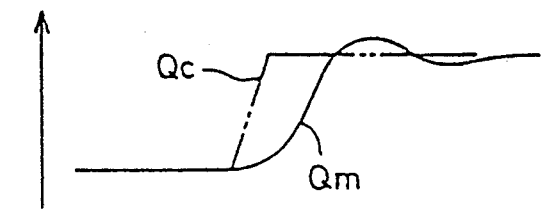
FIG. 7 (c)
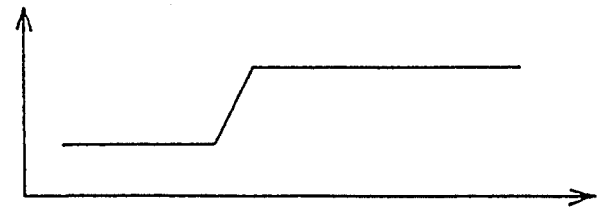
FIG. 7 (d)

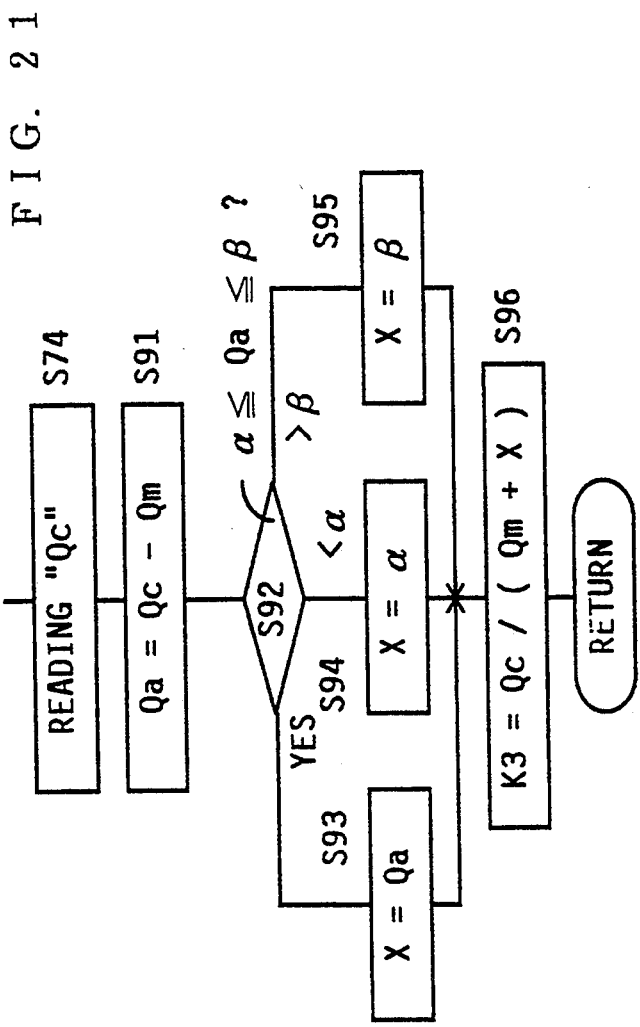

Qm=SMALL

Qm=LARGE

FIG. 27
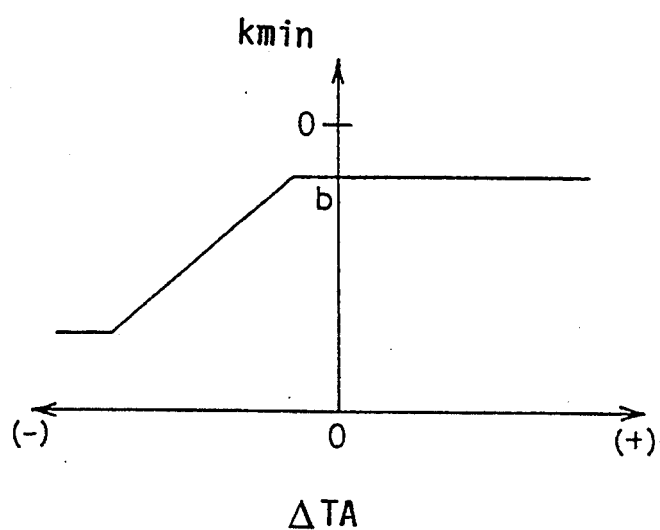
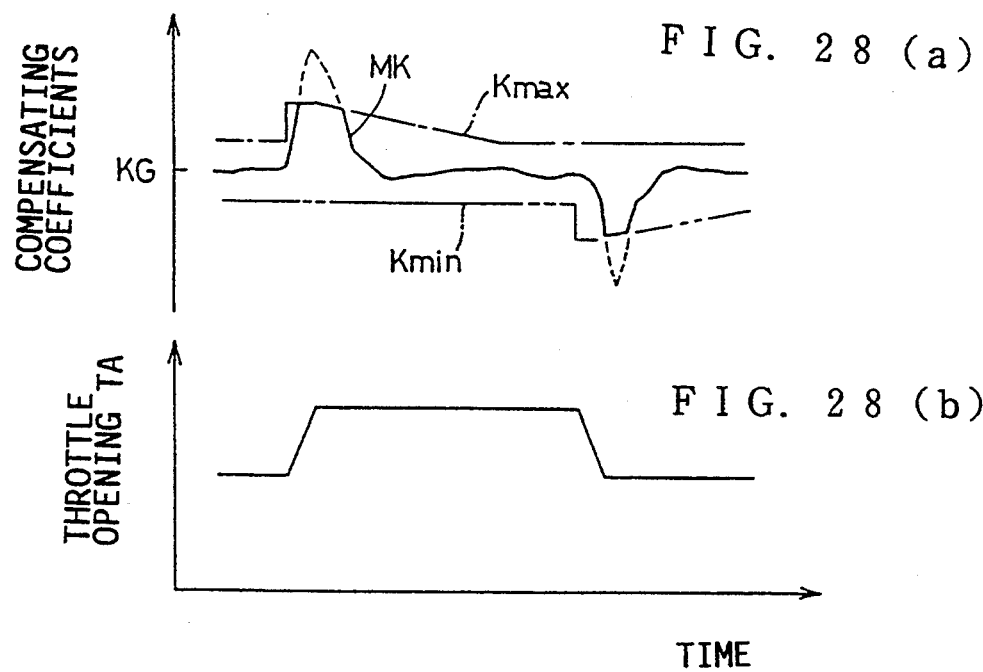
FIG. 28 (a)
FIG. 28 (b)

VEHICLE SPEED

VEHICLE TRANSMISSION SHIFT CONTROL APPARATUS HAVING MEANS FOR SUITABLY DETERMINING COMPENSATING COEFFICIENT USED IN DETERMINING SHIFTING OF THE TRANSMISSION

BACKGROUND OF THE INVENTION

1. Field of the Invention

The present invention relates generally to a shift control apparatus for an automatic transmission of a motor vehicle, and more particularly to an arrangement for suitably determining a compensating coefficient used in determining the need for shifting of the transmission according to a predetermined shift pattern.

2. Discussion of the Prior Art

For controlling an automatic transmission of a motor vehicle, there is commonly used a shift control apparatus which is equipped with shift control means for automatically shifting the automatic transmission according to a predetermined shift pattern and on the basis of actually detected values of operating parameters of the vehicle. The shift pattern represents a relationship of the operating parameters. FIGS. 4(a), 4(b) and 4(c) show examples of shift patterns in the form of shift-up boundary lines used for determining the necessity of shifting up an automatic transmission having four forward drive positions, i.e., 1st-speed position, 2nd-speed position, 3rd-speed position and 4th-speed position. FIGS. 5(a), 5(b) and 5(c) show examples of shift patterns in the form of shift-down boundary lines for determining the necessity of shifting down the transmission. Each shift-up or shift-down boundary line represents a relationship between two operating parameters of the vehicle, that is, between the opening TA of an engine throttle valve and the running speed V of the vehicle. The determination as to whether the transmission is shifted up or down from the current position is effected according to the shift-up and shift-doom boundary lines for the current position, and depending upon the currently detected vehicle speed V and throttle opening TA.

The throttle opening is used as a parameter which represents the currently required output of the engine, or the load currently applied to the engine. In recent motor vehicles, however, the throttle opening does not necessarily represents the currently required engine output with high precision, since the engines of the recent vehicles are equipped with various mechanisms or devices for improving the fuel economy of the vehicle and suitably controlling the output of the engine depending upon the running condition of the vehicles. For instance, there has been proposed an engine equipped with a valve timing changing device for changing the opening and closing timings of the intake and exhaust valves, and/or an idling control valve for adjusting the idling speed of the engine. The throttle opening does not precisely represent the currently required output of the engine, since the actual intake air quantity of the engine varies depending upon the altitude, namely, varies with the atmospheric pressure. In view of these phenomena, there is proposed a shift control apparatus which includes (a) shift control means as described above, (b) detecting means for detecting the engine speed NE of the engine, the throttle opening TA and an intake air quantity Qm of the engine, (c) coefficient calculating means for calculating a currently required intake air quantity Qc of the engine from the detected engine speed NE and throttle opening TA, and calculating a compensating coefficient K by dividing the calculated required intake air quantity Qc by the detected intake air quantity Qm, and (d) compensating means for changing or compensating one of the shift pattern (shift boundary line) and the actually detected values of the operating parameters. An example of such shift control apparatus is disclosed in laid-open publication No. 2-266155 (published in 1990). In this shift control apparatus, the required intake air quantity Qc is obtained according to a predetermined relationship between the engine speed NE and the throttle opening TA, and on the basis of the actually detected values of these parameters NE, TA. Then, the compensating coefficient K=Qc/Qm is calculated by dividing the calculated required intake air quantity Qc by the intake air quantity Qm actually measured by an air flow meter. The actually detected throttle opening TA is then compensated by multiplying the detected value TA by the calculated compensating coefficient. The determination as to whether the transmission is shifted up or down is effected according to the shift pattern, and on the basis of the compensated throttle opening TA, and the vehicle speed V as detected by the detecting means. Alternatively, the determination is effected according to one of shift boundary lines which is selected depending upon the calculated compensating coefficient K. In the latter case, the determination is based on the throttle opening TA and vehicle speed V which are detected by the detecting means.

A study of the present applicants revealed a problem with the known shift control apparatus as described above, which arises upon a sudden or abrupt change in the throttle opening TA as indicated in FIG. 7(d). More specifically, the change in the actual intake air quantity Qm upon such sudden change in the throttle opening TA is delayed with respect to the change in the calculated required intake air quantity Qc, as indicated in two-dot chain line in FIG. 7(c). As a result, the calculated compensating coefficient K which is equal to Qc/Qm suffers from a sudden change, as indicated in one-dot chain line in FIG. 7(b), causing busy shift-down and shift-up actions in a short time following the sudden change in the throttle opening TA, as indicated in one-dot chain line in FIG. 7(a). In the example of FIGS. 7(a)–7(d), the transmission is shifted first from the 4th-speed position to the 3rd-speed position, then to the 2nd-speed position, and is subsequently shifted up to the 3rd-speed position and finally to the 4th-speed position.

The known shift control apparatus also suffers from a problem that the transmission is not shifted down even when the vehicle driver desires to shift down the transmission by depressing the accelerator pedal. In other words, the known shift control apparatus is not arranged so as to reflect the driver's desire to accelerate the vehicle. In this respect, it is noted that the transmission is likely to be shifted down upon depression of the accelerator pedal, since the compensating coefficient K increases due to a delay in the change of the actual intake air quantity Qm with respect to the change of the throttle opening TA, as described above. However, the transmission is shifted up a short time after the shift-down action. This is contrary to the driver's desire to accelerate the vehicle when the driver depresses the accelerator pedal.

In the shift control apparatus wherein the shift pattern or the appropriate operating parameter is compensated by the coefficient K (=Qc/Qm) as described above, some errors are inevitably included in the detected values of the engine speed NE, throttle opening TA and intake air quantity Qm, and in the calculated value of the required intake air quantity Qc obtained from the detected engine speed NE and throttle opening TA. In particular, the errors are unavoidably present in the calculated required intake air quantity Qc and the detected actual intake air quantity Qm, when these values Qc and Qm are relatively low. Even if the amounts of these errors are small, the errors will have a considerable influence on the calculated compensating coefficient K, and the compensation using the compensating coefficient will deteriorate the manner of shifting of the transmission. This is a third problem to be solved by the present invention.

The conventional shift control apparatus also suffers from a problem when an air conditioner is in operation. More specifically, when the air conditioner is driven by the engine, the intake air quantity is increased by a suitable amount corresponding to an amount of power consumption by the air conditioner. This increase in the intake air quantity Qm is effected by the idling control valve which opens an appropriate air by-pass passage which by-passes the throttle valve, so that the idling speed of the engine is increased, irrespective of the opening of the throttle valve. Since the compensating coefficient K (=Qc/Qm) is determined by the actual intake air quantity Qm, the coefficient K decreases when the intake air quantity Qm increases when the idling control valve is activated, namely, when the air conditioner is on. When the vehicle is accelerating, for example, the decrease in the compensating coefficient K results in lowering the shift-up vehicle speed, whereby the transmission is likely to be shifted up at a relatively early point of time. Thus, the activation of the air conditioner lowers accelerating capability or drivability of the vehicle, due to a decrease in the compensating coefficient K caused by the increased intake air quantity Qm.

The conventional shift control apparatus does not have a fail-safe function for suitably controlling the transmission in the even of failure of any of the detectors for sensing the intake air quantity, revolution speed and throttle opening of the engine, which are used to calculate the compensating coefficient K (Qc/Qm). If any of such detectors happened to be defective or fail to normally function, by any chance, the calculated compensating coefficient K would deviate from a normal range, and the shift control means would operate according to the improperly compensated shift pattern or operating parameter, whereby the transmission might exhibit an inadequate shift-up and shift-down behavior, leading to unsatisfactory running performance of the vehicle such as low fuel economy and insufficient accelerating capability.

The conventional shift control apparatus also suffers from a drawback due to chronological deterioration or change of the engine. Described in detail, the output torque characteristics of the engine will change due to an increase in the friction loss and the pumping loss during use. To maintain the nominal engine output torque, the intake air quantity Qm is increased by the idling control valve and valve timing changing device, for example, as the friction and pumping losses increase during use of the engine. Thus, the intake air quantity Qm required to provide the nominal engine torque increases as the service period of the engine increases. On the other hand, a stored data map representative of a predetermined relationship for calculating the required intake air quantity Qc is formulated based on the initial output torque characteristics of the engine. For these reasons, the compensating coefficient K obtained from the detected actual intake air quantity Qm and the calculated required intake air quantity Qc varies with the chronological deterioration or change of the engine.

SUMMARY OF THE INVENTION

It is therefore a first object of the present invention for providing a shift control apparatus for an automatic transmission of a motor vehicle, which apparatus is capable of preventing busy shifting actions of the transmission due to sudden change in the compensating coefficient upon changing of the throttle opening.

A second object of this invention is to provide a shift control apparatus for a vehicle automatic transmission, capable of controlling the transmission so as to reflect the driver's desire to accelerate the vehicle A third object of the invention is to provide a shift control apparatus for a vehicle automatic transmission, capable of controlling the transmission without influenced by the errors inevitably included in the calculated required intake air quantity (Qc) and in the detected actual intake air quantity (Qm).

It is a fourth object of the invention to provide a shift control apparatus for a vehicle automatic transmission, capable of preventing an undesirable shift-up action of the transmission which takes place due to an increase in the intake air quantity when the air conditioner is in operation.

It is a fifth object of the instant invention to provide a shift control apparatus for a vehicle automatic transmission, which has a fail-safe function for suitably controlling the transmission in the event of any trouble that adversely affects the compensating coefficient.

A sixth object of the invention is to provide a shift control apparatus for a vehicle automatic transmission, capable of suitably controlling the transmission, using a first compensating value which is a ratio of the calculated required intake air quantity to the detected actual intake air quantity, and a second compensating value which reflects the vehicle driver's desire for accelerating the vehicle.

A seventh object of this invention is to provide a shift control apparatus for a vehicle automatic transmission, capable of suitably controlling the transmission, irrespective of the chronological change of the engine output characteristics.

The first object indicated above may be achieved according to a first aspect of this invention, which provides a shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of the operating parameters, (b) detecting means for detecting a speed (NE) of the engine, an opening (TA) of the throttle valve and an intake air quantity (Qm) of the engine, (c) coefficient calculating means for calculating a required intake air quantity (Qc) of the engine from the detected speed of the engine and the detected opening of the throttle valve, and calculating a compensating coefficient (K) by dividing the calculated required intake air quantity by the detected intake air quantity, and (d)

compensating means for compensating one of the shift pattern (Vu, Vd) and at least one of the actually detected values of the operating parameters (TA, V), depending upon the compensating coefficient, the present shift control apparatus being characterized by comprising: judging means for determining whether or not the compensating coefficient (K) has changed; and adjusting means for adjusting the compensating coefficient by a predetermined amount, each time the judging means determines that the compensating coefficient has changed, whereby an adjusted compensating coefficient (MK) is obtained so that the compensating means operates according to the adjusted compensating coefficient.

In the shift control apparatus constructed as described above according to the first aspect of the present invention, the compensating coefficient (K) is calculated from the calculated required intake air quantity (Qc) and the detected intake air quantity (Qm), by the coefficient calculating means. The shift pattern (Vu, Vd) or at least one of the detected values of the operating parameters (TA, V) is compensated according to the calculated compensating coefficient, by the compensating means. Accordingly, the shift control apparatus is capable of automatically shifting the transmission in a suitable manner, without being influenced by the operating conditions of the valve timing changing device and the idling control valve, or by the varying atmospheric pressure under which the engine is operating. Further, the compensating coefficient (K) is adjusted by a predetermined amount by the adjusting means each time the judging means determines that the coefficient (K) has changed, due to acceleration or deceleration of the vehicle, for example. In other words, an adjusted compensating coefficient (MK) is obtained so that the shift control means operates according to the adjusted compensating coefficient. This adjusted compensating coefficient is updated depending upon the change in the calculated compensating coefficient. This adjusted compensating coefficient will not suddenly change due to a delayed change in the actual intake air quantity (Qm) upon changing of the throttle opening (TA), whereby the transmission is effectively protected from frequent shift-down and shift-up actions.

In the case where the judging means is adapted to detect a change in the compensating coefficient, irrespective of the cause for the change, the compensating coefficient is adjusted by the adjusting means even if the compensating coefficient has changed due to a change in the operating state of the valve timing changing device or idling control valve. Since this adjustment of the compensating coefficient is effected only while the compensating coefficient is changing, the adjustment will not prevent suitable shifting of the transmission in response to the operating states of the valve timing changing device and idling control valve. In this respect, it is desirable that the judging means be adapted to detect a change in the calculated compensating coefficient (K), which change arises solely from the delayed change in the actual intake air quantity (Qm) upon changing of the throttle opening (TA). For instance, this change may be detected, based on whether the vehicle is being accelerated or decelerated. In this arrangement, the compensating coefficient (K) Is adjusted only when the change in the actual intake air quantity is delayed with respect to a change in the throttle opening. It is noted that the change in the calculated compensating coefficient due to the delayed change in the actual intake air quantity (Qm) may be distinguished from that due to a change in the operating state of the valve timing changing device or idling control valve, by monitoring the amount of change or rate of change of the calculated compensating coefficient, against a predetermined lower limit.

The first object may also be achieved according to a second aspect of this invention, which provides a shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of the operating parameters, (b) detecting means for detecting a speed (NE) of the engine, an opening (TA) of the throttle valve and an intake air quantity (Qm) of the engine, (c) coefficient calculating means for calculated a required intake air quantity (Qc) of the engine from the detected speed of the engine and the detected opening of the throttle valve, and calculating a compensating coefficient (K) by dividing the calculating required intake air quantity by the detected intake air quantity, and (d) compensating means for compensating one of the shift pattern and at least one of the actually detected values of the operating parameters, depending upon the compensating coefficient, the present shift control apparatus being characterized by comprising: judging means for determining whether or not the compensating coefficient (K) is larger than a predetermined maximum value (Kmax), and determining whether or not the compensating coefficient is smaller than a predetermined minimum value (Kmin); and adjusting means for adjusting the compensating coefficient to obtain an adjusted compensating coefficient (MK), such that the maximum value (Kmax) is set as the adjusted compensating coefficient if the judging means determines that the compensating coefficient (K) is larger than the maximum value, and such that the minimum value (Kmin) is set as the adjusted compensating coefficient if the judging means determines that the compensating coefficient is smaller than the minimum value. The compensating means operates according to said adjusted compensating coefficient (MK).

In the shift control apparatus constructed as described above according to the second aspect of this invention, the compensating coefficient (K) is calculated from the calculated required intake air quantity (Qc) and the detected intake air quantity (Qm), by the coefficient calculating means. The shift pattern (Vu, Vd) or at least one of the detected values of the operating parameters (TA, V) is compensated according to the calculated compensating coefficient, by the compensating means. Accordingly, the shift control apparatus is capable of automatically shifting the transmission in a suitable manner, without being influenced by the operating conditions of the valve timing changing device and the idling control valve, or by the varying atmospheric pressure under which the engine is operating. Further, when the determining means determines that the calculated compensating coefficient is larger than the predetermined maximum value (Kmax) or smaller than the predetermined minimum value (Kmin), the adjusting means uses the maximum or minimum value as the adjusted compensating coefficient (MK). Accordingly, the adjusted compensating coefficient (MK) will not considerably change due to a delayed change in the actual intake air quantity (Qm) upon changing of the throttle opening (TA), whereby the transmission is effectively protected from the conventionally experienced frequent or busy shift-down and shift-up actions.

The first object may also be achieved according to a third aspect of this invention, which provides a shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of the operating parameters, (b) detecting means for detecting a speed (NE) of the engine, an opening (TA) of the throttle valve and an intake air quantity (Qm) of the engine, (c) coefficient calculating means for calculated a required intake air quantity (Qc) of the engine from the detected speed of the engine and the detected opening of the throttle valve, and calculating a compensating coefficient (K) by dividing the calculating required intake air quantity by the detected intake air quantity, and (d) compensating means for compensating one of the shift pattern and at least one of the actually detected values of the operating parameters, depending upon the compensating coefficient, the present shift control apparatus being characterized by comprising: judging means for determining whether or not the compensating coefficient (K) has changed; and adjusting means for adjusting the compensating coefficient to obtain an adjusted compensating coefficient (MK) such that an amount of compensation ($|K-KG|$) of the compensating coefficient decreases at a predetermined rate (A), when the judging means determines that the compensating coefficient has changed. The compensating means operates according to the adjusted compensating coefficient.

In the shift control apparatus constructed as described above according to the third aspect of the present invention, the compensating coefficient (K) is calculated from the calculated required intake air quantity (Qc) and the detected intake air quantity (Qm), by the coefficient calculating means. The shift pattern (Vu, Vd) or at least one of the detected values of the operating parameters (TA, V) is compensated according to the calculated compensating coefficient, by the compensating means. Accordingly, the shift control apparatus is capable of automatically shifting the transmission in a suitable manner, without being influenced by the operating conditions of the valve timing changing device and the idling control valve, or by the varying atmospheric pressure under which the engine is operating. Further, the amount of compensation ($|K-KG|$) of the compensating coefficient (K) is decreased at a predetermined rate by the adjusting means when the judging means determines that the coefficient (K) has changed, due to acceleration or deceleration of the vehicle, for example. In other words, an adjusted compensating coefficient (MK) is obtained so that the shift control means operates according to the adjusted compensating coefficient. This adjusted compensating coefficient will not suddenly change due to a delayed change in the actual intake air quantity (Qm) upon changing of the throttle opening (TA), whereby the transmission is effectively protected from frequent shift-down and shift-up actions.

As in the shift control apparatus according to the first aspect of the invention, it is desirable that the judging means be adapted to detect a change in the calculated compensating coefficient (K), which change arises solely from the delayed change in the actual intake air quantity (Qm) upon changing of the throttle opening (TA). For instance, this change may be detected, based on whether the vehicle is in the accelerating state or in the decelerating state, so that the compensating coefficient (K) Is adjusted only when the change in the actual intake air quantity is delayed with respect to a change in the throttle opening.

The second object described above may be achieved according to a fourth aspect of the present invention, which provides a shift control apparatus for an automatic transmission of a motor vehicle with an engine, having shift control means for automatically shifting the automatic transmission according to a predetermined shift pattern representing a relationship of operating parameters of the vehicle, and on the basis of actually detected values of the operating parameters, the shift control apparatus comprising: coefficient calculating means for calculating a compensating coefficient (K1+K2; K) depending upon an extent to which a driver of the vehicle desires to accelerate the vehicle; and compensating means for compensating one of the shift pattern (Vu, Vd) and at least one of the actually detected values of the operating parameters (TA, V), depending upon the compensating coefficient, so that the shift control means is more likely to command the transmission to be shifted down.

In the shift control apparatus constructed as described above according to the fourth aspect of this invention, the compensating coefficient (K1+K2; K) is calculated according to the extent to which the vehicle driver desires to accelerate the vehicle, and the shift pattern (Vu, Vd) or at least one of the actually detected values of the operating parameters (TA, V) is compensated, depending upon the calculated compensating coefficient, so that the shift control means is more likely to command the transmission to be shifted down. In other words, the shift pattern or at least one operating parameter used for determining the necessity of a shifting action of the transmission is compensated so as to reflect the driver's desire for accelerating the vehicle, whereby the transmission tends to be shifted down depending upon the degree of the driver's desire for the vehicle acceleration. Thus, the present shift control apparatus is capable of suitably controlling the automatic transmission, assuring excellent drivability of the vehicle with a better response to the driver's intention to accelerate the vehicle.

The driver's desire to accelerate the vehicle is represented, for example, by an amount of change per unit time of the throttle opening or the accelerator pedal depression. When the accelerator pedal has been depressed to a desired position, the amount of change per unit time of the throttle opening is almost zeroed, and the compensating coefficient is accordingly almost zeroed. However, the driver's desire to accelerate the vehicle is considered to remain even after the accelerator pedal has been depressed to the desired position, namely, even while the accelerator pedal is held in the desired position. According to this recognition, it is preferable to adapt the coefficient compensating means so that the compensating coefficient is determined such that the compensating coefficient gradually or smoothly decreases, or alternatively the compensating coefficient at the time of depression of the accelerator pedal is maintained, even after the accelerator pedal has been operated to the desired position. Since the compensating coefficient can be suitably determined with ease by means of data processing depending upon the appropriate parameter such as the amount of change per unit time of the accelerator pedal depression or throttle opening, the automatic transmission can be suitably controlled so as to accurately reflect the driver's desire to accelerate the vehicle.

The second object may also be achieved according to a fifth aspect of this invention, which provides a shift control apparatus for an automatic transmission of a motor vehicle with an engine, having shift control means for automatically shifting the automatic transmission according to a predetermined shift pattern representing a relationship of operating parameters of the vehicle, and on the basis of actually detected values of the operating parameters, the shift control apparatus being characterized by comprising: (a) coefficient calculating means for calculating a compensating coefficient (Kshift+KSFTA) which consists of at least a compensating value (KSFTA) which changes depending upon an extent to which a driver of the vehicle desires to accelerate the vehicle, the compensating value (KSFTA) being decremented by a predetermined decrement amount ($\alpha$) after the extent has become smaller than a predetermined level; (b) adjusting means for changing at least one of the compensating value (KSFTA) and the predetermined decrement amount ($\alpha$), depending upon a running condition of the vehicle; and (c) compensating means for compensating one of the shift pattern (Vu, Vd) and at least one of the actually detected values of the operating parameters, depending upon the compensating coefficient (Kshift+KSFTA), so that the shift control means is more likely to command the transmission to be shifted down.

In the shift control apparatus constructed as described above according to the fifth aspect of this invention, the compensating coefficient calculated by the coefficient calculating means consists of at least the compensating value (KSFTA) which changes depending upon the extent to which the vehicle driver desires to accelerate the vehicle. The compensating value (KSFTA) is decremented by a predetermined decrement amount ($\alpha$) after the degree of the driver's desire for the vehicle acceleration has become smaller than a predetermined level, for example, after the amount of change in the throttle opening (TA) has been substantially zeroed. The compensating means operates to compensate the shift pattern or the operating parameter or parameters, depending upon the calculated compensating coefficient including the compensating value which is determined by the vehicle driver's desire for acceleration of the vehicle. Accordingly, the transmission tends to be shifted down under the control of the shift control means which operates based on the compensated shift pattern or operating parameter. Thus, the driver's desire for the vehicle acceleration is reflected in the determination of a shifting action of the transmission. Further, the adjusting means operates to change at least one of the compensating value (KSFTA) and the predetermined decrement amount ($\alpha$), depending upon a running condition of the vehicle. For example, the adjusting means decreases the compensating value and/or decrement amount with an increase in the current speed reduction ratio of the transmission or with a decrease in the vehicle speed (V). Alternatively, the adjusting means decreases the compensating value and/or decrement amount, when the vehicle is coasting with the engine in the idling state or engine braking state, or when the vehicle is decelerated with brake being applied. In such running condition of the vehicle, it is desirable to restrict a shift-up action of the transmission. To this end, the compensating value (KSFTA) per se and/or the decrement amount ($\alpha$) is/are increased when the transmission is placed in a relatively low gear position, or when the vehicle is running at a low speed, for instance, coasting with the engine in the idling state with or without the brake pedal being depressed. When the vehicle is running at a relatively high speed with the transmission placed in a relatively high gear position, on the other hand, the compensating value and/or decrement value is/are made relatively small, so as not to restrict a shift-up action of the transmission, namely, to permit the shift-up action as needed for assuring quiet running of the vehicle. Thus, the present shift control apparatus is capable of intricately controlling the transmission so as to reflect the driver's desire to accelerate the vehicle, and depending upon the running condition (acceleration, deceleration, braking, engine idling, etc.) of the vehicle.

The third object indicated above may be achieved according to a sixth aspect of this invention, which provides a shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of the operating parameters, (b) detecting means for detecting a speed (NE) of the engine, an opening (TA) of the throttle valve and an intake air quantity (Qm) of the engine, (c) coefficient calculating means for calculating a required intake air quantity (Qc) of the engine from the detected speed of the engine and the detected opening of the throttle valve, and calculating a nominal compensating coefficient (K1) by dividing the calculated required intake air quantity by the detected intake air quantity, and (d) compensating means for compensating one of the shift pattern (MVu, MVd) and at least one of the actually detected values of the operating parameters (TA, V), depending upon the compensating coefficient, the present shift control apparatus being characterized by comprising adjusting means for adjusting the nominal compensating coefficient (K1) to obtain an adjusted compensating coefficient (MK, K3) depending upon the detected intake air quantity such that, an amount of adjustment of the nominal compensating coefficient is smaller when the detected intake air quantity (Qm) is relatively small than when the detected intake air quantity is relatively large. The compensating means operates according to the adjusted compensating coefficient (MK, K3).

In the shift control apparatus constructed as described above according to the sixth aspect of this invention, the nominal compensating coefficient is compensated to obtain the adjusted compensating coefficient such that an amount of adjustment of the nominal compensated coefficient is relatively smaller when the detected actual intake air quantity or calculated required intake air quantity is small than when the detected intake air quantity is large. When the detected intake air quantity is large, the errors inevitably included in the calculated and detected intake air quantities will have a relatively small influence on the nominal compensating coefficient. In this case, the compensating means operates according to the adjusted compensating coefficient which is, relatively largely influenced by the nominal compensating coefficient whereby the shift control means suitably controls the transmission, irrespective of the operating states of the idling control valve and valve timing changing device, and the variation in the atmospheric pressure. When the detected intake air quantity is relatively small, the errors included in the calculated and detected intake air quantities will have a relatively large influence on the nominal compensating coefficient. In this case, the compensating means operates according to the adjusted compensating coefficient which is less influenced by the nominal compensating coefficient, so as to reduce the influence of the errors on the shifting of the transmission.

For example, the adjusting means compensates the nominal compensating coefficient depending upon the actual intake air quantity detected by the detecting means or the required intake air quantity calculated by the coefficient calculating means. However, the other parameters, such as a difference between the calculated and detected intake air quantities, may be used by the adjusting means for compensating the nominal compensating coefficient, namely, for obtaining the adjusted compensating coefficient based on the compensated nominal compensating coefficient, provided that the amount of adjustment of the nominal compensating coefficient is smaller when the detected intake air quantity is relatively small than when the detected intake air quantity is relatively large.

The fourth object indicated above may be achieved according to a seventh aspect of this invention, which provides a shift control apparatus for an automatic transmission of a motor vehicle having an engine with a throttle valve, and an air conditioner, the apparatus including (a) shift control means for automatically shifting the automatic transmission according to a predetermined shift pattern representing a relationship of operating parameters of the vehicle, and on the basis of actually detected values of the operating parameters, (b) detecting means for detecting a speed (NE) of the engine, an opening (TA) of the throttle valve and an intake air quantity (Qm) of the engine, (c) coefficient calculating means for calculating a required intake air quantity (Qc) of the engine from the detected speed of the engine and the detected opening of the throttle valve, and calculating a compensating coefficient (K1) by dividing the calculated required intake air quantity by the detected intake air quantity, and (d) compensating means for compensating one of the shift pattern (MVu, MVd) and at least one of the actually detected values of the operating parameters (TA, V), depending upon the compensating coefficient, the apparatus being characterized by comprising: (e) judging means for determining whether or not the air conditioner is in operation; and (f) adjusting means for adjusting the compensating coefficient (K) so that the shift control means is less likely to command the automatic transmission to be shifted up, when the judging means determines that the air conditioner is in operation. The compensating means operates according to the compensating coefficient (K) adjusted by the adjusting means.

In the shift control apparatus constructed as described above according to the seventh aspect of the present invention, the compensating coefficient (K) is calculated from the calculated required intake air quantity (Qc) and the detected intake air quantity (Qm), and the shift pattern (Vu, Vd) or the operating parameter or parameters is/are compensated depending upon the calculated compensating coefficient, so that the transmission is suitably controlled irrespective of the operating states of the valve timing changing device and idling control valve and the varying atmospheric pressure. Further, when the air conditioner is in operation, namely, when the idling control valve is activated to increase the actual intake air quantity (Qm) so as to increase the idling speed of the engine, the calculated compensating coefficient (K) is adjusted by the adjusting means, so that the shift control means which operates according to the adjusted compensating coefficient is less likely to command the automatic transmission to be shifted down when the air conditioner is on. More specifically, the calculated compensating coefficient (K) is increased when the air condition is on, since the coefficient is equal to the ratio (Qc/Qm) of the calculated intake air quantity to the detected intake air quantity (Qm). Consequently, the present shift control apparatus is capable of preventing an unnecessary shift-up action of the transmission, assuring sufficient acceleration of the vehicle even when the air conditioner is on. The principle of this aspect of the invention is also applicable where the compensating coefficient (K) is obtained as the ration (Qm/Qc) of the detected intake air quantity to the calculated intake air quantity. In this case, the calculated compensating coefficient (K) is decreased when the air conditioner is on.

The fifth object indicated above can be attained according to the eighth aspect of this invention, which provides a shift control apparatus for an automatic transmission of a motor vehicle having an engine with a throttle valve, and an air conditioner, the apparatus including (a) shift control means for automatically shifting the automatic transmission according to a predetermined shift pattern representing a relationship of operating parameters of the vehicle, and on the basis of actually detected values of the operating parameters, (b) detecting means for detecting a speed (NE) of the engine, an opening (TA) of the throttle valve and an intake air quantity (Qm) of the engine, (c) coefficient calculating means for calculating a required intake air quantity (Qc) of the engine from the detected speed of the engine and the detected opening of the throttle valve, and calculating a compensating coefficient (K) by dividing the calculated required intake air quantity by the detected intake air quantity, and (d) compensating means for compensating one of the shift pattern (MVu, MVd) and at least one of the actually detected values of the operating parameters (TA, V), depending upon the compensating coefficient, the apparatus being characterized by comprising: judging means for determining whether or not the compensating coefficient (K) calculated by the coefficient calculating means is outside a predetermined range; and coefficient changing means for replacing the compensating coefficient by a reference value (KG) when the judging means determines that the compensating coefficient is outside the predetermined range. The compensating means operates according to the reference value when the compensating coefficient is outside the predetermined range.

In the shift control apparatus constructed as described above according to the eighth aspect of the present invention, the compensating coefficient (K) is calculated from the calculated and detected intake air quantities Qc, Qm by the coefficient calculating means, and the shift pattern or the operating parameter or parameters is/are compensated depending upon the calculated compensating coefficient, whereby the transmission is controlled irrespective of the operating states of the idling control valve and valve timing changing device and the variation in the atmospheric pressure. Further, the compensating coefficient calculated by the coefficient calculating means is replaced by a suitably determined reference value (KG) if the judging means determines that the calculated compensating coefficient is outside the predetermined range, due to any trouble with the air flow meter and/or other sensors associated with the calculation of the compensating coefficient. Consequently, the transmission is prevented from being controlled according to the abnormal compensating coefficient, namely, the transmission can be suitably controlled, without deterioration of the fuel economy and/or accelerating capability of the vehicle, even in the event of failure or defect associated with the control arrangement for obtaining the compensating coefficient (K). The reference value (KG) is preferably an average value of the compensating coefficient (K) which is expected during the normal running of the vehicle without activation of the idling control valve and the air conditioner.

The sixth object indicated above may be achieved according to the ninth aspect of the instant invention, which provides a shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of the operating parameters, (b) detecting means for detecting a speed (NE) of the engine, an opening (TA) of the throttle valve and an intake air quantity (Qm) of the engine, and (c) calculating means for calculating a required intake air quantity (Qc) of the engine from the detected speed of the engine and the detected opening of the throttle valve, the apparatus comprising: first determining means for determining a first compensating value (Kshift) on the basis of a ratio (Qc/Qm) of the calculated required intake air quantity (Qc) to the detected intake air quantity (Qm); second determining means for determining a second compensating value (KSFTA) depending upon an extent to which a driver of the vehicle desires to accelerate the vehicle; coefficient determining means for determining a compensating coefficient (KSFb) on the basis of the first and second compensating values (Kshift, KSFTA); compensating means for compensating one of the shift pattern (Vu, Vd) and at least one of the actually detected values of the operating parameters (TA, V), depending upon the compensating coefficient (KSFb); judging means for determining whether the compensating coefficient (KSFb) is larger than a predetermined upper limit ($\beta$) which is a permissible maximum value of the compensating coefficient for causing the shift control means to be likely to command the transmission to be shifted down; and coefficient changing means for replacing the compensating coefficient (KSFb) by the upper limit ($\beta$) when the judging means determines that the compensating coefficient is larger than the predetermined upper limit. The compensating means operates according to the upper limit when the compensating coefficient is larger than the predetermined upper limit.

In the shift control apparatus constructed as described above according to the ninth aspect of the invention, the first compensating value (Kshift) is determined on the basis of the calculated required intake air quantity and the detected actual intake air quantity, while the second compensating value is determined depending upon the degree of the driver's desire for accelerating the vehicle. The coefficient determining means determines the compensating coefficient (KSFb) on the basis of these first and second compensating values, so that the compensating means compensates the predetermined shift pattern or at least one of the detected parameters used to determine the necessity of a shifting action of the vehicle. Thus, the shifting of the transmission is controlled according to a change in the actual intake air quantity (Qm) and so as to reflect the driver's desire to accelerate the vehicle. If the judging means determines that the determined compensating coefficient (KSFb) is larger than the predetermined upper limit ($\beta$), the coefficient changing means replaces the determined compensating coefficient by the upper limit, so that the compensating means uses this upper limit. This arrangement prevents the use of an excessively large value of the compensating coefficient, which causes the transmission to be excessively likely to be shifted down and does not permit the transmission to be shifted up as needed. Thus, the present shift control apparatus assures adequate shifting of the transmission as to reflect the driver's acceleration desire, without deteriorating the driving comfort and fuel economy of the vehicle.

The seventh object indicated above may be accomplished according to a tenth aspect of this invention, which provides a shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of the operating parameters, (b) detecting means for detecting a speed (NE) of the engine, an opening (TA) of the throttle valve and an intake air quantity (Qm, Qm') of the engine, (c) coefficient calculating means for calculated a required intake air quantity (QNTA) of the engine from the detected speed of the engine and the detected opening of the throttle valve, and calculating a compensating coefficient (Kshift) by dividing the calculating required intake air quantity by the detected intake air quantity, and (d) compensating means for compensating one of the shift pattern (Vu, Vd) and at least one of the actually detected values of the operating parameters (TA, V), depending upon the compensating coefficient, the shift control apparatus being characterized by comprising: judging means for determining whether or not the engine is in a predetermined operating condition; quantity change determining means, operable when the judging means determines that the engine is in the predetermined operating condition, for determining an amount of change ($\Delta$QNIDL) in the intake air quantity (Qm, Qm') detected by the detecting means, which amount change occurs due to a chronological change of the engine from an initial state of the engine; and adjusting means for adjusting the compensating coefficient (Kshift) depending upon the amount of change ($\Delta$QNIDL) in the intake air quantity.

In the shift control apparatus constructed as described above according to the tenth aspect of this invention, the amount of change ($\Delta$QNIDL) in the detected intake air quantity (Qm, Qm') which occurs due to a chronological change of the engine from the initial state is determined when the judging means determines that the engine in the predetermined operating condition, for example, in a predetermined non-load idling condition. The adjusting means adjusts the compensating coefficient (Kshift) calculated by the coefficient calculating means, depending upon the determined amount of change in the detected intake air quantity. The present shift control apparatus is thus capable of suitably controlling the transmission, irrespective of a variation in the output torque characteristics of the engine due to its chronological change such as an increase in the friction loss.

BRIEF DESCRIPTION OF THE DRAWINGS

The above and other objects, features and advantages of the present invention will be better understood by reading the following detailed description of presently preferred embodiments of this invention, when considered in connection with the accompanying drawings, in which:

FIGS. 4(a), 4(b) and 4(c) are views showing examples of shift-up boundary lines used in the shift control routine of FIG. 2;

FIGS. 5(a), 5(b) and 5(c) are views showing examples of shift-down boundary lines also used in the routine of FIG. 2;

FIG. 6 is a view depicting a data map representative of a relationship used in step S24 of the routine of FIG. 3, for obtaining a required intake air quantity Qc from an engine speed NE and a throttle opening TA;

FIGS. 7(a), 7(b), 7(c) and 7(d) are timing chart graphs indicating changes in the selected operating position of the transmission, compensating coefficient K and required intake air quantity Qc, upon an abrupt increase in the throttle opening TA;

FIG. 21 is a flow chart illustrating a routine for calculating a compensating coefficient K2 used in place of the adjusted compensating coefficient MK used in steps S6 and S11 of the shift control routine of FIG. 2, according to a seventh embodiment of the invention;

FIG. 27 is a graph showing a data map used in step S116 of the routine of FIG. 24, which represents a relationship for calculating a standard minimum value kmin from the amount of change ΔTA;

FIGS. 28(a) and 28(b) are timing chart graphs indicating changes in the adjusted compensating coefficient MK, throttle opening TA, etc., in the eighth embodiment of FIG. 23;

FIGS. 40(a), 40(b), 40(c), 40(d) and 40(e) are timing chart graphs showing changes in the selected position of the transmission, compensating coefficient KSF, first and second compensating values Kshift and KSFTA and throttle opening TA, when the vehicle is running on a highland or plateau;

DETAILED DESCRIPTION OF THE PREFERRED EMBODIMENTS

Figure 1:
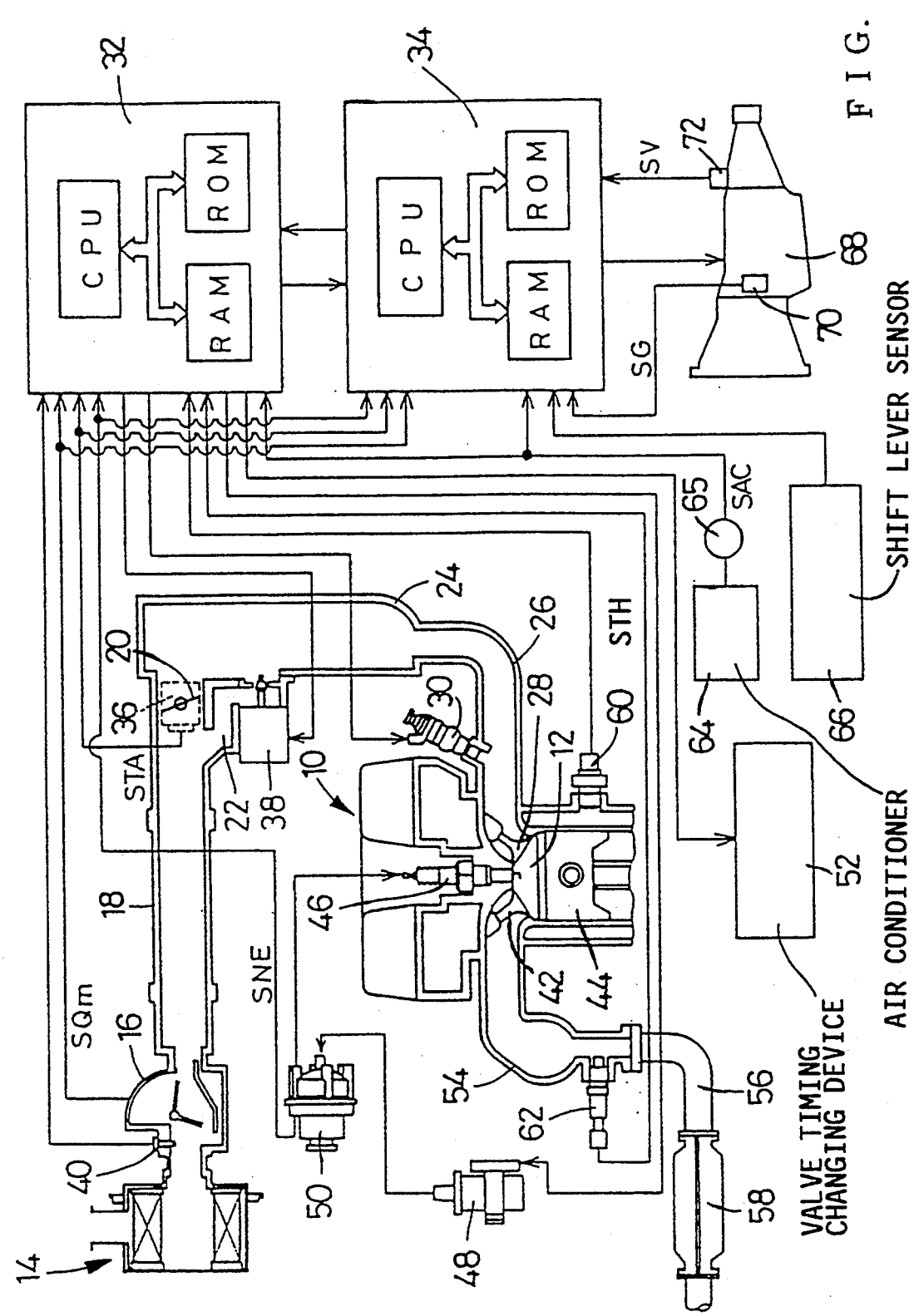
FIG. 1 is a schematic view showing an engine assembly and an automatic transmission of a motor vehicle, and a control system for controlling the engine and the transmission, which control system incorporates one embodiment of a shift control apparatus of the present invention.

Referring first to FIG. 1, the engine assembly of a motor vehicle includes a gasoline engine 10 having a plurality of combustion chambers 12. In the figure, only one combustion cheer 12 is shown. Air is introduced into each combustion cheer 12 through an air cleaner 14, an air flow meter 16, an intake pipe 18, a throttle valve 20, a by-pass passage 22, a surge tank 24, an intake manifold and an intake valve 28. A fuel is injected by a fuel injector valve 30, into a stream of air flowing through the intake manifold 26 to which the fuel injector valve 30 is attached. Thus, an air-fuel mixture is supplied into the combustion cheer 12.

The air flow meter 16 is a movable vane type meter, which functions as means for sensing an actual intake air quantity Qm. More specifically, the air flow meter 16 produces an INTAKE AIR QUANTITY signal SQm representative of the actual intake air quantity Qm which flows through the intake pipe 18. The signal SQm is applied to an engine control computer 32 and a transmission control computer 34, which control the engine 10 and an automatic transmission 68, respectively.

The throttle valve 20 is mechanically linked with an accelerator pedal of the vehicle, as well known in the art, so that the angle of opening TA of the throttle valve 20 changes with the amount of operation of the accelerator pedal, for continuously changing the intake air quantity of the engine 10. The throttle valve 20 is provided with a throttle sensor 36, which produces a THROTTLE OPENING signal STA representative of the opening TA of the valve 20. The signal STA is also fed to the engine and transmission control computers 32, 34.

The by-pass passage 22 is formed in parallel with the throttle valve 20, for permitting a part of the air in the intake pipe 18 to by-pass the throttle valve 20. The passage 22 is provided with an idling control valve 38 whose opening is controlled by the engine control computer 32, to regulate the amount of the air which flows through the by-pass passage 22 or which by-passes the throttle valve 20, whereby the idling speed of the engine 10 is adjusted. In particular, the idling control valve 38 is activated to increase the intake air quantity Qm when an air conditioner 64 is turned on. The fuel injector valve 30 is also controlled by the engine control computer 32, so that the fuel injection timing and the amount of the fuel injected by the injector valve 30 are suitably controlled. An air temperature sensor 40 is disposed upstream of the air flow meter 16, for sensing the temperature of the air which is admitted into the intake pipe 18. An output signal of this temperature sensor 40 representative of the air temperature is fed to the engine control computer 32.

For each combustion chamber 12, the engine 10 has the intake valve 28, an exhaust valve 42, a piston 44 and a spark plug 46. The spark plug 46 is activated to provide an ignition spark in the combustion chamber 12, by application of a high voltage supplied thereto through a distributor 50 from an ignitor 48 controlled by the engine control computer 32. As a result, the air-fuel mixture in the combustion chamber 12 is ignited by the ignition spark to effect a combustion and expansion stroke, causing the piston 44 to be reciprocated, whereby the crankshaft of the engine 10 is rotated, as well known in the art.

The intake and exhaust valves 28, 42 are opened and closed by rotation of the camshaft in synchronization with the crankshaft. A mechanism connecting the crankshaft and the camshaft is linked with a valve timing changing device 52, which is controlled by the engine control computer 32, so that the relative rotating phase of the crankshaft and camshaft is changed to adjust the timings at which the intake and exhaust valves 28, 42 are opened and closed. An exhaust gas produced as a result of combustion of the air-fuel mixture in the combustion chamber 12 is discharged into the atmosphere, through the exhaust valve 42, an exhaust manifold, an exhaust pipe 56 and a catalytic converter 58.

The engine 10 is provided with a water temperature sensor 60 for sensing the temperature of an engine coolant. The sensor 60 produces a WATER TEMP. signal STH representative of the coolant temperature, which is applied to the engine control computer 32. The exhaust manifold 54 is provided with an oxygen sensor 62 for detecting an oxygen concentration of the exhaust gas. An output signal of the sensor 62 representative of the oxygen concentration is also applied to the engine control computer 32. The distributor 50 is provided with a speed sensor which generates a pulse signal in synchronization with the rotation of the crankshaft. This pulse signal SNE (hereinafter referred to as ENGINE SPEED signal SNE), which represents a speed NE of the engine 10, is applied to the engine control computer 32 and also to the transmission control computer 34.

Each of the engine and transmission control computers 32, 34 has a central processing unit (CPU), a random-access memory (RAM), a read-only memory (ROM), an input/output interface circuit, an analog/digital (A/D) converter, and other elements, as provided in a computer commonly used for an automotive vehicle of modern vintage. The CPU operates to perform data processing operations according to various control programs stored in the ROM, while utilizing a data storage function of the RAM. The engine control computer 32 receives an AIR CON. signal SAC of an AIR CONDITIONER switch 65, as well as the signals SQm, STA and SNE and the output signals of the sensors 40, 60 and 62. The AIR CON. signal SAC is indicative of ON and OFF states of the air conditioner 64 provided on the vehicle.

The transmission control computer 34 receives a SHIFT POSITION signal from a shift lever sensor 66, a GEAR POSITION signal SG from a transmission position sensor 70 and a VEHICLE SPEED signal SV from a vehicle speed sensor 72, as well as the signals SQm, STA, SNE, SAC and STH. The shift lever sensor 66 is disposed adjacent to a shift lever provided in the driver's compartment of the vehicle, and the SHIFT POSITION signal generated by this sensor 66 represents one of operating positions of the shift lever, which include: PARKING position P; NEUTRAL position N; DRIVE position D; FIRST position 1; SECOND position 2; and REVERSE position R. The transmission position sensor 70 and the vehicle speed sensor 72 are provided on the automatic transmission 68, which has one rear drive position, and four forward drive positions, 1st-speed position, 2nd-speed position, 3rd-speed position and 4th-speed position for changing the speed NE of the engine 10 (hereinafter referred to as the engine speed NE). The VEHICLE SPEED signal SV represents the rotating speed of the output shaft of the automatic transmission 68, which is used as a running speed V of the vehicle (hereinafter referred to as VEHICLE SPEED V).

The automatic transmission 68 is a well known planetary gear type transmission having a plurality of hydraulically operated frictional coupling devices, which are suitably controlled by solenoid valves in a hydraulic system, so as to selectively establish one of the forward and rear drive positions of the transmission 68.

While the INTAKE AIR QUANTITY signal SQm, THROTTLE OPENING signal STA and ENGINE SPEED signal SNE are applied to both of the engine and transmission control computers 32, 34, in the present embodiment, these signals may be applied to either one of the two computers 32, 34, since these computers 32, 34 are connected for interactive data communication. The computer 32 and/or computer 34 may be adapted to receive other signals representative of other operating parameters indicative of the running condition of the vehicle, such as on-off states of a brake pedal, steering angle of a steering wheel, gradient of a road surface, temperature of the exhaust gas, for controlling the engine 10 and/or transmission 68.

The engine control computer 32 operates to control the fuel injector valve 30, ignitor 48, idling control valve 38 and valve timing changing device 50, depending upon the INTAKE AIR QUANTITY signal SQm (representative of the intake air quantity Qm), ENGINE SPEED signal SNE (representative of the engine speed NE), output of the sensor 60 (representative of the coolant temperature), output of the sensor 40 (representative of the intake air temperature), output of the oxygen sensor 62 (representative of the oxygen concentration of the exhaust gas in the exhaust pipe 56), output of the AIR CONDITIONER switch 64 (representative of the on-off states of the air conditioner), etc., according to various arithmetic equations and predetermined relationships represented by stored data maps, so as to regulate the amount and timing of the fuel injection by the fuel injector valve 30, timing of ignition by the spark plug 46, idling speed of the engine 10, and opening and closing timings of the intake and exhaust valves 28, 42, so that the engine 10 is controlled to provide a suitable output, with minimum fuel consumption and reduced amount of harmful exhaust emissions.

On the other hand, the transmission control computer 34 operates to place the automatic transmission 68 in a suitably selected one of the operating positions, according to predetermined shift patterns, depending upon the INTAKE AIR QUANTITY signal SQm (intake air quantity Qm), THROTTLE OPENING signal STA (throttle opening TA), ENGINE SPEED signal SNE (engine speed NE), VEHICLE SPEED signal SV (vehicle speed V), GEA/R POSITION signal SG (currently selected position of the transmission 68) and SHIFT POSITION signal (currently selected position of the shift lever).

Referring to the flow charts of FIGS. 2 and 3, there will be described a shift control operation for controlling the transmission 68 (with four forward drive positions) while the vehicle is running with the shift lever placed in the DRIVE position D.

Figure 2:
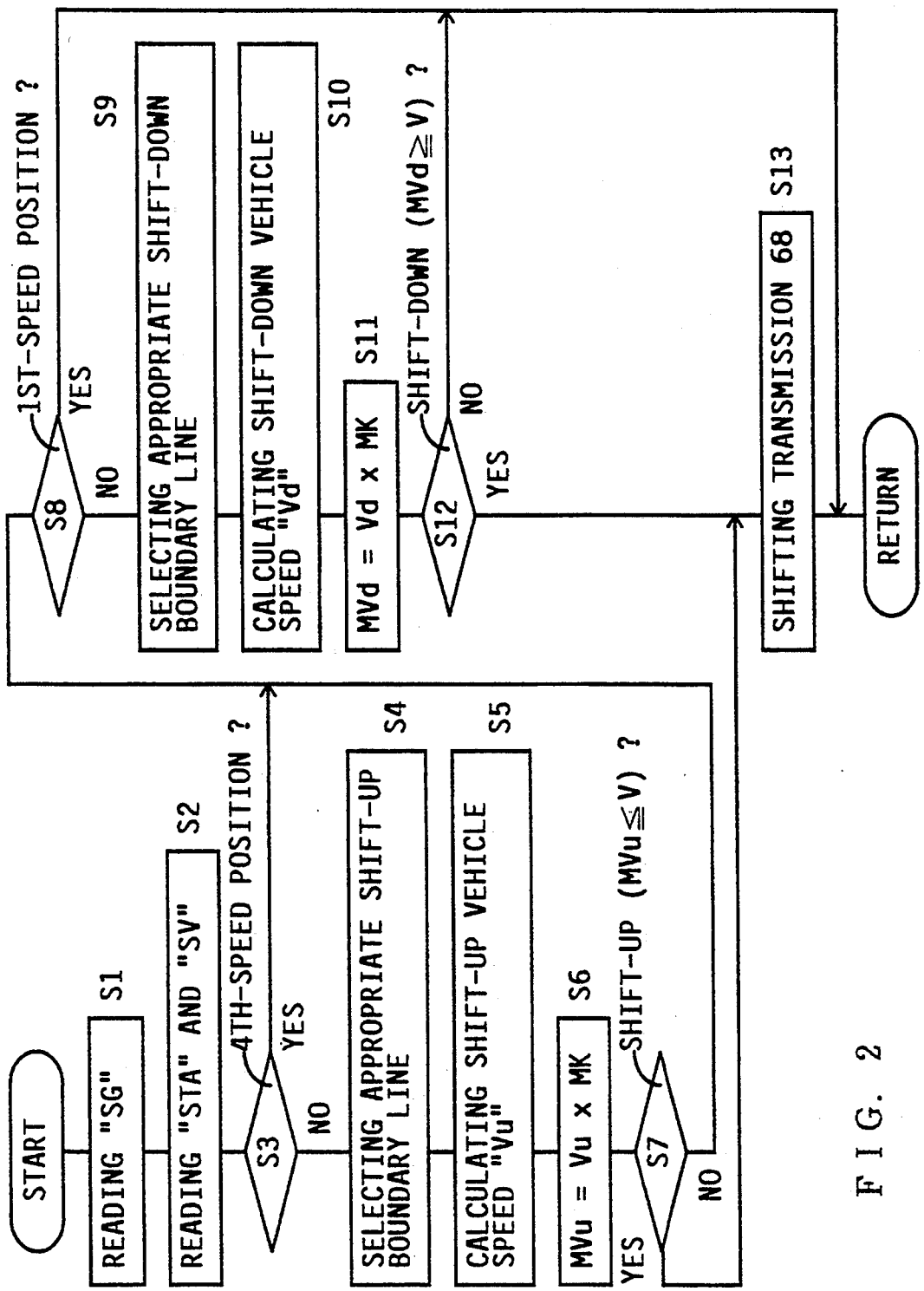
FIG. 2 is a flow chart illustrating a shift control routine executed by the shift control apparatus for shifting the automatic transmission.

A shift control routine illustrated in FIG. 2 is initiated with step S1 in which the GEAR POSITION signal SG representative of the currently selected or established operating position of the automatic transmission 68 is read out. Step S1 is followed by step S2 to read out the THROTTLE OPENING STA representative of the throttle opening TA of the throttle valve 20, and the VEHICLE SPEED signal SV representative of the vehicle speed V. The control flow then goes to step S3 to determine whether the currently selected operating position of the transmission 68 represented by the signal SG read in step S1 is the 4th-speed position or not. If an affirmative decision (YES) is obtained in step S3, this means that the transmission 68 can no longer be shifted up, and the control flow goes to step S8 and subsequent steps associated with a shift-down action of the transmission 68. If a negative decision (NO) is obtained in step S3, the control flow goes to step S4 and subsequent steps associated with a shift-up action of the transmission 68.

In step S4, the transmission control computer 34 selects one of three shift-up boundary lines as illustrated in FIGS. 4(a), 4(b) and 4(c), which are represented by respective data maps stored in the ROM of the computer 34. Each shift-up boundary line represents a relationship between the throttle opening TA and the vehicle speed V. The shift-up boundary line shown in FIG. 4(a) is used for shifting up the transmission 68 from the 1st-speed position to the 2nd-speed position. Similarly, the shift-up boundary lines shown in FIGS. 4(b) and 4(c) are used for shifting up the transmission 68 from the 2nd-speed and 3rd-speed positions to the 3rd-speed and 4th-speed positions, respectively. If the transmission 68 is currently placed in the 3rd-speed position, for example, the shift-up boundary line shown in FIG. 4(c) is selected in step S4. Step S4 is followed by step S5 in which a shift-up vehicle speed Vu is calculated based on the currently detected throttle opening TA represented by the signal STA read in step S2, and according to the shift-up boundary line selected in step S4. Step S5 is followed by step S6 to calculate a compensated shift-up vehicle speed MVu, by multiplying the calculated shift-up vehicle speed Vu by an adjusted compensating coefficient MK. Step S6 is followed by step S7 to compare the current vehicle speed V (represented by the signal SV read in step S2) with the calculated compensated shift-up vehicle speed MVu, and determine whether or not the current vehicle speed V is equal to or higher than the compensated shift-up vehicle speed MVu. If an affirmative decision (YES) is obtained in step S7, that is, if the current vehicle speed V is equal to or higher than the compensated shift-up vehicle speed MVu, the transmission 68 is shifted up (e.g., from the 3rd-speed position to the 4th-speed position) in step S13. If a negative decision (NO) is obtained in step S7, that is, if the current vehicle speed V is lower than the compensated shift-up vehicle speed MVu, the control flow goes to step S8.

In step S8, the computer 34 determines whether the currently selected operating position of the transmission 68 (represented by the signal SG read in step S1) is the 1st-speed position or not. If an affirmative decision (YES) is obtained in step S8, this means that the transmission 68 can no longer be shifted down, and the control flow goes back to step S1 for repeating the execution of the present routine. If a negative decision (NO) is obtained in step S8, the control flow goes to step S9 and subsequent steps associated with a shift-down action of the transmission 68.

In step S9, the transmission control computer 34 selects one of three shift-down boundary lines as illustrated in FIGS. 5(a), 5(b) and 5(c), which are represented by respective data maps also stored in the ROM of the computer 34. Each shift-down boundary line represents a relationship between the throttle opening TA and the vehicle speed V. The shift-down boundary line shown in FIG. 5(a) is used for shifting down the transmission 68 from the 2nd-speed position to the 1st-speed position. Similarly, the shift-down boundary lines shown in FIGS. 5(b) and 5(c) are used for shifting down the transmission 68 from the 3rd-speed and 4th-speed positions to the 2nd-speed and 3rd-speed positions, respectively. If the transmission 68 is currently placed in the 3rd-speed position, for example, the shift-down boundary line shown in FIG. 5(b) is selected in step S9. Step S9 is followed by step S10 in which a shift-down vehicle speed Vd is calculated based on the currently detected throttle opening TA represented by the signal STA read in step S2, and according to the shift-down boundary line selected in step S9. Step S10 is followed by step S11 to calculate a compensated shift-down vehicle speed MVd, by multiplying the calculated shift-down vehicle speed Vd by the adjusted compensating coefficient MK. Step S11 is followed by step S12 to compare the current vehicle speed V (represented by the signal SV read in step S2) with the calculated compensated shift-down vehicle speed MVu, and determine whether or not the current vehicle speed V is equal to or lower than the compensated shift-down vehicle speed MVd. If an affirmative decision (YES) is obtained in step S12, that is, if the current vehicle speed V is equal to or lower than the compensated shift-down vehicle speed MVd, the transmission 68 is shifted down (e.g., from the 3rd-speed position to the 2nd-speed position) in step S13. If a negative decision (NO) is obtained in step S12, that is, if the current vehicle speed V is higher than the compensated shift-down vehicle speed MVd, the control flow goes back to step S1.

If the adjusted compensating coefficient MK is larger than 1.0, the calculated compensated shift-up and shift-down vehicle speeds MVu and MVd are accordingly increased, whereby the transmission 68 is more likely to be shifted down than where the shift-up and shift-down vehicle speeds Vu and Vd were not compensated in steps S6, S11. If the adjusted compensating coefficient MK is smaller than 1.0, on the other hand, the speeds MVu and MVd are accordingly reduced, whereby the transmission 68 is more likely to be shifted up than where the speeds Vu and Vd were not compensated in steps S6, S11. The adjusted compensating coefficient MK used in steps S6 and S11 is updated, based on a compensating coefficient K, according to a routine of FIG. 3, each time the shift control routine of FIG. 2 is executed with a suitable cycle time of about 32 msecs., for example. Namely, the adjusted compensating coefficient MK is updated at an interval of about 32 msecs., for example.

Figure 3:
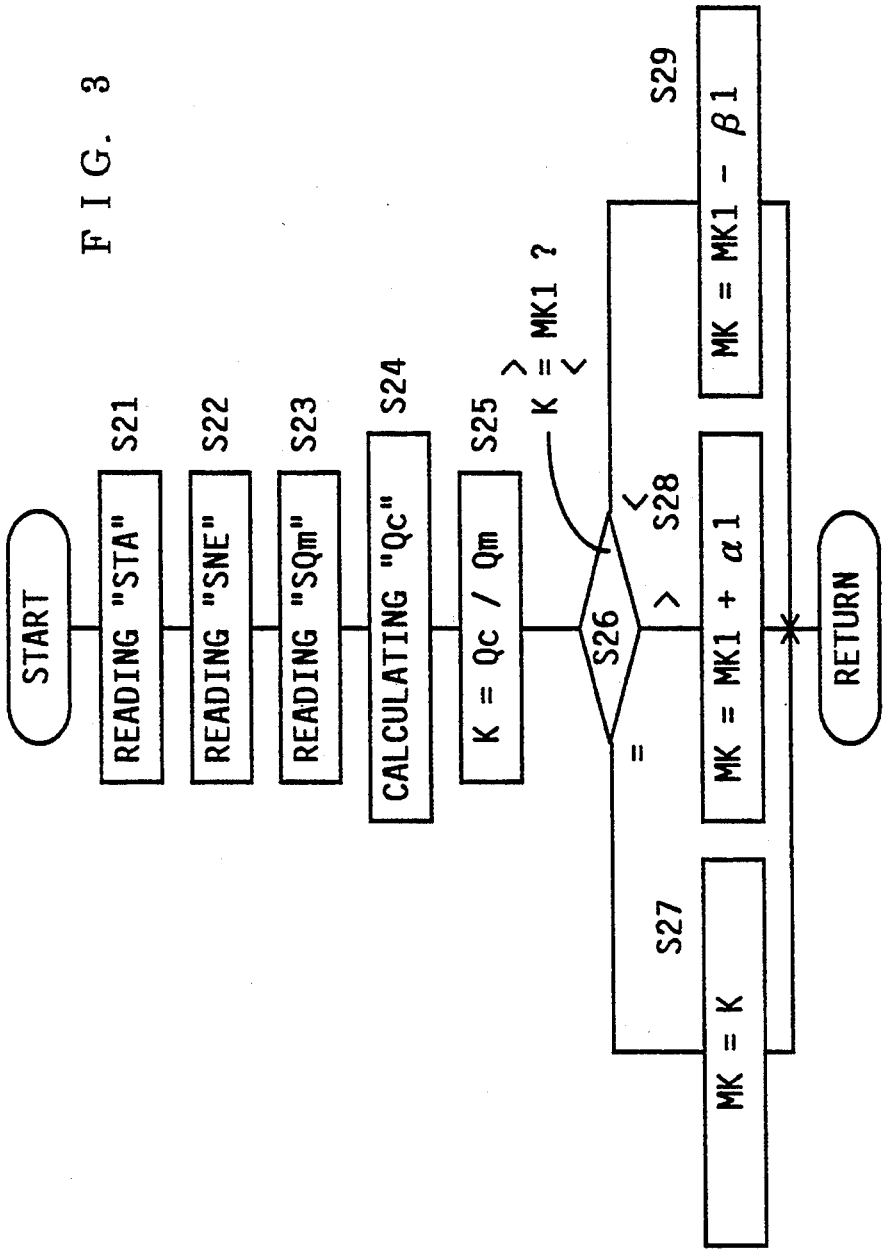
FIG. 3 is a flow chart illustrating an adjusting routine for adjusting a compensating coefficient K to obtain an adjusted compensating coefficient MK used in steps S6 and S11 of the shift control routine of FIG. 2.

The updating routine of FIG. 3 is started with step S21 to read the THROTTLE OPENING signal STA. Step S21 is followed by steps S22 and S23 to read the ENGINE SPEED signal SNE and the INTAKE AIR QUANTITY signal SQm, respectively. The control flow then goes to step S24 in which a currently required intake air quantity Qc is calculated on the basis of the throttle opening TA and engine speed NE represented by the signals STA and SNE, and according to a stored data map representative of a predetermined relationship among the throttle opening TA, engine speed NE and required intake air quantity Qc, as illustrated in the graph of FIG. 6, by way of example. Step S24 is followed by step S25 to calculate the compensating coefficient K, by dividing the calculated required intake air quantity Qc by the currently detected actual intake air quantity Qm represented by the signal SQm. This compensating coefficient K, which is used for obtaining the adjusted compensating coefficient MK as described below, is to deal with a variation in the actual intake air quantity Qm, due to the varying operating conditions of the idling control valve 38 and the valve timing changing device 50, and due to the varying atmospheric pressure, even if the throttle opening TA is constant. If this variation in the actual intake air quantity Qm is not taken into consideration, the transmission 68 cannot be suitably controlled according to the shift-up and shift-down boundary lines which are the predetermined relationships between the throttle opening TA and the vehicle speed V. In view of this fact, the shift-up and shift-down vehicle speeds Vu and Vd used in steps S7 and S12 for determining the necessity of shift-up and shift-down actions of the transmission 68 are compensated according to a ratio of the calculated required intake air quantity Qc (obtained in step S24 from the throttle opening TA and engine speed NE) to the actual intake air quantity Qm.

In the shift control apparatus including the transmission control computer 34 and the various sensors, the compensating coefficient K is adjusted to obtain the adjusted compensating coefficient MK, for the reason explained below. Namely, if the shift-up and shift-down vehicle speeds Vu and Vd are compensated by merely multiplying these speed values Vu and Vd by the compensating coefficient K, the transmission 68 may suffer from busy shifting actions within a short period of time shortly after an abrupt or sudden change in the throttle opening TA, because of a sudden change in the compensating constant K which is equal to Qc/Qm, since the required intake air quantity Qc as calculated from the suddenly changing throttle opening TA abruptly changes, while the corresponding change in the actual intake air quantity Qm as detected by the air flow meter 16 is delayed. FIG. 7(d) indicates an example of an abrupt increase in the throttle opening TA. In this case, the compensating coefficient K suddenly increases as indicated in one-dot chain line in FIG. 7(b), due to a sudden increase in the calculated required intake air quantity Qc as indicated in two-dot chain line in FIG. 7(c). As a result, the transmission 68 is shifted down from the 4th-speed position down to the 2nd-speed position, and then shifted up to the 4th-speed position, within a relatively short length of time, as indicated in one-dot chain line in FIG. 7(a).

In the present shift control apparatus, the compensating coefficient K is adjusted and updated as the adjusted compensating coefficient MK. More specifically, step S25 is followed by step S26 to compare the calculated compensating coefficient K with the adjusted compensating coefficient MK1 which was used in the last cycle of execution of the shift control routine of FIG. 2. If the calculated compensating coefficient K is equal to the last value MK1 as in the first cycle, step S27 is implemented to set the calculated value K as the adjusted compensating coefficient MK. If K>MK1, step S28 is implemented to update the adjusted compensating coefficient MK by adding a predetermined increment $\alpha 1$ (>0) to the last value MK1. That is, as long as K>MK1, the adjusted compensating coefficient MK is increased by the predetermined increment each time the routine of FIG. 2 is executed. If K<MK1, step S29 is implemented to update the adjusted compensating coefficient MK by subtracting a predetermined decrement $\beta 1$ (>0) from the last value MK1. That is, as long as K<MK1, the adjusted compensated coefficient MK is decreased by the predetermined decrement each time the routine of FIG. 2 is executed. The adjusted compensating coefficient MK thus obtained in steps S27–S29 is used in steps S6 and S11 to calculate the compensated shift-up and shift-down vehicle speeds MVu and MVd, by multiplying the vehicle speeds Vu and Vd (calculated in steps S5 and S10) by the adjusting compensating coefficient MK. Thus, an abrupt change in the compensating coefficient K due to an abrupt change in the throttle opening TA will not cause busy shifting actions of the transmission 68. According to the present shift control apparatus, the adjusted compensated coefficient MK changes as indicated in solid line in FIG. 7(b), and the transmission 68 will not be shifted down to the 2nd-speed position. While the increment $\alpha 1$ and the decrement $\beta 1$ may be almost the same, the increment $\alpha 1$ is preferably larger than the decrement $\beta 1$ for increased drivability of the vehicle, and is preferably smaller than the decrement $\beta 1$ for improved fuel economy of the vehicle.

As described above, the present embodiment is adapted such that the compensating coefficient K is calculated from the calculated required intake air quantity Qc and the detected intake air quantity Qm, and such that the thus calculated coefficient K is used as the adjusted compensating coefficient MK for obtaining the compensated shift-up and shift-down vehicle speeds MVu and MVd, as long as the coefficient K remains constant. Since the determination for shifting up or down the transmission 68 is effected based on the thus compensated shift-up and shift-down vehicle speeds MVu, MVd, the shifting of the transmission 68 can be suitably controlled, irrespective of the operating conditions of the idling control valve 38 and the valve timing changing device 52 and the atmospheric pressure. The present embodiment is further adapted such that the adjusted compensating coefficient MK is updated, i.e., increased or decreased with a predetermined constant rate (by the predetermined increment $\alpha 1$ or decrement $\beta 1$), while the compensating coefficient K is changing. This arrangement prevents busy shifting actions of the transmission 68 due to an abrupt change in the compensating coefficient K which may occur due to a delay in the change of the actual intake air quantity Qm with respect to the calculated required intake air quantity Qc upon sudden change in the throttle opening TA.

In the present embodiment of FIGS. 1–7, steps S7 and S12 of the shift control routine of FIG. 2 correspond to shift control means for automatically shifting the transmission 68 according to the predetermined shift patterns in the form of the shift-up and shift-down boundary lines of FIGS. 4 and 5, and on the basis of the detected throttle opening TA and vehicle speed V. Further, steps S6 and S11 of the routine of FIG. 2 correspond to compensating means for compensating the shift-up and shift-down boundary lines, i.e., the shift-up and shift-down vehicle speeds Vu, Vd, depending upon the compensating coefficient K. It is also noted that steps S21–S25 of the routine of FIG. 3 correspond to coefficient calculating means for calculating the compensating coefficient K by dividing the required intake air quantity Qc by the detected intake air quantity Qm, while step S26 of FIG. 3 corresponds to judging means for determining whether or not the compensating coefficient K has changed. Further, steps S28 and S29 of FIG. 3 correspond to adjusting means for changing the compensating coefficient K at the predetermined rate ($\alpha1$, $\beta1$) each time the judging means determines that the compensating coefficient K has changed.

In the first embodiment, the adjusted compensating coefficient MK is incremented or decremented by the constant value $\alpha1$ or $\beta1$, irrespective of the running condition of the vehicle or operating condition of the engine 10. However, the increment and decrement amounts may be changed depending upon the vehicle running condition or engine operating condition, as in second and third embodiments illustrated in FIGS. 8 and 9.

Figure 8:
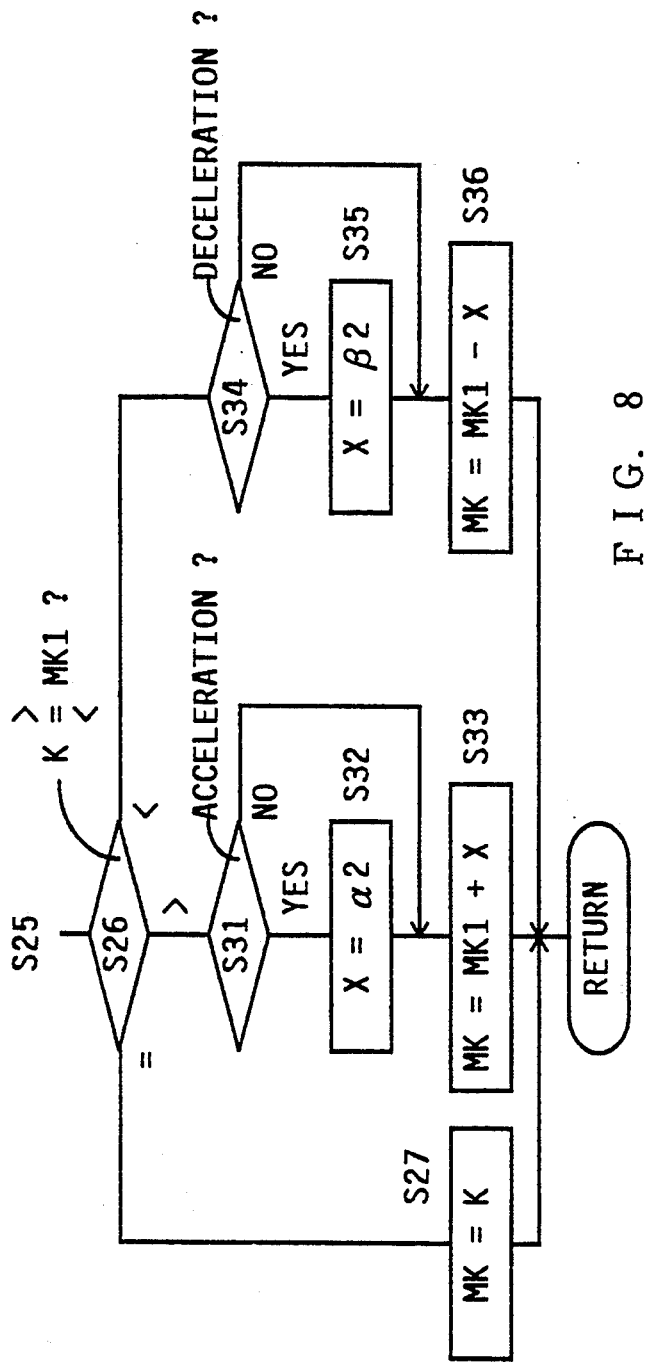
FIG. 8 is a fragmentary flow chart illustrating an adjusting routine alternative to that of FIG. 3, for adjusting the compensating coefficient K according to a second embodiment of this invention.

In the second embodiment of FIG. 8, step S26 is followed by step S31 if the compensating coefficient K is larger than the last adjusted compensating coefficient MK1, or by step S34 if the compensating coefficient K is smaller than the last adjusted compensating coefficient MK1. Step S31 is provided to determine whether or not the vehicle is in acceleration, while step S34 is provided to determine whether or not the vehicle is in deceleration. If an affirmative decision (YES) is obtained in step S31, namely, if the vehicle is in the process of acceleration with K>MK1, step S32 is implemented to set an increment-decrement value X to $\alpha2$. If an affirmative decision (YES) is obtained in step S34, namely, if the vehicle is in the process of deceleration with K<MK1, step S35 is implemented to set the increment-decrement value X to $\beta2$. The acceleration and deceleration of the vehicle can be detected in steps S31, S34, on the basis of a difference $\Delta TA$ between the last throttle opening TA1 (read in step S21 in the last cycle of execution of the routine of FIG. 3) and the present throttle opening TA (read in step S21 in the present execution cycle). More specifically, the vehicle acceleration is detected when the difference $\Delta TA$ is changed from a negative value to a positive value, and the vehicle deceleration is detected when the difference $\Delta TA$ is changed from a positive value to a negative value. Steps S32 and S35 are followed by steps S33 and S36, respectively, to increment and decrement the adjusted compensating coefficient MK. That is, the set increment-decrement value X is added to the last adjusted compensating coefficient MK1 in step S33, or subtracted from the last compensating coefficient MK1 in step S36.

Steps S33 and S36 are also executed if a negative decision (NO) is obtained in steps S31 and S34, respectively.

It is noted that once the increment-decrement value X is set to $\alpha2$ in step S32, for example, the same value $\alpha2$ remains effective until the increment-decrement value X is set to $\beta2$ in step S35. In other words, the same value $\alpha2$ or $\beta2$ is used until the vehicle running condition is changed from the accelerating state to the decelerating state or vice versa. For example, if a negative decision (NO) is obtained in step S34 after the adjusted compensating value MK is incremented by the increment-decrement value $\alpha2$ in step S33 during acceleration of the vehicle, this means that the vehicle is still in the process of acceleration, but the compensating coefficient K calculated in step S25 is decreased. In this case, the adjusted compensating coefficient MK is decremented by the same increment-decrement value $\alpha2$, which remains effective until step S35 is implemented, or as long as the vehicle is in acceleration.

It will therefore be understood that the adjusted compensating coefficient MK is incremented and decremented by $\alpha2$ during the vehicle acceleration, and by $\beta2$ during the vehicle deceleration. If $\alpha2$ is larger than $\beta2$, the transmission 68 is more likely to be shifted down during the vehicle acceleration, and is less likely to be shifted down during the vehicle deceleration, whereby relatively high drivability of the vehicle is ensured.

In the second embodiment of FIG. 8, steps S33 and S36 correspond to adjusting means for changing the compensating coefficient K at the predetermined rate ($\alpha2$, $\beta2$) each time the judging means determines that the compensating coefficient K has changed. Further, step S31 corresponds to first determining means for determining whether or not the vehicle is in the process of acceleration, if the compensating coefficient K has increased, and step S34 corresponds to second determining means for determining whether or not the vehicle is in the process of deceleration, if the compensating coefficient K has decreased. Steps S32 and S35 correspond to first and second setting means for setting first and second increment-decrement values ($\alpha2$, $\beta2$), respectively, if the vehicle acceleration and deceleration are determined by the respective first and second determining means.

Figure 9:
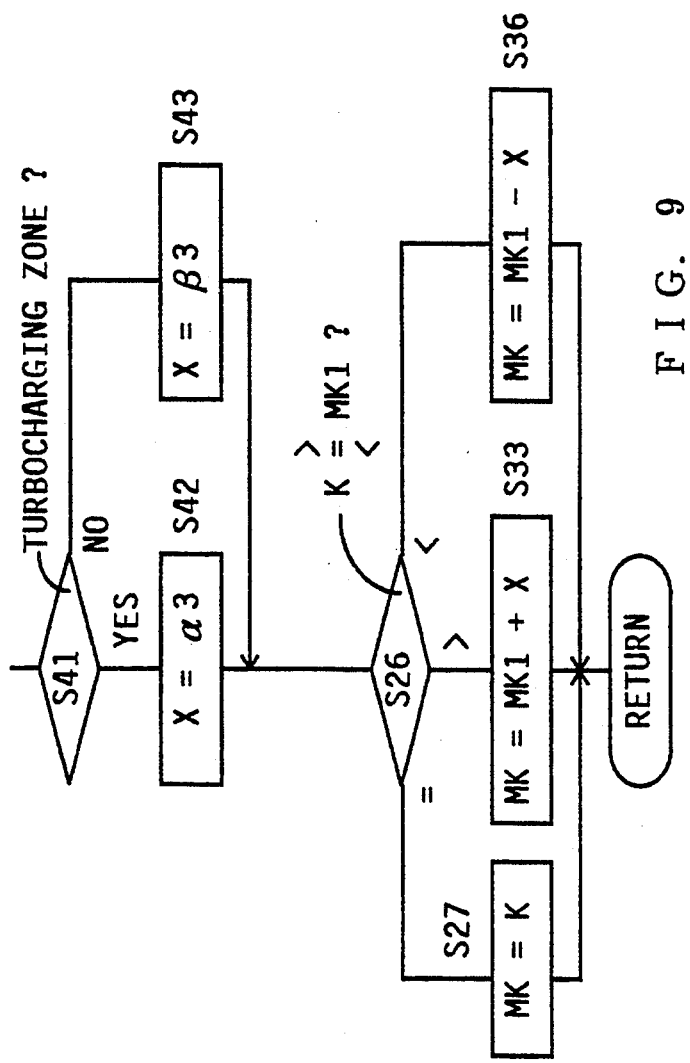
FIG. 9 is a fragmentary flow chart illustrating an adjusting routine for adjusting the compensating coefficient K according to a third embodiment of the invention.

In the third embodiment of FIG. 9, step S25 is followed by step S41 to determine whether or not the engine is in the turbocharging state, for the purpose of using different values $\alpha3$ and $\beta3$ as the increment-decrement value X used in steps S33 and S36, for dealing with a considerable delay in the change in the actual intake air quantity Qm upon changing of the throttle opening TA while the engine 10 is in the turbocharging state, as indicated in FIGS. 10(b) and 10(c). This delay is referred to as a turbocharger lag as indicated in FIG. 10(b), which causes a sudden increase in the calculated compensating coefficient K as indicated in one-dot chain line in FIG. 10(a). The determination in step S41 may be effected based on a data map (stored in the ROM of the computer 34) which represents a predetermined boundary between a turbocharging zone and a non-turbocharging zone which are defined by the throttle opening TA and the engine speed NE, as shown in FIG. 11. Alternatively, the determination of the turbocharging and non-turbocharging states of the engine can be effected based on the intake air pressure of the engine 10. That is, the engine 10 is in the turbocharging state when the intake air pressure is higher than the atmospheric pressure, and is in the non-turbocharging state when the intake air pressure is not higher than the atmospheric pressure.

If the engine 10 is in the turbocharging state (if the engine operating condition is in the turbocharging zone as indicated in FIG. 11), step S41 is followed by step S42 in which the increment-decrement value X is set to α3. If the engine 10 is in the non-turbocharging state (if the engine operating condition is in the non-turbocharging zone as indicated in FIG. 11), step S41 is followed by step S43 in which the increment-decrement value X is set to β3. Steps S42 and S43 are followed by step S26 described above with respect to the first embodiment of FIG. 3. With the provisions of steps S41–S43, the adjusted compensating coefficient MK is incremented and decremented in steps S33 and S36 by the increment-decrement value α3, when the engine is in the turbocharging state, and by the increment-decrement value b³, when the engine is in the non-turbocharging state. The value α3 is usually selected to be a positive value close to zero, so that the adjusted compensating coefficient MK is almost equal to 1 as indicated at MK(α3) in solid line in FIG. 10(a). On the other hand, the value β3 is selected so that the adjusted compensating coefficient MK(β3) changes as indicated in dashed line in FIG. 10(a).

Figure 10:
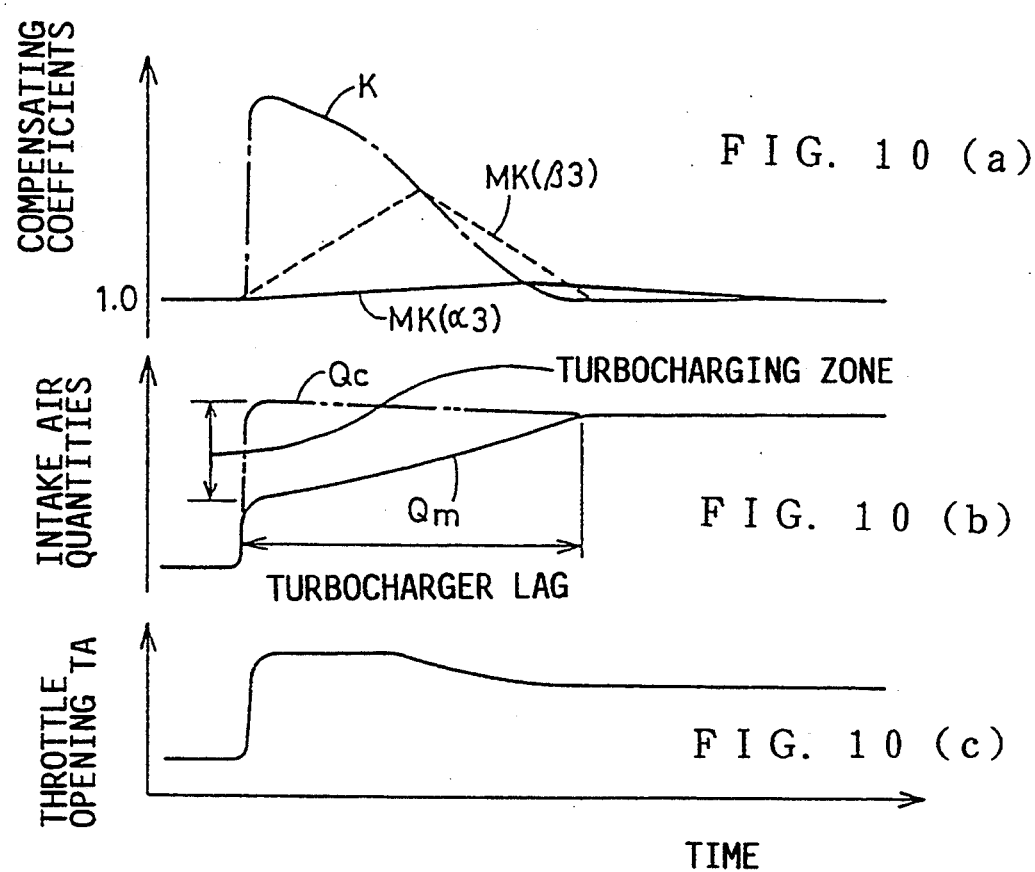
FIGS. 10(a), 10(b) and 10(c) are timing chart graphs indicating changes in the compensating coefficients K and MK and the intake air quantities Qc and Qm upon changing of the throttle opening TA.
Figure 11:
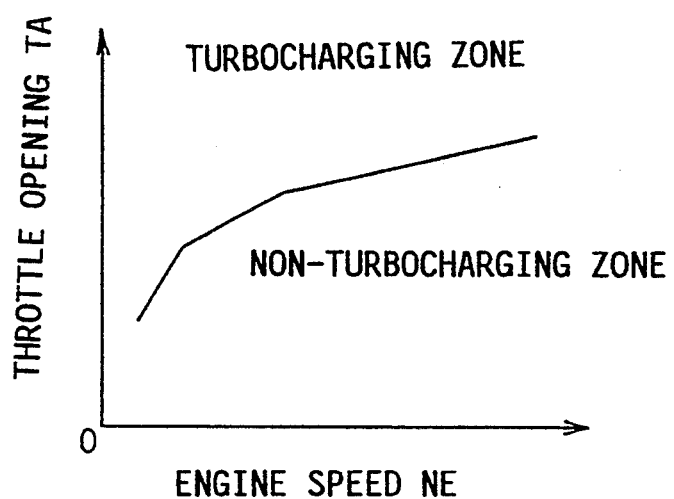
FIG. 11 is a graph showing a data map representative of a boundary between turbocharging and non-turbocharging zones, used in the embodiment of FIG. 9.

In the third embodiment of FIGS. 9–11, step S41 corresponds to determining means for determining whether or not the engine 10 is in a turbocharging state. Further, step S42 corresponds to first setting means for setting a first increment-decrement value (α3), if the determining means determines that the engine is in the turbocharging state, and step S43 corresponds to second setting means for setting a second increment-decrement value (β3), if the determining means determines that the engine in the non-turbocharging state.

In the first, second and third embodiments of this invention described above, the shift-up vehicle speed Vu and the shift-down vehicle speed Vd are calculated in steps S5, S10 according to the selected shift-up and shift-down boundary lines, and these shift-up and shift-down speeds Vu, Vd are compensated by the adjusted compensating coefficient MK, so that the compensated speeds Vu, Vd are compared with the actually detected vehicle speed V. In other words, the shift pattern in the form of the shift-up and shift-down boundary lines is changed or compensated by the adjusted compensating coefficient MK. However, the adjusted compensating coefficient MK may be used to compensate or change the actual vehicle speed V before it is compared with the calculated (non-compensated) shift-up and shift-down speeds Vu, Vd. In this case, the actual vehicle speed V is divided by the coefficient MK. Further, the adjusted compensating coefficient MK may be used to compensate or change the actual throttle opening TA so that the shift-up and shift-down vehicle speeds Vu, Vd are calculated on the basis of the compensated throttle opening TA. In this case, the actual throttle opening TA is multiplied by the coefficient MK. It is also possible to use the adjusted compensating coefficient MK to shift the selected shift-up and shift-down boundary lines, or selected an appropriate one of two or more shift-up boundary lines prepared for each operating position of the transmission 68, and an appropriate one of two or more shift-down boundary lines for each operating position of the transmission.

While the above embodiments are adapted such that the calculated compensating coefficient K is compared with the last adjusted compensating coefficient MK in step S26. However, the routine of FIG. 3, for example, may be modified so as to implement step S28 if $K > MK1 + \alpha1$, implement step S29 if $K < MK1 - \beta1$, and implement step S27 in the other cases. In this modified arrangement, the adjusted compensating coefficient MK remains unchanged if the amount of change of the calculated compensating coefficient K is smaller than a given limit, e.g., α1, β1.

In the first embodiment of FIG. 3, the increment α1 may be different from the decrement β1. In the second embodiment of FIG. 8, the increment-decrement value α2 used during acceleration of the vehicle may be different from the increment-decrement value β2 used during deceleration of the vehicle. In the third embodiment of FIG. 9, the increment-decrement value α3 used in the turbocharging state of the engine 10 is different from the increment-decrement value β3 used in the non-turbocharging state of the engine. However, these values α1, β1, α2, β2, α3, β3, which determine the rate at which the adjusted compensating coefficient MK is changed, may be changed, or other values may be used, depending upon the other operating conditions of the vehicle. Further, appropriate increment and decrement values used in steps S28, S29, S33, S36 may be selected according to stored data maps which represent relationships of suitable operating parameters of the vehicle.

Although the above embodiments are adapted such that the change in the compensating coefficient K is monitored by comparing the coefficient K with the adjusted compensating coefficient MK1 used in the last compensating cycle, other methods are available for detecting the change in the coefficient K which takes place due to a delayed change in the actual intake air quantity Qm with respect to a change in the throttle opening TA. For example, the change in the coefficient K which is caused solely by the above delayed change in the intake air quantity Qm may be detected on the basis of a change in the throttle opening TA and/or a change in the vehicle speed V, or a change in a value Qc/NE, which is obtained by dividing the required intake air quantity Qc by the engine speed NE.

Referring next to FIGS. 12–16, there will be described a fourth embodiment of this invention, in which steps S6A and S11A are substituted for steps S6 and S11 of the first embodiment of FIG. 2. In step S6A, the compensated shift-up vehicle speed MVu is calculated by multiplying the calculated shift-up vehicle speed Vu by a compensating coefficient (K1+K2). Similarly, the compensated shift-down vehicle speed MVd is calculated in step S11A, by multiplying the calculated shift-down vehicle speed Vd by the compensating coefficient (K1+K2).

A first compensating value K1 of the compensating coefficient (K1+K2) is to deal with a variation in the actual intake air quantity Qm, due to the varying operating conditions of the idling control valve 38 and the valve timing changing device 50, and due to the varying atmospheric pressure, even if the throttle opening TA is constant. If this variation in the actual intake air quantity Qm is not taken into consideration, the transmission 68 cannot be suitably controlled according to the shift-up and shift-down boundary lines which are the predetermined relationships between the throttle opening TA and the vehicle speed V. In view of this fact, the shift-up and shift-down vehicle speeds Vu and Vd used in steps S7 and S12 for determining the necessity of shift-up and shift-down actions of the transmission 68 are compensated by the first compensating value K1, depending upon a ratio of the calculated required intake air quantity Qc (obtained in step S54 from the throttle opening TA and engine speed NE as described below) to the actual intake air quantity Qm.

Figure 12:
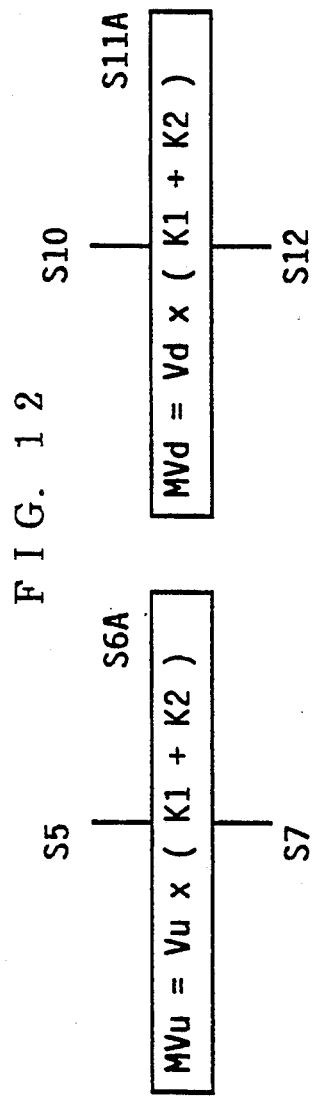
FIG. 12 is a fragmentary flow chart showing a shift control routine according to a fourth embodiment of this invention, which corresponds to that of FIG. 2 of the first embodiment.
Figure 13:
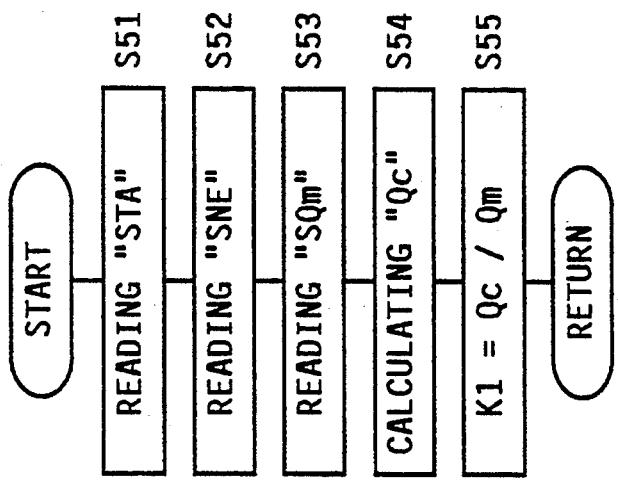
FIG. 13 is a flow chart showing a routine for obtaining a first compensating value K1 used in steps S6A and S11A of the routine of FIG. 12.

The first compensating value K1 is calculated according to a routine illustrated in FIG. 13, for example, which corresponds to the routine of FIG. 3. The first compensating value K1 is updated at an interval corresponding to the cycle time of the routine of FIG. 13, which is the same as the cycle time (e.g., 32 msecs. or so) of the shift control routine of FIG. 12. Steps S51 through S54 in the routine of FIG. 13 are identical with steps S21 through S24 in the routine of FIG. 2. Step S54 is followed by step S55 to calculate the first compensating value K1 by dividing the calculated required intake air quantity Qc by the actual intake air quantity Qm represented by the INTAKE AIR QUANTITY signal SQm. As indicated in FIG. 16(d), the first compensating value K1 is about 1.0 when the idling control valve 38 or valve timing changing device 52 is operated or when the atmospheric pressure is within a predetermined normal range. When the throttle opening TA changes, as indicated in FIG. 16(e), the calculated required intake air quantity Qc follows the change in the throttle opening TA, but the actual intake air quantity Qm changes some time after the change of the throttle opening TA, whereby the first compensating value K1 changes as indicated in FIG. 16(d).

Figure 14:
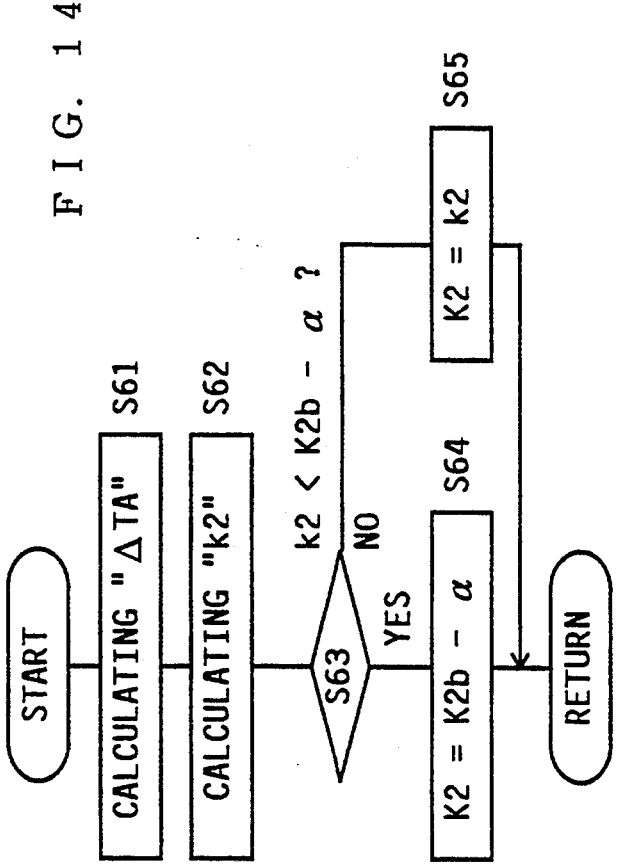
FIG. 14 is a flow chart showing a routine for obtaining a second compensating value K2 also used in steps S6A and S11A of the routine of FIG. 12.

On the other hand, the second compensating value K2 of the compensating coefficient (K1+K2) is provided to increase the compensating coefficient (K1+K2) so that the transmission is likely to be shifted down in response to the driver's desire to accelerate the vehicle. The second compensating value K2 is calculated according to a routine illustrated in FIG. 14, for example. This second compensating value K2 is updated by execution of the routine of FIG. 14 with the same cycle time as that of the routine of FIG. 13. In the routine of FIG. 14, step S61 is initially implemented to calculate an amount of change $\Delta TA$ of the throttle opening TA, which is a difference between the throttle opening TA detected in the present cycle and the throttle opening TAb detected in the last cycle. This amount of change $\Delta TA = TA - TAb$ is considered to represent the degree in which the vehicle driver desires to accelerate the vehicle.

Figure 15:
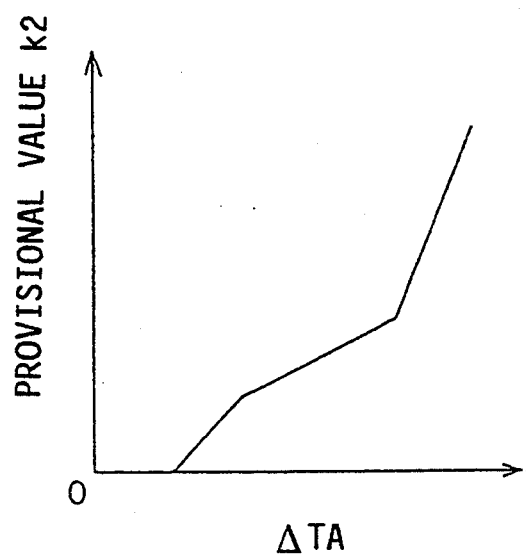
FIG. 15 is a graph showing a data map representative of a relationship for calculating, in step S62 of the routine of FIG. 14, the second compensating value K2 on the basis of an amount of change ΔTA of the throttle opening TA.
Figure 16:
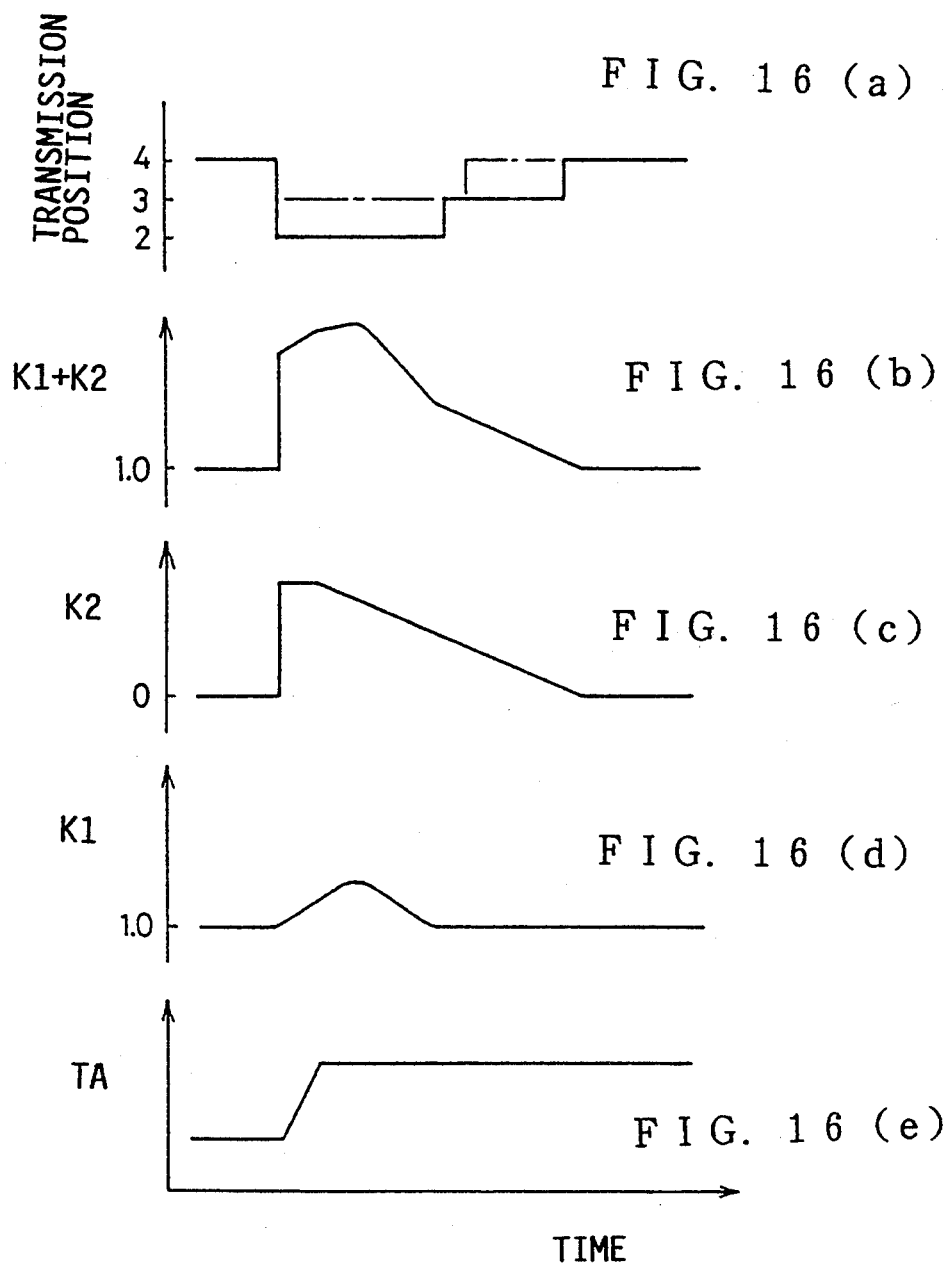
FIGS. 16(a), 16(b), 16(c), 16(d) and 16(e) are timing chart graphs indicating shifting actions of the transmission, and changes in various operating parameters such as a compensating coefficient (K1+K2)

Step S61 is followed by step S62 to calculate a provisional value k2 according to a predetermined relationship represented by a stored data map, as shown in FIG. 15, and on the basis of the calculated amount of change $\Delta TA$ of the throttle opening TA. The relationship is determined so that the provisional value k2 is zero (0) when the amount of change $\Delta TA$ is smaller than a given value, and increases as the amount of change $\Delta TA$ increases, as indicated in FIG. 15. Step S62 is followed by step S63 to compare the calculated provisional value k2 with a value $(K2b - \alpha)$, which is equal to the last second compensating value K2b read in the last cycle, minus a predetermined value $\alpha$. If the provisional value k2 is smaller than $(K2b - \alpha)$, step S63 is followed by step S64 to set the second compensating value K2 to $(K2b - \alpha)$, namely, use the value $(K2b - \alpha)$ as the effective second compensating value K2. If the provisional value k2 calculated in step S62 is equal to or larger than the value $(K2b - \alpha)$, step S63 is followed by step S35 to use the provisional value k2 calculated in step S62, as the effective second compensating value K2. According to the relationship of FIG. 15, the provisional value k2 calculated in step S62 becomes zero when the amount of change $\Delta TA$ is reduced to a value close to zero as a result of completion of depressing movement of the accelerator pedal. Even after the accelerator pedal has been operated to a desired position, the driver's desire to accelerate the vehicle is considered to remain. Steps S63–S65 are provided to reflect this continuing desire of the driver, on the second compensating value K2, even after the amount of change $\Delta TA$ is zeroed. Namely, the second compensating value K2 is decremented by the suitable amount $\alpha$, to smoothly or gradually reduce the value K2 as shown in FIG. 16(c), after the amount of change $\Delta TA$ is zeroed, that is, after the accelerator pedal has been depressed to the desired position.

In the present fourth embodiment, the compensated shift-up and shift-down vehicle speeds MVu, MVd are obtained by multiplying the shift-up and shift-down vehicle speeds Vu, Vd calculated in steps S5 and S10, by the thus obtained compensating coefficient (K1+K2), and the determinations in steps S7 and S12 are based on the thus obtained compensated shift-up and shift-down vehicle speeds MVu, MVd. The first compensating value K1 functions to assure optimum shifting of the transmission 68, so as to meet the actual output torque of the engine 10, without being affected by the operating conditions of the idling control valve 38 and valve timing changing device 52, or by the variation in the atmospheric pressure. Further, the second compensating value K2 functions to assure excellent drivability of the vehicle, with a good response to the driver's desire to accelerate the vehicle, since the second compensating value K2 is gradually reduced even after the depressing movement of the accelerator pedal is terminated or even after the amount of change $\Delta TA$ of the throttle opening is zeroed.

As shown in the timing chart of FIGS. 9(a) through 9(e), the transmission 68 is first shifted down to the 2nd-speed position when the throttle opening TA is increased. Subsequently, the transmission is shifted up to the 3rd-speed position and then returned to the 4th-speed position. If only the first compensating value K1 is used, this value K1 instantaneously increases due to a delayed change of the actual intake air quantity Qm with respect to the change of the throttle opening TA, but the transmission 68 is shifted down to the 3rd-speed position, as indicated in FIG. 16(a), but not further down to the 2nd-speed position. Further, the transmission is returned to the 4th-speed position at an earlier point of time as also indicated in FIG. 16(c), if only the first compensating value K1 is used.

In the present fourth embodiment of FIGS. 12–16, steps S6A and S11A correspond to compensating means for compensating the shift patterns in the form of the shift-up and shift-down boundary lines, more precisely, compensate the shift-up and shift-down vehicle speeds Vu, Vd to obtain the compensated shift-up and shift-down vehicle speeds MVu, MVd. Further, the routines of FIGS. 13 and 14 correspond to coefficient calculating means for calculating the compensating coefficient (K1+K2).

Figure 17:
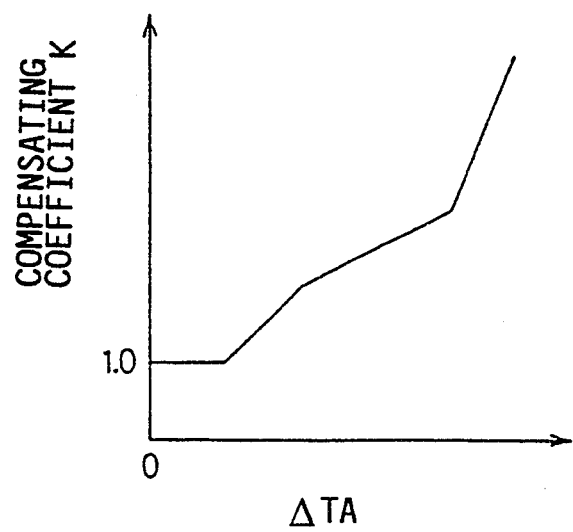
FIG. 17 is a graph showing a data map representative of a relationship for calculating the compensating coefficient K from the amount of change ΔTA of the throttle opening, according to a fifth embodiment of the present invention.

Referring to FIG. 17, a fifth embodiment of this invention will be described. This fifth embodiment is adapted to calculate a compensating coefficient K according to a predetermined relationship between the coefficient K and the amount of change $\Delta TA$ of the throttle opening TA, as shown in FIG. 17, and on the basis of the detected amount of change $\Delta TA$. The relationship is represented by a data map stored in the ROM of the computer 34. In this embodiment, the compensating coefficient K is set to be about 1.0 when the amount of change ΔTA is in a range between zero and a predetermined value close to zero. The coefficient K increases as the amount of change ΔTA increases from the predetermined value. The thus determined compensating coefficient K is used in steps S6A and S11A in place of the coefficient (K1+K2). According to this modified arrangement, the operating conditions of the idling control valve 30 and the valve timing changing device 52, or the variation in the atmospheric pressure will not be reflected on the determinations in steps S7 and S12. Other compensating values may be used to reflect the other operating conditions of the vehicle on the determinations in steps S7 and S12.

The fourth embodiment may be modified such that the second compensating value K2 is obtained according to a predetermined relationship as shown in FIG. 17 so that the second compensating value K1 is almost equal to 1.0 when the amount of change ΔTA is zero or close to zero, and such that the first compensating value K1 is multiplied by the thus obtained second compensating value K2 to obtain the compensating coefficient.

As described above with respect to the compensating coefficient K in the first, second and third embodiments, the compensating coefficient (K1+K2) obtained in the fourth embodiment of FIGS. 12–14 or compensating coefficient obtained in the fifth embodiment of FIG. 17 may be applied to any one of the appropriate parameters other than the shift-up and shift-down vehicle speeds Vu, Vd which may be used to determine whether the transmission 68 is shifted or not.

In the fourth and fifth embodiments, the amount of change ΔTA of the throttle opening TA of the throttle valve 20 per unit time is used as a parameter which represents the extent to which the vehicle driver desires to accelerate the vehicle. However, any other parameter such as the rate of change in the operating amount of the accelerator pedal may be used as the parameter indicative of the driver's desire to accelerate the vehicle.

A sixth embodiment of the shift control apparatus of this invention will be described by reference to FIGS. 18–20. This embodiment is identical with the first embodiment illustrated in FIG. 2, except for the manner of obtaining the adjusted compensating coefficient MK used in steps S6 and S11 of FIG. 2. More specifically, the adjusted compensating coefficient MK used in the present sixth embodiment is obtained according to a routine as illustrated in the flow chart of FIG. 18.

Figure 18:
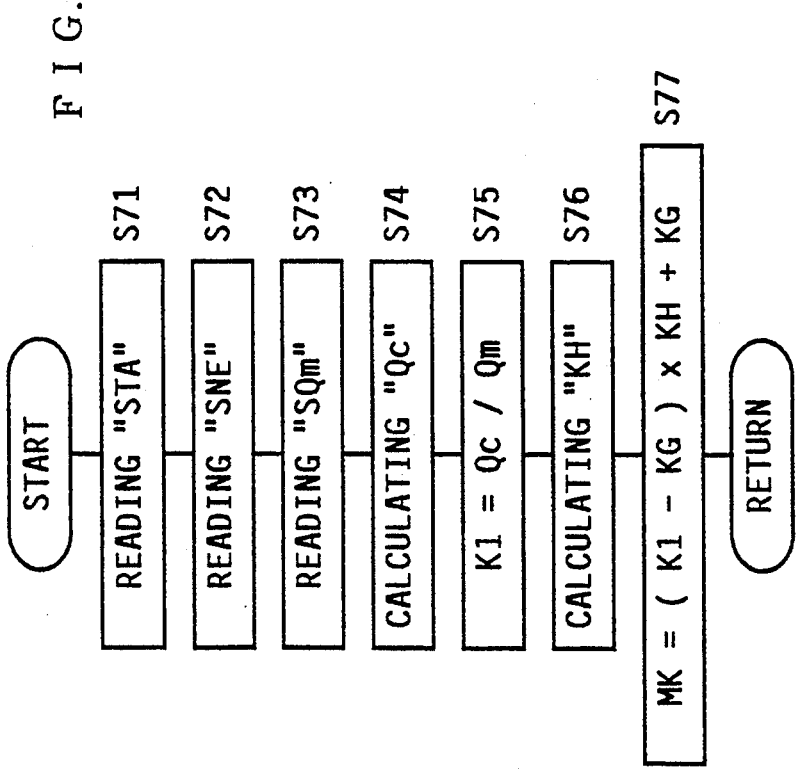
FIG. 18 is a flow chart illustrating a routine corresponding to that of FIG. 3, which is used in a sixth embodiment of the present invention.

In the routine of FIG. 18, steps S71, S72, S73 and S74 are implemented in the same manner as steps S21, S22, S23 and S24 of the routine of FIG. 3, respectively. Step S74 is followed by step S75 to calculate a nominal compensating coefficient K1 by dividing the calculated required intake air quantity Qc by the detected actual intake air quantity Qm. This compensating coefficient K1 is used to deal with a variation in the actual intake air quantity Qm, due to the varying operating conditions of the idling control valve 38 and the valve timing changing device 50, and due to the varying atmospheric pressure, even if the throttle opening TA is constant. If this variation in the actual intake air quantity Qm is not taken into consideration, the transmission 68 cannot be suitably controlled according to the shift-up and shift-down boundary lines which are the predetermined relationships between the throttle opening TA and the vehicle speed V. In view of this fact, the shift-up and shift-down vehicle speeds Vu and Vd used in steps S7 and S12 for determining the necessity of shift-up and shift-down actions of the transmission 68 are compensated by the first compensating coefficient, depending upon a ratio of the calculated required intake air quantity Qc (obtained in step S74) to the actual intake air quantity Qm.

Step S75 is followed by steps S76 and S77 to obtain the adjusted compensating coefficient MK to be used in steps S7 and 12 of the shift control routine of FIG. 2. In this sixth embodiment, the adjusted compensating coefficient MI< is determined in the light of the following finding and recognition concerning the errors in detecting and calculating the appropriate parameters.

The nominal compensating coefficient K1 inevitably contains an error which arise from errors which are unavoidably included in the detected value of the actual intake air quantity Qm and in the calculated required intake air quantity Qc. The error in the calculated quantity Qc is unavoidable because some errors are present in the detected values of the engine speed NE and throttle opening TA from which the quantity Qc is calculated. Even if the errors included in the calculated required intake air quantity Qc and the detected actual intake air quantity Qm are relatively small, these errors will have a considerable influence on the calculated compensating coefficient K1, particularly when the values Qc and Qm are relatively small. The compensation using the compensating coefficient K1 which contains the error will deteriorate the manner of shifting of the transmission. To avoid this drawback, steps S26 and S27 are implemented for adjusting the weight of the compensating coefficient K1 depending upon the detected actual intake air quantity Qm, and for obtaining the adjusted compensating coefficient MK which is less influenced by the nominal compensating coefficient K1 when the intake air quantity Qm is relatively small. The shift-up and shift-down vehicle speeds Vu and Vd are compensated by the thus obtained adjusted compensating coefficient MK, to obtain the compensated shift-up and shift-down speeds MVu and MVd.

Figure 20:
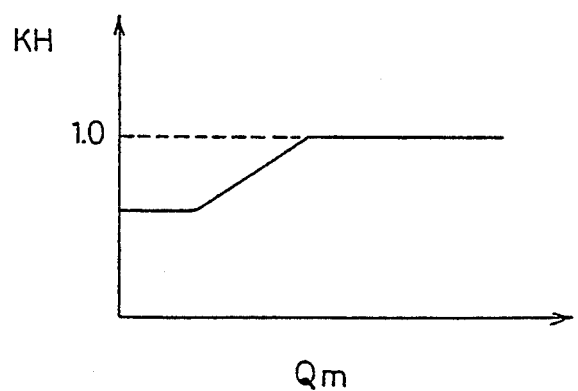
FIG. 20 is a graph showing a data map used in step S76 of the routine of FIG. 18, which represents a relationship for calculating an adjusting coefficient KH from the intake air quantity Qm.

Described in detail, step S76 is implemented to calculate an adjusting coefficient KH according to a predetermined relationship between the coefficient KH and the intake air quantity Qm, as shown in FIG. 20, and on the basis of the detected intake air quantity Qm. The relationship is represented by a data map stored in the ROM of the computer 34. Step S76 is followed by step S77 in which the adjusted compensating coefficient MK is obtained according to the following equation (1) which includes the adjusting coefficient KH calculated in step S76.

$$MK = (K1 - KG) \times KH + KG \tag{1}$$

It will be seen from the graph of FIG. 20 that the adjusting coefficient KH is equal to 1.0 when the detected actual intake air quantity Qm is larger than a predetermined value, and the coefficient KH is smaller than 1.0 when the quantity Qm is smaller than the predetermined value. The adjusted compensating coefficient MK approaches the value KG as the adjusting coefficient KH decreases.

The value KG is referred to as "control center value", which is an average value of the nominal compensating coefficient K1 when the idling control valve 38 and the valve timing changing device 52 are in the normal states, which are established when the air conditioner is off, for example. Basically, the average value of the compensating coefficient K1 is 1.0 with the calculated quantity Qc being equal to the detected quantity Qm. However, the calculated and detected quantities Qc and Qm are not always equal to each other, due to the calculating error of the quantity Qc and the detecting error of the quantity Qm by the air flow meter 16. Further, the quantities Qc and Qm may vary due to chronological changes of the various elements of the control system including the sensors. In view of this fact, the control center value KG is obtained according to the routine illustrated in FIG. 19, and step S77 is implemented to multiply a difference (K1− KG) between the compensating coefficient K1 and the control center value KG, by the adjusting coefficient KH, and add the product (K1−KG)×KH to the control center value KG. According to the equation (1), the value (K1−KG)×KH is relatively small when the actual intake air quantity Qm is relatively small, because the adjusting coefficient KH is smaller than 1.0. In other words, the value |MK−KG| (difference between the control center value KG and the adjusted compensating coefficient MK) is relatively small when the detected quantity Qm is relatively small.

Figure 19:
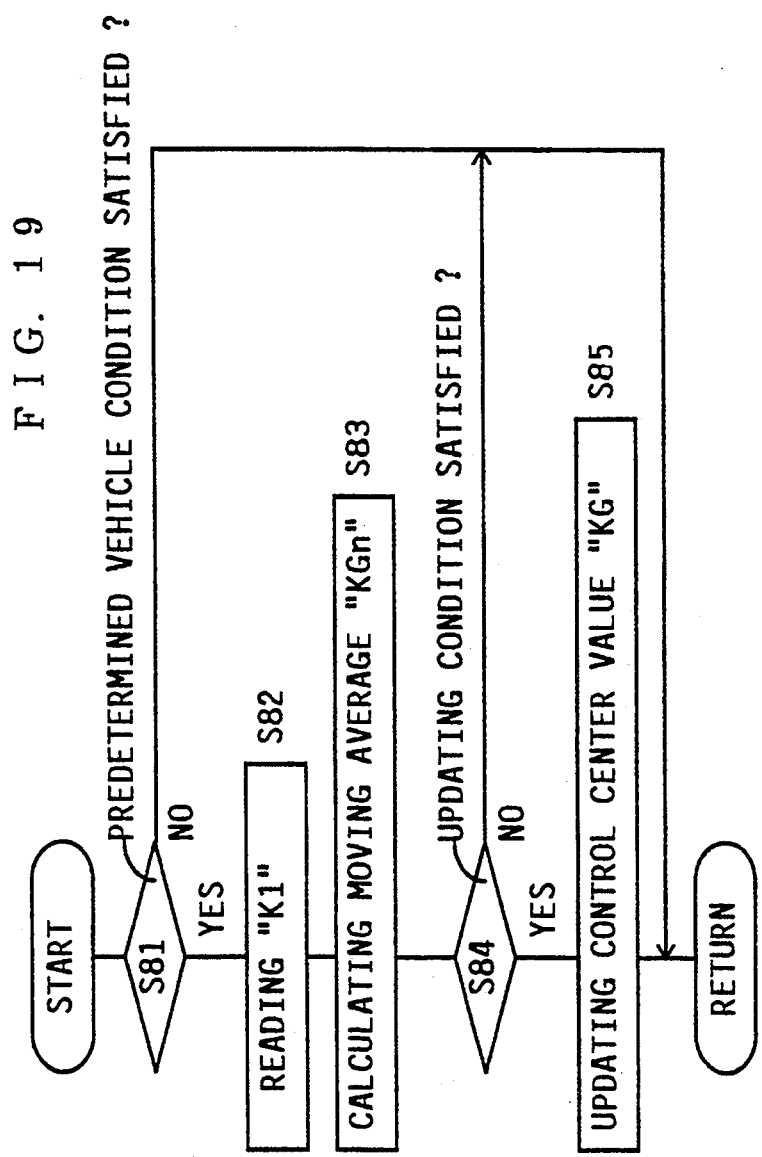
FIG. 19 is a flow chart illustrating a routine for obtaining a control center value KG used in step S77 of the routine of FIG. 18.

Reference is now made to the flow chart of FIG. 19 illustrating the routine for obtaining the control center value KG, which is updated at an interval corresponding to the cycle time of the routine of FIG. 18. The routine of FIG. 19 is initiated with step S81 to determine whether or not a predetermined vehicle condition is satisfied. This vehicle condition is a condition for implementing the following steps S82–S85, and is satisfied, for example, when the vehicle is in a steady running state, namely, when the idling control valve 38 and the valve timing changing device 52 are in the normal states while the amount of change ΔTA of the throttle opening TA is substantially zero. If the predetermined vehicle condition is satisfied, step S81 is followed by step S82 to read the nominal compensating coefficient K1 calculated in step S75. Then, the control flow goes to step S83 to calculate a moving average KGn of a predetermined number of values of the compensating coefficient K which has been read in step S82 in the last successive cycles of execution. Step S83 is followed by step S84 to determine whether or not a predetermined updating condition is satisfied. The updating condition is satisfied, for example, when a difference |KG−KGn| between the currently effective control center value KG and the moving average KGn calculated in step S83 is larger than a predetermined threshold. If the updating condition is satisfied, step S85 is implemented to update the control center value KG. For instance, the control center value KG is updated by using the calculated moving average KGn as the effective control center value KG. However, it is preferable to update the control center value KG according to the following equation (2):

$$KG=KG+(KGn-KG)/2 \qquad (2)$$

It is noted that the control center value KG may vary depending upon the running condition of the vehicle such as the throttle opening TA, even if the predetermined vehicle condition is satisfied (even if an affirmative decision is obtained in step S81). Accordingly, it is desirable to modify the routine of FIG. 19 such that that different control center values KG corresponding to different running conditions of the vehicle are selectively used and updated, so that the appropriate control center value KG is used in step S77 depending upon the specific running condition, for suitably calculating the adjusted compensating coefficient MK.

In the present shift control apparatus using the equation (1) in step S77, the adjusted compensating coefficient MK is equal to the nominal compensating coefficient K1 calculated in step S75, when the adjusting coefficient KH is 1.0, namely, when the intake air quantity Qm is relatively large and the errors in the quantities Qm and Qc have a relatively small influence on the compensating coefficient K1. Accordingly, the transmission 68 may be suitably controlled, irrespective of the operating states of the valve 38 and valve timing changing device 50 or the atmospheric pressure.

When the intake air quantity Qm is relatively small, namely, when the errors in the quantities Qm and Qc have a relatively large influence on the nominal compensating coefficient K1, the adjusting coefficient KH is made smaller than 1.0, so that the amount of compensation |MK−KG| is reduced according to the adjusting coefficient KH, whereby the determinations in steps S7 and S12 are less likely to be influenced by the errors in the calculated intake air quantity Qc and the detected actual intake air quantity Qm.

In the present embodiment wherein the control center value KG is used to reduce the compensation amount |MK−KG| according to the adjusting coefficient KH, the adjusted compensating coefficient MK can be optimized regardless of the errors in calculating the quantity Qc and detecting the quantity Qm by the air flow meter 16, and the chronological changes of the control system. The use of the control center value KG permits suitable weighting of the nominal compensating coefficient K1 depending upon the intake air quantity Qm, and lowers the required accuracy of calculation of the required intake air quantity Qc and the required accuracy of detection of the actual intake air quantity Qm by the air flow meter 16. The control center value KG is calculated with higher precision based on the compensating coefficient K1 in the present embodiment, than in a case where the value KG is calculated based on the last adjusted compensating coefficient MK.

In the present sixth embodiment, steps S6 and S11 of FIG. 2 correspond to the compensating means, and steps S71–S75 correspond to coefficient calculating means for calculating the nominal compensating coefficient K1, while steps S76 and S77 correspond to adjusting means for adjusting the compensating coefficient K1 to obtain the adjusted compensating coefficient MK.

While the adjusting coefficient KH used in the fifth embodiment is determined according to the predetermined relationship of FIG. 20, on the basis of the detected actual intake air quantity Qm, the coefficient KH may be determined depending upon the calculated required intake air quantity Qc. Further, the relationship of FIG. 20 may be modified such that the coefficient KH is equal to zero when the intake air quantity Qm is smaller than predetermined value.

While the adjusted compensating coefficient MK is determined based on the control center value KG in the fifth embodiment, the value KG may be replaced by a value of 1.0, where the calculating and detecting errors in the quantities Qc and Qm and the errors due to the chronological changes of these values can be ignored.

In the fifth embodiment, the control center value KG is changed in increments of (KGn−KG)/2 according to the equation (2). However, (KGn−KG)/2 may be replaced by (KGn−KG)/3 or 2(KGn−KG)/3, or the control center value KG may be changed by a constant incremental value.

Referring next to FIG. 21, there will be described a seventh embodiment of the present invention, in which steps S91–S96 are substituted for steps S75–S77 of FIG. 18 in the preceding sixth embodiment. Namely, the routine of FIG. 21 is executed in place of the routine of FIG. 18, to obtain an adjusted compensating coefficient K3 which is used in steps S6 and S12 of FIG. 2, in place of the adjusted compensating coefficient MK used in the fifth embodiment.

In the routine of FIG. 21, too, steps S71–S74 are implemented as in the routine of FIG. 18. Step S74 is followed by step S91 to calculate a difference (Qc−Qm) between the calculated required intake air quantity Qc and the detected actual intake air quantity Qm. Step S91 is followed by step S92 to compare the calculated difference Qa with predetermined lower and upper limits $\alpha$ (<0) and $\beta$(>0). If $\alpha \leq Qa \leq \beta$, the control flow goes to step S93 to set the calculated value Qa as a compensating value X. If $Qa < \alpha$, the control flow goes to step S94 to set the lower limit $\alpha$ as the compensating value X. If $Qa > \beta$, the control flow goes to step S95 to set the upper limit B as the compensating value X. Steps S93–S95 are followed by step S96 to calculate the adjusted compensating coefficient K3 according to the following equation (3):

$$K3 = Qc/(Qm+X) \qquad (3)$$

Figure 22A:
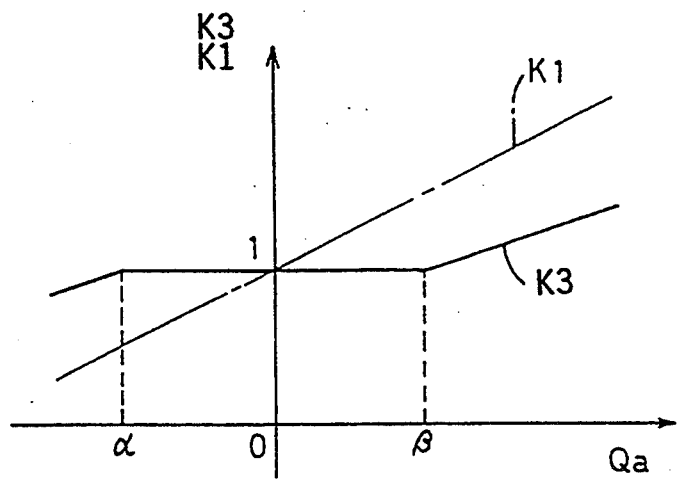
FIGS. 22(a) and 22(b) are graphs indicating differences between nominal and adjusted compensating coefficients K1 and K2 when the detected intake air quantity Qm is small and large.
Figure 22B:
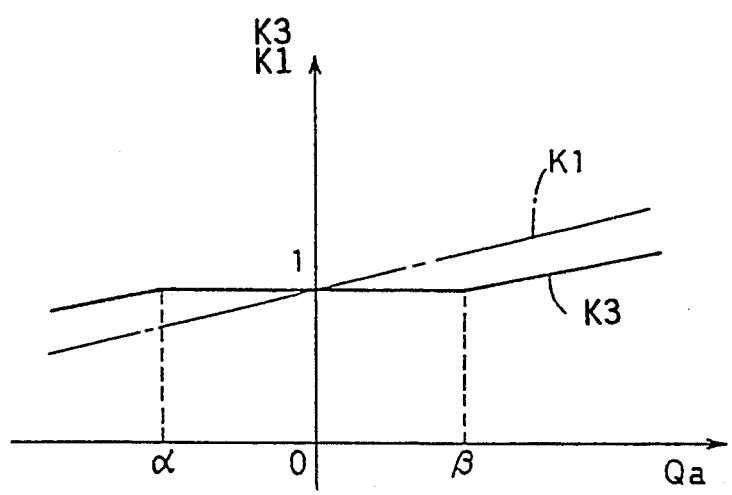

As indicated in FIGS. 22(a) and 22(b), the compensating coefficient K3 calculated in step S96 is close to the value of 1.0 than the nominal compensating coefficient K1 calculated in step S75 of FIG. 18 in the preceding sixth embodiment, irrespective of the actual intake air quantity Qm. Further, the difference $|K1-K3|$ indicated in FIG. 22(a) when the intake air quantity Qm is relatively large is larger that that indicated in FIG. 22(b) when the intake air quantity Qm is relatively small. In other words, the weight of the nominal compensating coefficient K1 (=Qc/Qm) is smaller when the intake air quantity Qm is relatively small, than when the intake air quantity Qm is relatively large. In this respect, it is noted that the coefficient K1 (=Qc/Qm) constitutes a portion of the adjusted compensating coefficient K3 which is equal to Qc/Qm+Qc/X, as is apparent from the above equation (3). In the present arrangement, therefore, the errors in the quantities Qc and Qm which affect the nominal compensating coefficient K1 have a reduced influence on the adjusted compensating coefficient K3, when the quantity Qm is relatively small. Thus, the present seventh embodiment has the same advantage as described with respect to the sixth embodiment of FIGS. 18–20.

It is also noted that the difference $|D1-K3|$ decreases as the absolute values of the lower and upper limits $\alpha$ and $\beta$ decrease. The lower and upper limits $\alpha$ and $\beta$ are determined from the desired difference $|K1-K3|$ when the actual intake air quantity Qm is relatively small.

In the present seventh embodiment, steps S71–S74 and S96 correspond to coefficient calculating means for calculating the nominal compensating coefficient K1=Qc/Qm, while steps S91–S96 correspond to adjusting means for adjusting the compensating coefficient K1 to obtain the adjusted compensating coefficient K3.

Although the compensating value X set in steps S93–S95 is added to the actual intake air quantity Qm to obtain a sum by which the required intake air quantity Qc is divided to calculate the adjusted compensating coefficient K3. However, a suitably determined value may be subtracted from the required intake air quantity Qc to obtain a difference which is to be divided by the actual intake air quantity Qm. Further, the nominal compensating coefficient K1 as calculated in step S75 may be used in the seventh embodiment, so that this nominal compensating coefficient K1 is adjusted into the adjusted compensating coefficient K3, depending upon the difference Qa.

Referring next to FIGS. 23–29, there will be described an eighth embodiment of this invention, which is identical with the first embodiment illustrated in FIGS. 2 and 3, except for the manner of obtaining the adjusted compensating coefficient MK used in steps S6 and S11 of FIG. 2. More specifically, the adjusted compensating coefficient MK used in the present eighth embodiment is obtained according to a routine as illustrated in the flow chart of FIG. 23.

Figure 23:
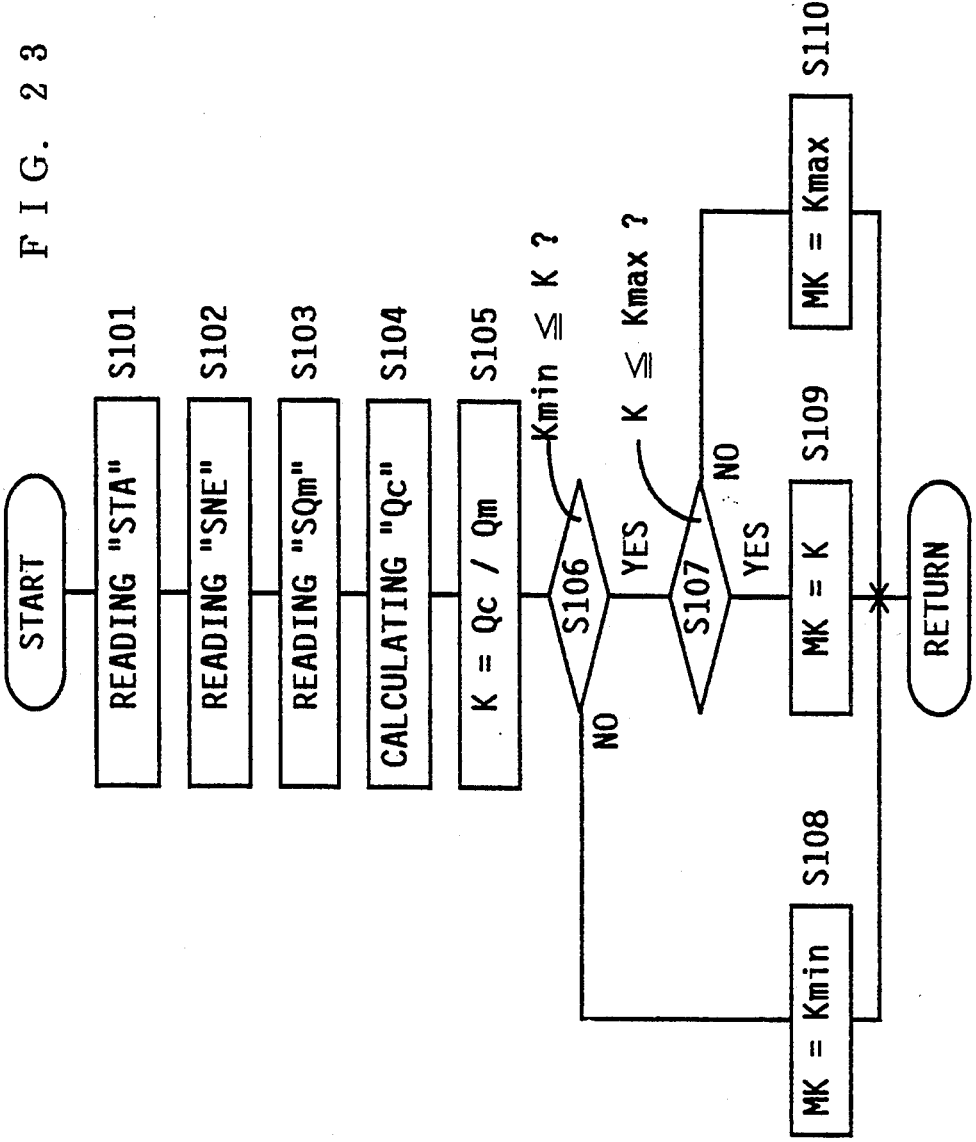
FIG. 23 is a flow chart illustrating a routine corresponding to that of FIG. 3, which is used in an eighth embodiment of the present invention.

Steps S101 through S105 of the routine of FIG. 23 are identical with steps S21 through S25 of the routine of FIG. 3. Step S105 is followed by steps S106–S110 to obtain the adjusted compensating coefficient MK in a manner different from that of FIG. 3.

As described above with respect to the first embodiment of FIGS. 2 and 3, if the shift-up and shift-down vehicle speeds Vu and Vd are compensated by merely multiplying these speed values Vu and Vd by the compensating coefficient K, the transmission 68 may suffer from busy shifting actions within a short period of time shortly after an abrupt or sudden change in the throttle opening TA, because of a sudden change in the compensating constant K which is equal to Qc/Qm, since the required intake air quantity Qc as calculated from the suddenly changing throttle opening TA abruptly changes, while the corresponding change in the actual intake air quantity Qm as detected by the air flow meter 16 is delayed. When the throttle opening TA abruptly increases as indicated in FIG. 29(d), the compensating coefficient K suddenly increases as indicated in one-dot chain line in FIG. 29(b), due to a sudden increase in the calculated required intake air quantity Qc as indicated in two-dot chain line in FIG. 29(c). As a result, the transmission 68 is shifted down from the 4th-speed position down to the 2nd-speed position, and then shifted up to the 4th-speed position, within a relatively short length of time, as indicated in one-dot chain line in FIG. 29(a).

For the above reason, steps S106–S110 are implemented to obtain the adjusted compensating coefficient MK, which is used in steps S6 and S11 of FIG. 2. Step 5106 is provided to determine whether or not the compensating coefficient K is equal to or larger than a preset minimum value Kmin. If the coefficient K is smaller than the minimum value Kmin, step S106 is followed by step S108 in which the minimum value Kmin is set as the adjusted compensating value MK. If the coefficient K is equal to or larger than the minimum value Kmin, step S106 is followed by step S107 to determine whether or not the coefficient K is equal to or smaller than a preset maximum value Kmax. If the coefficient K is larger than the maximum value Kmax, step S110 is implemented to set the maximum value Kmax as the adjusted compensating value MK. If the coefficient K is equal to or smaller than the maximum value Kmax, step S109 is implemented to set the coefficient K as the adjusted compensating coefficient MK. In other words, the coefficient K calculated in step S105 is used as the adjusted compensating coefficient MK, where Kmin≦K≦Kmax. Thus, the adjusted compensating coefficient MK changes over a range between the preset minimum and maximum values Kmin and Kmax. Namely, the present eighth embodiment is adapted to avoid a sudden or abrupt change in the adjusted compensating coefficient MK, due to a delayed change in the actual intake air quantity Qm with respect to the change in the throttle opening TA.

The minimum and maximum values Kmin and Kmax may be suitably determined constant values which are smaller and larger by suitable extra values than respective lower and upper limits which define a range in which the compensating coefficient K calculated in step S105 is expected to change due to changes in the operating states of the idling control valve 38 and valve timing changing device 52 and a change in the atmospheric atmosphere. However, it is desirable to determine the minimum and maximum values Kmin and Kmax according to the routine illustrated in FIG. 24, so that the amount of change ΔTA per unit time of the throttle opening TA is taken into consideration, so as to reflect the vehicle driver's desire to accelerate the vehicle. This routine of FIG. 24 is executed at the same cycle time as the routine of FIG. 23, and the minimum and maximum values Kmin and Kmax are updated at this cycle time.

Figure 24:
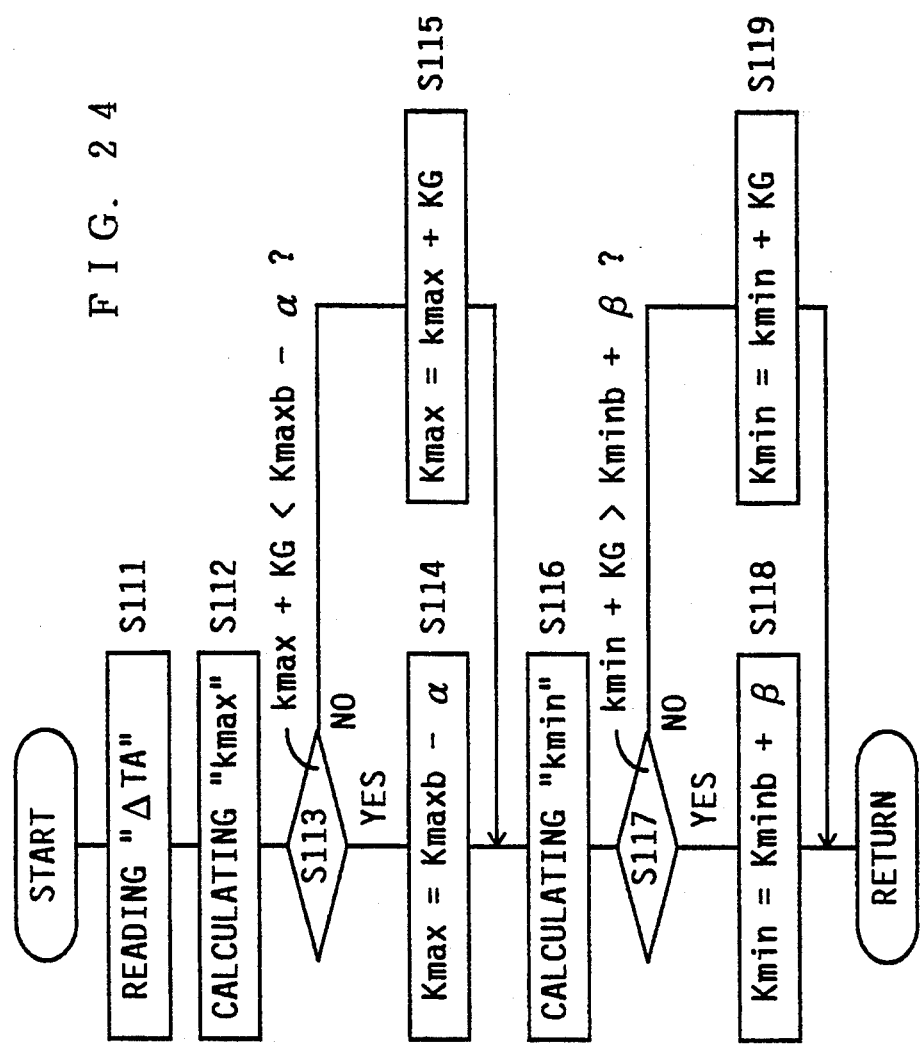
FIG. 24 is a flow chart illustrating a routine for obtaining a maximum value Kmax and a minimum value Kmin used in the routine of FIG. 23.
Figure 26:
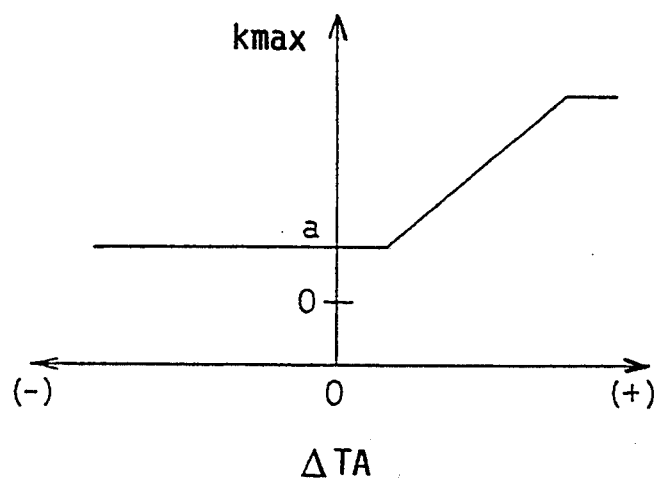
FIG. 26 is a graph showing a data map used in step S112 of the routine of FIG. 24, which represents a relationship for calculating a standard maximum value kmax from the amount of change ΔTA of the throttle opening TA.
Figure 29:
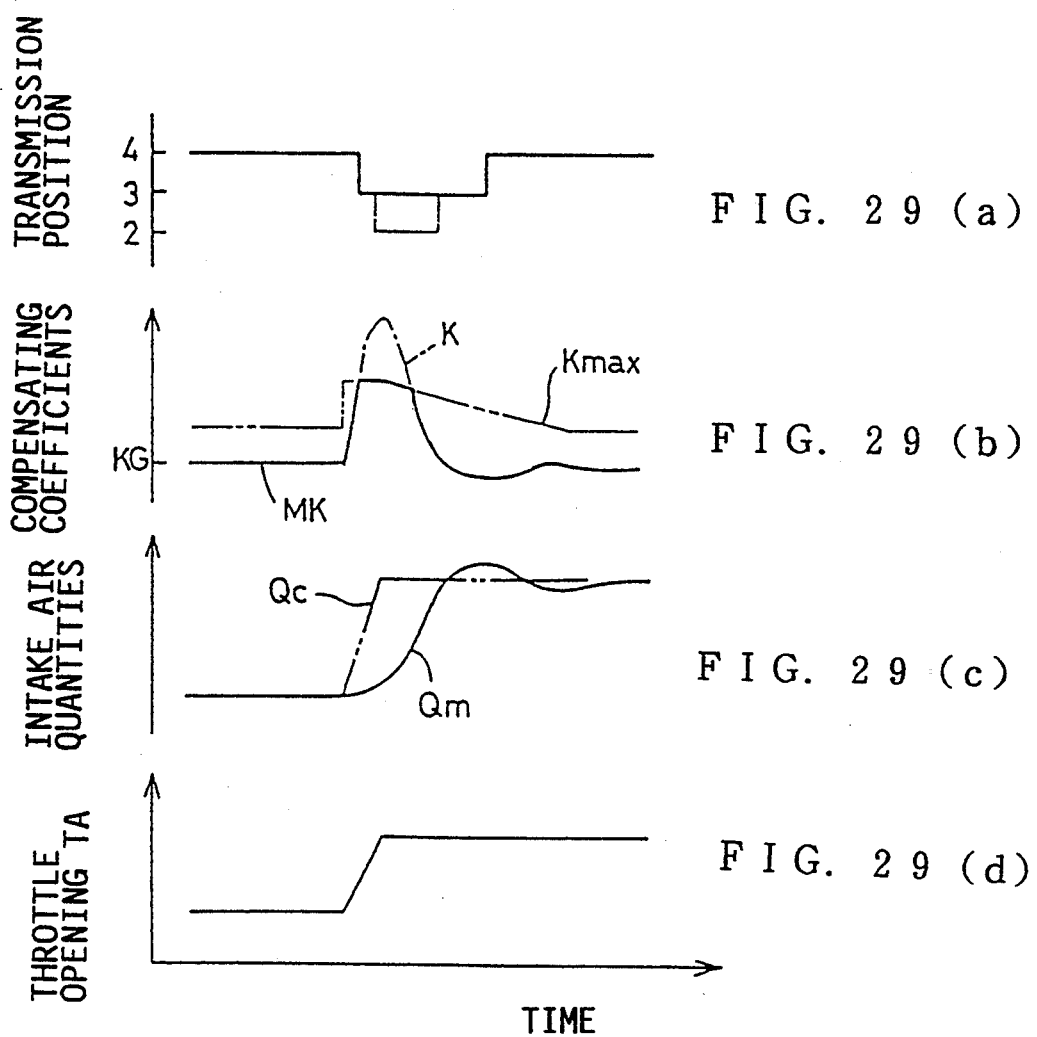
FIGS. 29(a), 29(b), 29(c) and 29(d) are timing chart graphs indicating changes in the selected operating position of the transmission, adjusted compensating coefficient MK, etc., upon an abrupt increase in the throttle opening TA, in the eighth embodiment.

The routine of FIG. 24 begins with step Sill to calculate the amount of change ΔTA of the throttle opening TA by calculating a difference (TA−TAb) between the current throttle opening TA and the last throttle opening TAb which are detected in the present and last cycles. Step S111 is followed by step S112 to calculate a standard maximum value kmax, according to a predetermined relationship as indicated in FIG. 26 represented by a data map stored in the ROM of the computer 34, and on the basis of the amount of change ΔTA calculated in step S111. The relationship of FIG. 26 is determined such that the standard maximum value kmax is equal to a constant value "a" larger than zero, when the amount of change ΔTA is smaller than a predetermined positive value close to zero, and such that the standard maximum value kmax increases with an increase in the amount of change ΔTA, when the amount of change ΔTA is larger than the above-indicated predetermined positive value. The constant value "a" is selected so as to permit the compensating coefficient K to change with the changes in the operating states of the idling control valve 38 and valve timing changing device 52 and the change in the atmospheric pressure. Step S112 is followed by step S113 to determine whether or not a value (kmax+KG) is smaller than a value (Kmaxb−α), where the value KG is the control center value KG as used in the sixth embodiment of FIGS. 18 and 19, and the value Kmaxb is the maximum value Kmax detected in the last cycle, while the value α is a constant positive value. If an affirmative decision (YES) is obtained in step S113, the control flow goes to step S114 in which the value (Kmaxb−α) is set as the maximum value Kmax. If a negative decision (NO) is obtained in step S113, the control flow goes to step S115 in which the value (kmax+KG) is set as the maximum value Kmax. Step S114 functions to reduce the Kmax at a rate corresponding to the constant value α, for preventing busy shifting actions of the transmission 68 due to increase and decrease of the adjusted compensating coefficient MK during a very short time duration, when the amount of change ΔTA of the throttle opening TA is substantially zeroed upon completion of the depressing movement of the accelerator pedal to a desired position, which immediately causes the standard value Kmax to return to a steady value, i.e., to (kmax+KG).

Steps S114 and S115 are followed by step S116 to calculate a standard minimum value kmin, according to a predetermined relationship as indicated in FIG. 27 represented by a data map stored in the ROM of the computer 34, and on the basis of the amount of change ΔTA calculated in step S111. The relationship of FIG. 27 is determined such that the standard minimum value kmin is equal to a constant value "b" smaller than zero, when the amount of change ΔTA is larger than a predetermined negative value close to zero, and such that the standard minimum value kmin decreases with a decrease in the amount of change ΔTA, when the amount of change ΔTA is smaller than the above-indicated predetermined negative value. The constant value "b" is also selected so as to permit the compensating coefficient K to change with the changes in the operating states of the idling control valve 38 and valve timing changing device 52 and the change in the atmospheric pressure. Step S116 is followed by step S117 to determine whether or not a value (kmin+KG) is larger than a value (Kminb+β), where the value K/minb is the minimum value Kmin detected in the last cycle, while the value β is a constant positive value. If an affirmative decision (YES) is obtained in step S117, the control flow goes to step S118 in which the value (Kminb+β) is set as the minimum value Kmin. If a negative decision (NO) is obtained in step S117, the control flow goes to step S119 in which the value (kmin+KG) is set as the minimum value Kmin. Step S118 functions to increase the Kmin at a rate corresponding to the constant value β, for preventing busy shifting actions of the transmission 68 due to increase and decrease of the adjusted compensating coefficient MK during a very short time duration, when the amount of change ΔTA of the throttle opening TA is substantially zeroed with the accelerator pedal returned to a desired position toward the non-operated position.

FIGS. 28(a) and 28(b) show changes of the maximum and minimum values Kmax, Kmin which are determined according to the routine of FIG. 24, and a change of the adjusted compensating coefficient MK whose change is restricted according to the routine of FIG. 23 in the present eighth embodiment of the invention. When the throttle opening TA increases with a positive amount of change ΔTA as shown in FIG. 28(b), to accelerate the vehicle, the maximum value Kmax instantaneously increases to thereby increase the adjusted compensating value MK to a level higher than the normal level, as indicated in FIG. 28(a), whereby the transmission 68 tends to be shifted down. When the throttle opening TA decreases with a negative amount of change ΔTA to decelerate the vehicle, the minimum value Kmin instantaneously decreases to thereby decrease the adjusted compensating value MK to a level lower than the normal level, as also indicated in FIG. 28(a), whereby the transmission 68 tends to be shifted up. As indicated in dashed lines in FIG. 28(a), the compensating value K (Qc/Qm) as calculated in step S105 of FIG. 23 considerably increases above the maximum value Kmax and considerably decreases below the minimum value Kmin, upon increasing and decreasing the throttle opening TA, respectively.

As described above with respect to the nominal compensating coefficient K1 used in the sixth embodiment of FIGS. 18–20, the control center value KG used in the routine of FIG. 24 is an average value of the compensating coefficient K when the idling control valve 38 and the valve timing changing device 52 are in the normal states, which are established when the air conditioner is off, for example. Basically, the average value of the compensating coefficient K is 1.0 with the calculated quantity Qc being equal to the detected quantity Qm. However, the calculated and detected quantities Qc and Qm are not always equal to each other, due to the calculating error of the quantity Qc and the detecting error of the quantity Qm by the air flow meter 16. Further, the quantities Qc and Qm may vary due to chronological changes of the various elements of the control system including the sensors. In view of this fact, the control center value KG is obtained according to the routine illustrated in FIG. 25, so that the maximum and minimum values Kmax and Kmin are determined based on the control center value KG.

Figure 25:
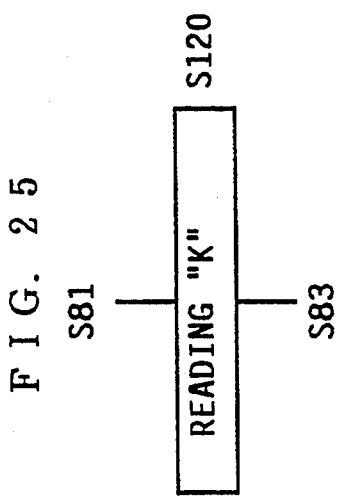
FIG. 25 is a fragmentary flow chart illustrating a routine similar to that of FIG. 19, for obtaining a control center value KG used in the routine of FIG. 24.

The routine of FIG. 25 is identical with the routine of FIG. 19, except for step S120 to calculate the compensating coefficient K, rather than the coefficient K1 calculated in step S82 of the routine of FIG. 19. As described above, the control center value KG is calculated according to the equation (2) given above.

As described above with respect to the sixth embodiment, the value $(KGn-KG)/2$ in the equation (2) may be replaced by $(KGn-KG)/3$ or $2(KGn-KG)/3$, for example.

In the shift control apparatus according to the present eighth embodiment, the compensating coefficient K is calculated from the calculated required intake air quantity Qc and the detected actual intake air quantity Qm, and the thus calculated compensating coefficient K is used as the adjusted compensating coefficient MK if the calculated coefficient K falls within the range between the maximum and minimum values Kmax and Kmin. The shift-up and shift-down vehicle speeds Vu, Vd are multiplied by the thus obtained adjusted compensating coefficient MK, to obtain the compensated shift-up and shift-down vehicle speeds MVu, MVd, in steps S6 and S11 of FIG. 2, so that the determinations in steps S7 and S12 are based on the obtained compensated shift-up and shift-down vehicle speeds MVu, MVd. Accordingly, the shifting of the transmission 68 can be optimally controlled, regardless of the operating conditions of the idling control valve 38 and valve timing changing device 52 and the varying atmospheric pressure.

If the compensating coefficient K calculated in step S105 is not within the range between the maximum and minimum values Kmax and Kmin, the maximum or minimum values Kmax, Kmin is used as the adjusted compensating coefficient MK. Accordingly, the adjusted compensating coefficient MK used to compensating the shift-up and shift-down vehicle speeds Vu, Vd changes over a relatively narrow range, preventing busy shifting actions of the transmission 68, even if the calculated compensating coefficient K abruptly changes due to the delayed change of the actual intake air quantity Qm upon sudden change in the throttle opening TA. The solid lines in FIGS. 29(a) and 29(b) indicate changes in the selected operating position of the transmission 68 and the adjusted compensating coefficient K, according to the present eighth embodiment of the invention, in which the transmission 68 is prevented to be shifted down to the 2nd-speed position.

Further, the maximum value Kmax is temporarily increased when the amount of change ΔTA of the throttle opening TA is relatively large, and is temporarily decreased when the amount of change ΔTA is relatively small. Thus, the maximum and minimum values Kmax and Kmin are determined so as to reflect the driver's desire to accelerate and decelerate the vehicle. If these values Kmax and Kmin are predetermined constant values, the driver's desire is not reflected on the manner of shifting the transmission 68.

In the present embodiment wherein the maximum and minimum values Kmax and Kmin are determined based on the control center value KG, the adjusted compensating coefficient MK is permitted to vary in response to the changes in the operating conditions of the idling control valve 38 and valve timing changing device 52 and the atmospheric pressure, irrespective of the errors in the calculated required intake air quantity Qc, detected actual intake air quantity Qm, and the chronological changes of the elements of the control system. This arrangement is also effective to reduce the required accuracy of calculation of the required intake air quantity Qc, and the required accuracy of detection of the actual air quantity Qm by the air flow meter 16.

In the present embodiment, steps S7 and S12 of FIG. 2 correspond to shift control means for automatically shifting the transmission 68, and steps S6 and S11 of FIG. 2 correspond to compensating means for compensating the shift-up and shift-down vehicle speeds Vu, Vd. Further, steps S101–S105 correspond to coefficient calculating means for calculating the compensating coefficient K, and steps S106 and S107 correspond to judging means for determining whether or not the compensating coefficient K is within a range between the maximum and minimum values Kmax and Kmin. Further, steps S108–S110 correspond to adjusting means for adjusting the compensating coefficient K to obtain the adjusted compensating coefficient MK.

Although the maximum and minimum values Kmax and Kmin are updated on the basis of the amount of change ΔTA in the eighth embodiment, these values Kmax and Kmin may be predetermined constant values. Alternatively, only the maximum value Kmax may be updated based on the amount of change ΔTA. Further, the maximum and minimum values Kmax and Kmin may be updated based on an operating parameter of the vehicle other than the amount of change ΔTA, such as Qc/NE.

While the maximum and minimum values Kmax and Kmin are decreased and increased by the decrement and increment values α and β in steps S114 and S117, respectively, it is possible to maintain these values Kmax and Kmin at values higher or lower than the normal value, until the amount of change ΔTA is changed from a negative value to a positive value or vice versa.

While the maximum and minimum values Kmax and Kmin are determined with the updated control center value KG used as a standard value, the control center value KG may be a predetermined value of 1.0, if the errors in the quantities Qc, Qm and the chronological changes of the control system can be ignored.

Figure 30:
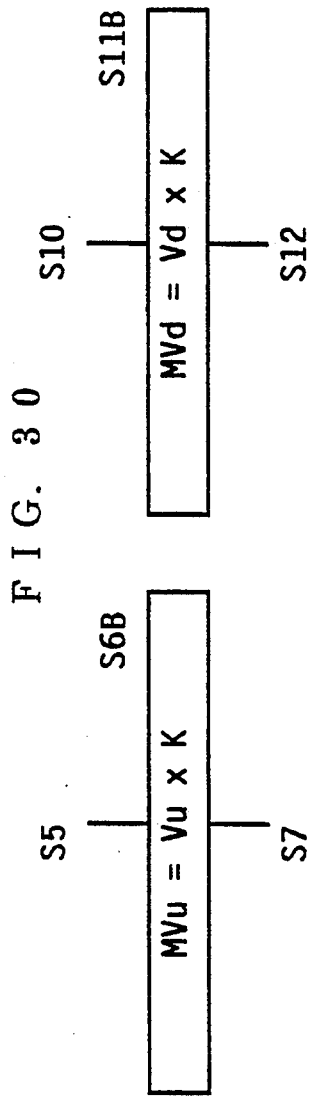
FIG. 30 is a fragmentary flow chart showing a shift control routine according to a ninth embodiment of the invention, which corresponds to that of FIG. 2 of the first embodiment.
Figure 31:
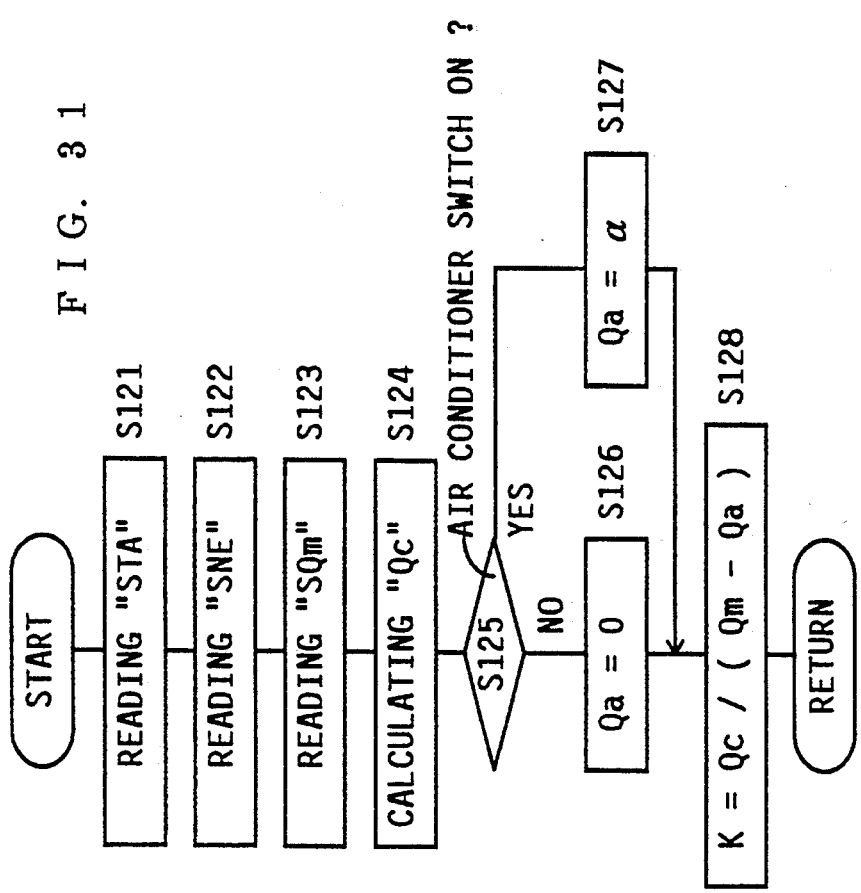
FIG. 31 is a flow chart corresponding to that of FIG. 3, which shows a routine for obtaining the compensating coefficient used in steps S6B and S11B of FIG. 30.
Figure 32:
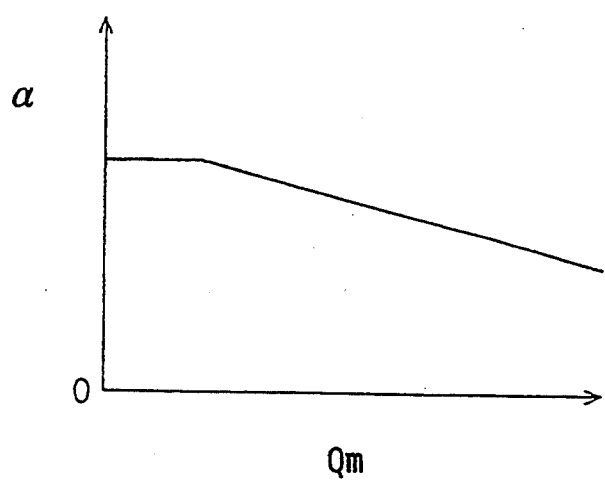
FIG. 32 is a graph indicating a data map representative of a relationship for determining an adjusting value α used in step S127 of the routine of FIG. 31.

Referring next to FIGS. 30-32, there will be described a ninth embodiment of this invention, which is identical with the first embodiment of FIGS. 2 and 3, except for steps S6B and S11B substituted for steps S6 and S11 of FIG. 2. In these steps S6B and S11B, the shift-up or shift-down vehicle speed Vu, Vd is multiplied by a compensating coefficient K to obtain the compensated shift-up or shift-down vehicle speed MVu, MVd. The compensating coefficient K is calculated according to a routine illustrated in FIG. 31.

Steps S121 through S124 of the routine of FIG. 31 are identical with steps S21-S24 of the routine of FIG. 2. Step S124 is followed by step S125 to determine whether or not the AIR CONDITIONER switch 65 is in the on state, namely, whether or not the air conditioner 64 is in operation. If the AIR CONDITIONER switch 65 is off, or if a negative decision (NO) is obtained in step S125, step S126 is implemented to reset an adjusting value Qa to zero. If the switch 65 is on, or if an affirmative decision (YES) is obtained in step S125, step S127 is implemented to set a decrement value $\alpha$ as the adjusting value Qa. This decrement value $\alpha$, which is a positive value, is a predetermined constant value, or calculated according to a predetermined relationship as indicated in FIG. 32 between the value $\alpha$ and the actual intake air quantity Qm, and on the basis of the actual intake air quantity Qm detected in step S123. The data map is stored in the ROM of the computer 34. The decrement value $\alpha$ used as the adjusting value Qa corresponds to a portion of the detected intake air quantity Qm which corresponds the amount of the output torque of the engine 10 consumed by the air conditioner 64.

Steps S126 and S127 are followed by step S128 in which the compensating coefficient K is calculated by dividing the required intake air quantity Qc calculated in step S124, by the value (Qm−Qa). As indicated above, the adjusting value Qa is equal to the decrement value $\alpha$ when the air conditioner 64 is in operation. This decrement value $\alpha$ serves to offset an amount of increase in the actual intake air quantity Qm which is caused by an increase in the idling speed of the engine 10 by activation of the idling control valve 38 for increasing the engine output torque by an amount consumed by the air conditioner 64.

As in the preceding embodiments, the compensating coefficient K is basically calculated from the calculated required intake air quantity Qc and the detected actual intake air quantity Qm, and is multiplied by the shift-up and shift-down vehicle speeds Vu, Vd, to obtain the compensated shift-up and shift-down vehicle speeds MVu, MVd which are used in steps S7 and S12 of FIG. 30 for determining the necessity of a shift-up action and a shift-down action of the automatic transmission 68, so that the transmission 68 is suitably shifted, irrespective of the operating states of the idling control valve 38 and valve timing changing device 52 and the varying atmospheric pressure.

The present ninth embodiment is further characterized by steps S125 and S127 for increasing the compensating coefficient K by subtracting the adjusting value Qa (=decrement value $\alpha$) from the detected intake air quantity Qm when the air conditioner 64 is turned or, that is, when the AIR CONDITIONER switch 65 is on. This arrangement prevents an unnecessary shift-up action of the transmission 68 due to an increase in the idling speed (NE) of the engine 10 when the idling control valve 38 is activated, namely, when the air conditioner 64 is turned on. Thus, the present shift control apparatus assures a high degree of drivability or accelerating function even when the air conditioner 64 is on.

In the present ninth embodiment, steps S6B and S11B correspond to compensating means for compensating the calculated shift-up and shift-down vehicle speeds Vu, Vd, and steps S121-S124 and S12B correspond to coefficient calculating means for calculating the compensating coefficient K. Further, step S125 corresponds to judging means for determining whether or not the air conditioner 64 is in operation, and S127 corresponds to adjusting means for adjusting the compensating coefficient K so that the shift control means is less likely to command the transmission to be shifted up, when the air conditioner 64 is in operation.

Although the ninth embodiment is adapted such that adjusting value Qa (decrement value $\alpha$) is subtracted from the detected actual intake air quantity Qm when the compensating coefficient K is calculated in step S128, the compensating coefficient K is first calculated, and is then adjusted by an adjusting value corresponding to the decrement value $\alpha$, when the air conditioner 64 is in operation. In this case, an adjusted compensating coefficient MK is obtained as in the first embodiment.

While the decrement value $\alpha$ is determined as a function of the detected actual intake air quantity Qm and according to the predetermined relationship as indicated in FIG. 32, the value $\alpha$ may be determined by other operating parameter or parameters of the vehicle according to a suitable predetermined relationship.

In the illustrated ninth embodiment, the decrement value $\alpha$ is subtracted from the detected actual intake air quantity Qm, a suitably determined adjusting value Qa may be added to the calculated required intake air quantity Qc, so as to increase the compensating coefficient K or adjusted compensating coefficient MK when the AIR CONDITIONER switch 65 is on.

There will next be described a tenth embodiment of the invention of this invention, wherein the compensating coefficient K used in steps S6B and S11b of FIG. 30 is calculated or determined according to a routine of FIG. 33, which is adapted to provide the shift control apparatus with a fail-safe function for assuring safe shifting actions of the transmission even in the even of any trouble that would otherwise adversely affects the compensating coefficient.

Figure 33:
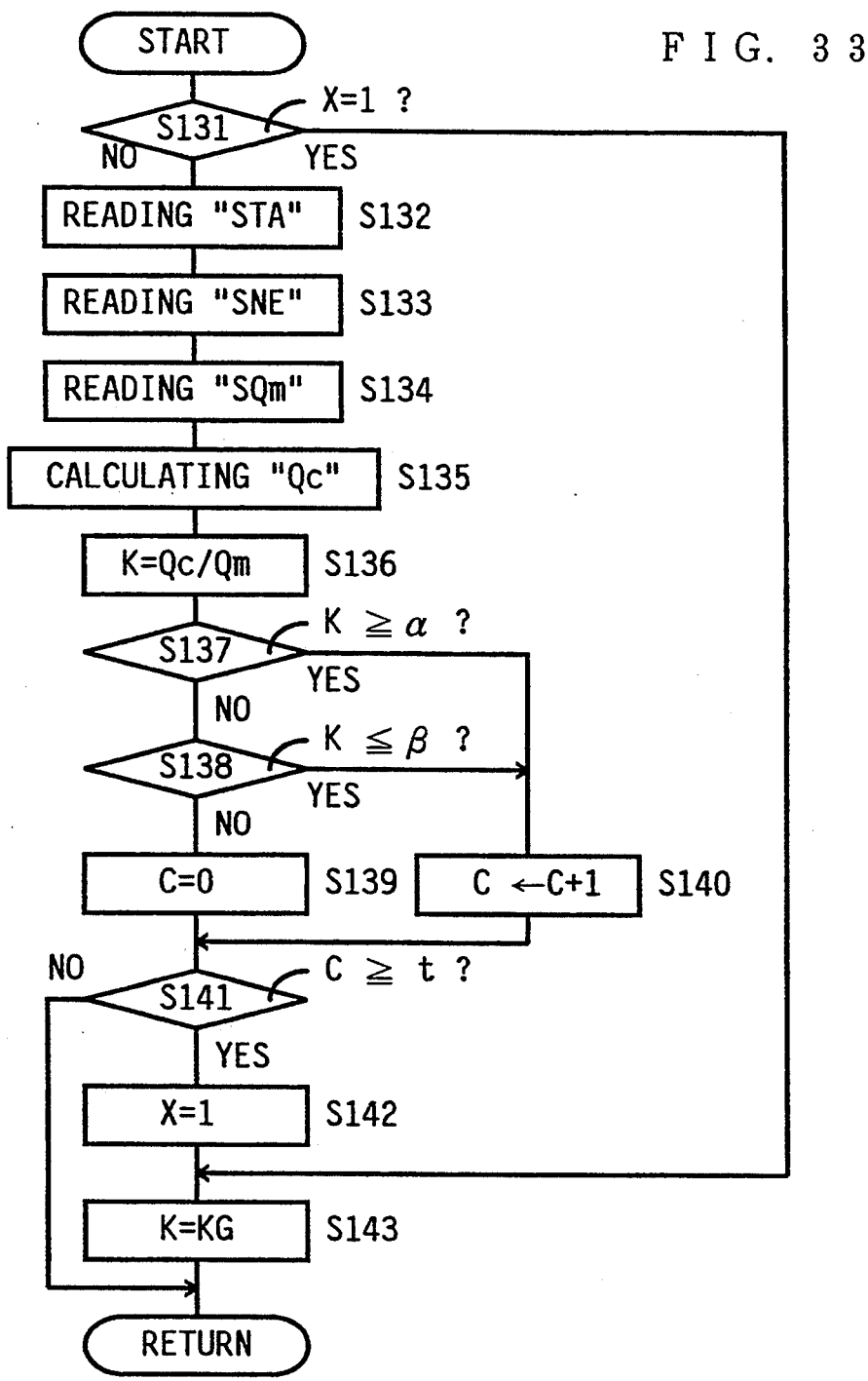
FIG. 33 is a flow chart illustrating a routine for obtaining the compensating coefficient K used in steps S6B and S11B of the routine of FIG. 30, according to a tenth embodiment of the invention.

The routine of FIG. 33 begins with step S131 to determine whether a DEFECT flag X is set at "1" or not. If this flag X is set at "1", this means that the compensating coefficient K as calculated in step S136 (which will be described) is abnormal due to any trouble of the control system including the various sensors such as the air flow meter 16 and throttle sensor 36. If a negative decision (NO) is obtained in step S131, the control flow goes to steps S132–S136 which are identical with steps S21–S25 of the flow chart of FIG. 3 of the first embodiment. Briefly, the compensating coefficient K is calculated in step S136 by dividing the calculated required intake air quantity Qc by the detected actual intake air quantity Qm.

Step S136 is followed by step S137 to determine whether or not the calculated compensating coefficient K is equal to or larger than a predetermined upper limit $\alpha$. If the compensating coefficient K is smaller than the upper limit $\alpha$, step S128 is implemented to determine whether or not the calculated compensating coefficient K is equal to or smaller than a predetermined lower limit $\beta$. If the compensating coefficient K is larger than the lower limit $\beta$, step S139 is implemented to reset a counter C to zero. If the compensating coefficient K calculated in step S136 is larger than the upper limit $\alpha$ or smaller than the lower limit $\beta$, the control flow goes to step S140 in which the counter C is incremented. The upper and lower limits $\alpha$ and $\beta$ are determined so as to define a range which is larger than a range over which the compensating coefficient K is normally expected to vary depending upon the operating states of the idling control valve 38 and valve timing changing device 52. Namely, the upper and lower limits a and $\beta$ are larger and smaller by suitable values than the corresponding upper and lower limits of the normal range of variation of the compensating coefficient K. Steps S139 and S140 are followed by step S141 to determine whether or not the count of the counter C is equal to or larger than a predetermined value "t". If the count exceeds this value "t", this means that the compensating coefficient K calculated in step S136 is held abnormal during a time duration long enough to judge that there occurred some trouble with the control arrangement for calculating the compensating coefficient K.

If the count of the counter C is smaller than the predetermined value "t", the control flow returns to step S131, and the routine of FIG. 33 is repeated. If the count has exceeded the predetermined value "t", this means that the coefficient K has been outside a predetermined range defined by the upper and lower limits $\alpha$ and $\beta$, for a sufficiently long time corresponding to the value "t". In this case, step S142 is implemented to set the DEFECT flag X to "1". Then, step S143 is implemented to set a reference value KG as the compensating coefficient K, and a suitable alarm is provided on the instrument panel in the driver's compartment of the vehicle, to inform the driver of the occurrence of some trouble with the control system.

The reference value KG, which is referred to as "control center value" in the sixth embodiment of FIGS. 18-20 and the eighth embodiment of FIGS. 23-29, is an average value of the compensating coefficient K when the idling control valve 38 and the valve timing changing device 52 are in the normal states, which are established when the air conditioner is off. As described above by reference to the flow charts of FIGS. 19 and 25, the reference value KG of the compensating coefficient K is theoretically equal to 1.0 with the calculated quantity Qc being equal to the detected quantity Qm. However, the calculated and detected quantities Qc and Qm are not always equal to each other, due to the calculating error of the quantity Qc and the detecting error of the quantity Qm by the air flow meter 16. Further, the quantities Qc and Qm may vary due to chronological changes of the various elements of the control system including the sensors. In view of this fact, the reference value KG is updated according to the routine illustrated in FIG. 25, which is identical with the routine of FIG. 19, except for step S120 which is substituted for step S82 in FIG. 19.

For easy understanding of the present tenth embodiment, the routine of FIG. 19 is reviewed. The routine of FIG. 19 is started with step S81 to determine whether or not a predetermined vehicle condition is satisfied. This vehicle condition is a condition for implementing the following steps S120 and S83–S85, and is satisfied, for example, when the vehicle is in a steady running state, namely, when the idling control valve 38 and the valve timing changing device 52 are in the normal states while the amount of change $\Delta TA$ of the throttle opening TA is substantially zero. If the predetermined vehicle condition is satisfied, step S81 is followed by step S120 to read the compensating coefficient K calculated in step S136 of the routine of FIG. 33. Then, the control flow goes to step S83 to calculate a moving average KGn of a predetermined number of values of the compensating coefficient K which has been read in step S136 in the last successive cycles of execution. Step S83 is followed by step S84 to determine whether or not a predetermined updating condition is satisfied. The updating condition is satisfied, for example, when a difference $|KG-KGn|$ between the currently effective control center value KG and the moving average KGn calculated in step S83 is larger than a predetermined threshold. If the updating condition is satisfied, step S85 is implemented to update the control center value or reference value KG according to the above equation (2).

Referring back to the flow chart of FIG. 33, the affirmative decision (YES) is obtained in step S131 once the DEFECT flag X is set to "1". Therefore, each time the routine of FIG. 33 is executed, step S143 is implemented to set the reference value KG as the compensating coefficient K, in the event the compensating coefficient K is kept abnormal for the time duration determined by the value "t". Accordingly, the reference value KG is used in steps S6B and S11B of the shift control routine of FIG. 30, whereby the transmission 68 is controlled as if the shift-up and shift-down vehicle speeds Vu, Vd calculated in steps S5 and S10 were not at all compensated. Thus, the abnormal compensating coefficient K would not affect the manner of control of the transmission 68.

It will be understood that the abnormality of the compensating coefficient K due to a trouble with the air flow meter 16 and/or throttle sensor 36, for example, can be detected by execution of steps S137, S138 and S141, which check to see if the calculated compensating coefficient K is outside the predetermined range (defined by the upper and lower limits $\alpha$ and $\beta$) for more than a predetermined time duration, namely, if the control arrangement including the air flow meter 16 and throttle sensor 36 used for calculating the coefficient K is defective. In the defective control arrangement is detected, the reference value KG as updated according to the routine of FIG. 25 is used as the compensating coefficient K, so that the transmission 68 is prevented from being controlled according to the abnormal compensating coefficient K. Thus, the shift control apparatus according to the present tenth embodiment of the invention has a fail-safe function, being capable of suitably controlling the transmission even in the event of a trouble with the control arrangement associated with the compensating coefficient K.

The use of the counter C whose count is compared with the predetermined value "t" assures high accuracy of detection of the abnormality of the compensating coefficient K. Further, the use of the reference value KG as the compensating coefficient K in the event of the abnormality permits suitable shift control of the transmission 68 in that event, regardless of the errors inevitably included in the calculated required intake air quantity Qc and the actual intake air quantity Qm detected by the air flow meter 16, and irrespective of the chronological changes of the elements of the control system.

In the present tenth embodiment, steps S6B and S11B of FIG. 30 correspond to the compensating means, and steps S132–S136 correspond to the coefficient calculating means. Further, steps S137, S138 and S141 correspond to judging means for determining whether the calculated compensating coefficient K is outside a predetermined range, and step S143 corresponds to coefficient changing means for replacing the calculated compensating coefficient K by the reference value KG.

The principle of the present tenth embodiment is also applicable to the other embodiments, for example, the first embodiment of FIGS. 1–7 in which the compensating coefficient K is adjusted to the adjusted compensating coefficient MK. In this case, it is possible that the compensating coefficient K is replaced by a reference value when the adjusted compensating coefficient MK has deviated from a predetermined range, and the abnormality of the coefficient K is judged to exist when the adjusted compensating coefficient MK has again deviated from the predetermined range. In this modified embodiment, the counter C is not used.

In the tenth embodiment, the upper and lower limits $\alpha$ and $\beta$ used in steps S137 and S138 are determined based on the expected range of variation of the compensating coefficient K due to the operating states of the idling control valve 38, valve timing changing device 52, etc. However, the upper and lower limits $\alpha$ and $\beta$ may be changed or updated depending upon the operating condition of the vehicle, such as the atmospheric pressure, accelerating/decelerating condition, turbocharging/non-turbocharging condition of the engine 10.

There will be described an eleventh embodiment of the present invention, by reference to FIGS. 34 and 35. This eleventh embodiment is identical with the first embodiment illustrated in FIGS. 2 and 3, except for the manner of obtaining the adjusted compensating coefficient MK used in steps S6 and S11 of FIG. 2. More specifically, the adjusted compensating coefficient MK used in the present eleventh embodiment is obtained according to a routine as illustrated in the flow chart of FIG. 34.

Figure 34:
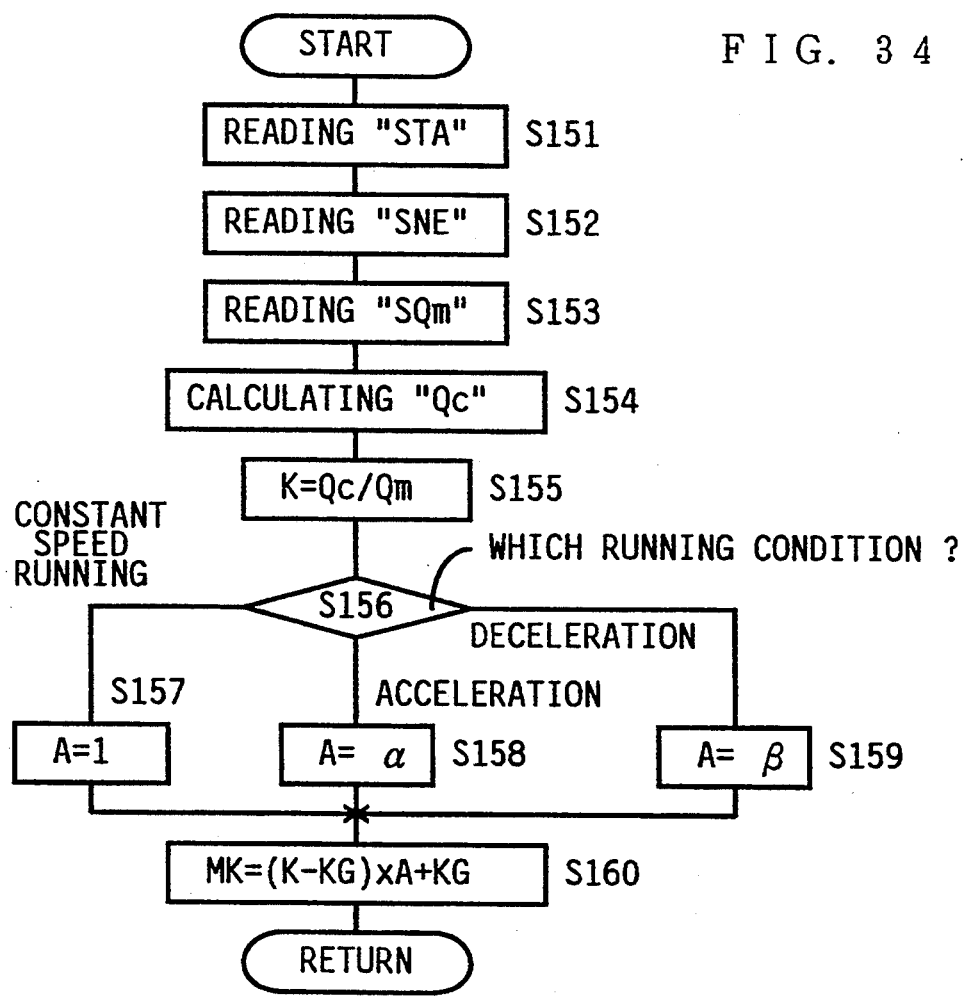
FIG. 34 is a flow chart illustrating a routine corresponding to that of FIG. 3, which is used in an eleventh embodiment of the invention, for obtaining the adjusted compensating coefficient MK.
Figure 35:
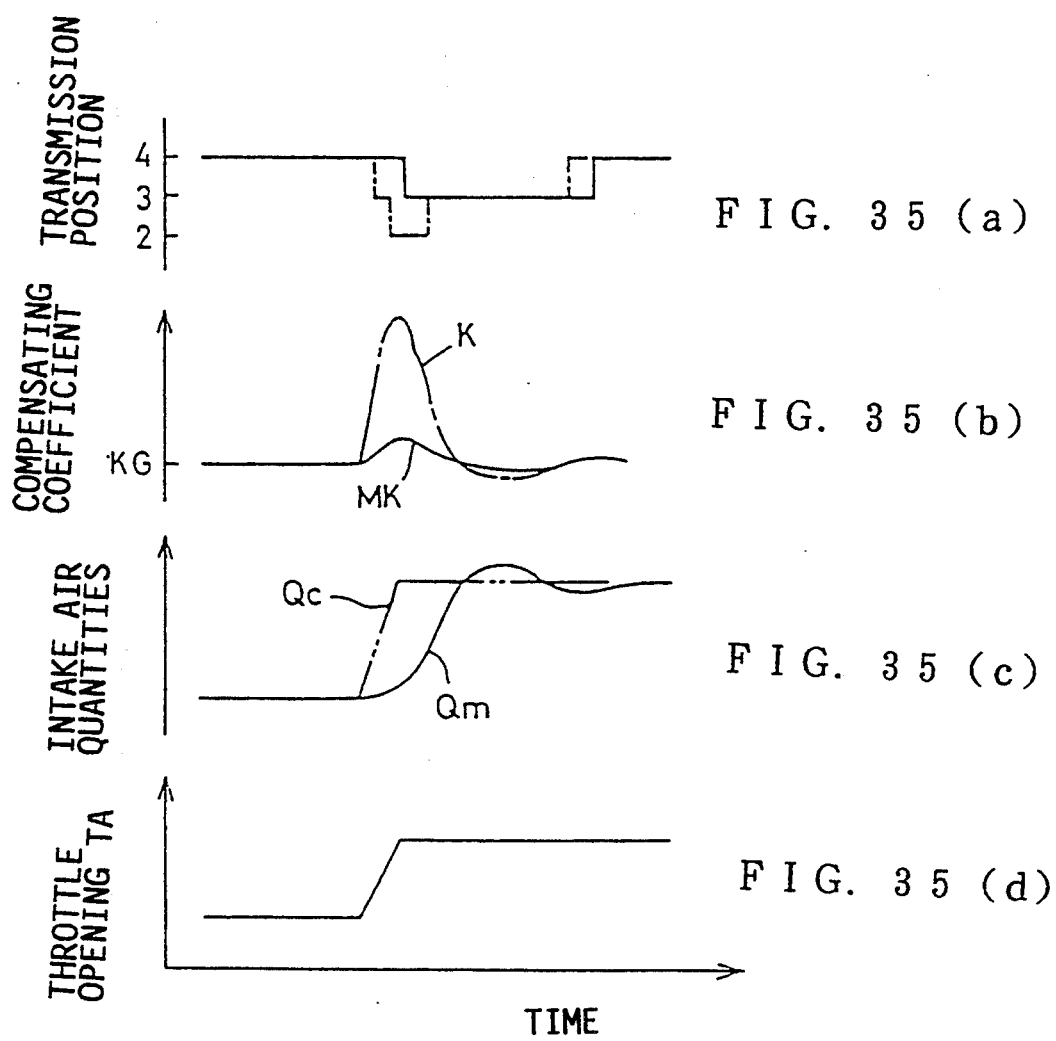
FIGS. 35(a), 35(b), 35(c) and 35(d) are timing chart graphs showing changes in the selected position of the transmission, compensating coefficient K, adjusted compensating coefficient MK, etc., in the eleventh embodiment.

Steps S151 through S155 of the routine of FIG. 34 are identical with steps S21 through S25 of the routine of FIG. 3. Step S155 is followed by steps S156–S160 to obtain the adjusted compensating coefficient MI in a manner different from that of FIG. 3.

As described above with respect to the first and eighth embodiments of FIGS. 2–3 and FIGS. 2 and 23, when the throttle opening TA abruptly increases as indicated in FIG. 35(d), the compensating coefficient K suddenly increases as indicated in one-dot chain line in FIG. 35(b), due to a sudden increase in the calculated required intake air quantity Qc as indicated in two-dot chain line in FIG. 35(c). As a result, the transmission 68 is shifted down from the 4th-speed position down to the 2nd-speed position, and then shifted up to the 4th-speed position, within a relatively short length of time, as indicated in one-dot chain line in FIG. 35(a).

For the above reason, steps S156–S160 are implemented to obtain the adjusted compensating coefficient MK, which is used in steps S6 and S11 of FIG. 2. Step S156 is provided to determine the current running state of the vehicle, namely, determine whether the vehicle is in a steady constant-speed running state, or in an accelerating or decelerating state. When the vehicle is running in the steady constant-speed running state at a substantially constant speed, step S157 is implemented to set a value of 1.0 as an adjusting coefficient A When the vehicle is in the accelerating state, step S158 is implemented to set a value $\alpha$ as the adjusting coefficient A. When the vehicle is in the decelerating state, step S159 is implemented to set a value $\beta$ as the adjusting coefficient A. The values $\alpha$ and $\beta$ are larger than 0 and smaller than 1.0. Steps S157–S159 are followed by step S160 to compensate the coefficient K, namely, to calculate the adjusted compensating coefficient MK according to the following equation (4):

$$MK = (K - KG) \times A + KG \qquad (4)$$

Steps S156 functions as a step for determining whether the compensating coefficient K calculated in step S155 has changed due to a delayed change in the detected actual intake air quantity Qm with respect to a change in the throttle opening TA. The determination in this step S156 may be effected based on an amount of change $\Delta TA$ of the throttle opening TA, which is a difference between the current throttle opening TA detected in the present cycle and the last throttle opening TA1 detected in the last cycle. If the absolute value $|\Delta TA|$ of this amount of change $\Delta TA$ continues to be equal to or smaller than a predetermined value "a" for more than a predetermined length of time, this means that the vehicle is in the steady constant-speed running state. If the amount of change $\Delta TA$ is larger than the predetermined positive value "a" this means that the vehicle is in the accelerating state. If the amount of change $\Delta TA$ is smaller than a predetermined negative value "a", this means that the vehicle is in the decelerating state. The vehicle is judged to be in the accelerating or decelerating state, until the absolute value $|\Delta TA|$ is kept equal to or smaller than the predetermined value "a" for more than the predetermined time. In other words, the absolute value $|\Delta TA|$ should be kept equal to or larger than the predetermined value "a" for more than the predetermined time, before step S157 is implemented. This is because the vehicle is still in the accelerating state with the intake air quantity Qm in the process of increasing, even after an increase in the throttle opening TA is terminated, as indicated in FIGS. 35(c) and 35(d). In this condition, the compensating value K obtained in step S155 cannot be suitably used as the adjusted compensating coefficient MK, and therefore the adjusting coefficient A should be not set at 1.0 in step S157.

The above equation (4) includes the control center value KG, which is also used in the sixth embodiment of FIG. 18 and eighth embodiment of FIGS. 23–29 and is obtained according to the routine of FIG. 25 and the above equation (2): $KG = KG + (KGn - KG)/2$. The control center value KG is an average value of the compensating coefficient K while the vehicle is running in the normal condition. The difference $(K - KG)$ is multiplied by the adjusting value A which is equal to the value $\alpha$ or $\beta$ depending upon the accelerating or decelerating state of the vehicle, so that the amount of compensation $|MK - KG|$ decreases at a predetermined rate determined by the value $\alpha$ or $\beta$.

The shift-up and shift-down vehicle speeds Vu, Vd are compensated to obtain the compensated shift-up and shift-down vehicle speeds MVu, MVd, by multiplying the speeds Vu, Vd by the adjusted compensating coefficient MK obtained according to the routine of FIG. 25. While the compensating coefficient K temporarily suddenly increases as indicated in FIG. 35(b) upon abrupt increase in the throttle opening TA, the adjusted compensating coefficient MK will not suddenly increase with the compensating coefficient K. Therefore, the present shift control apparatus makes it possible to prevent the otherwise possible busy shifting actions of the transmission 68 which involve the shift-down action to the 2nd-speed position as indicated in broken line in FIG. 35(a). The values $\alpha$ and $\beta$ used as the compensating value A may be substantially equal to each other. For increased drivability of the vehicle, it is desirable that the value $\alpha$ be larger than $\beta$ so that the transmission 68 is more likely to be shifted down and less likely to be shifted up. For improved fuel economy of the vehicle, it is desirable that the value $\alpha$ be smaller than the value $\beta$.

In the present shift control apparatus, the adjusting value A is set to be equal to 1.0 when the absolute amount of change $|\Delta TA|$ of the throttle opening TA is not larger than the predetermined value "a", namely, when the vehicle is in the steady constant-speed running state. In this case, the compensating coefficient K which is equal to Qc/Qm is used as the adjusted compensating coefficient MK, which is used to calculate the compensated shift-up and shift-down vehicle speeds MVu, MVd that are compared with the detected actual vehicle speed V, in order to determine the necessity of shifting up or down the transmission 68. Accordingly, the shifting of the transmission 68 will not be influenced by the operating states of the idling control valve 38 and valve timing changing device 52 or the varying atmospheric pressure.

When the value $|\Delta TA|$ is larger than the predetermined value "a" that is when the vehicle is in the accelerating or decelerating state, this means that the compensating coefficient K undesirably changes due to the delayed change in the actual intake air quantity Qm with respect to the change in the calculated required intake air quantity Qc. In this case, the difference between the adjusted compensating coefficient MK and the control center value KG, namely, the amount of compensation $|MK-KG|$ decreases at the predetermined compensating rate $\alpha$ or $\beta$ depending upon the accelerating or decelerating state of the vehicle. Thus, an increase in the adjusted compensating coefficient MK used to obtain the compensated shift-up and shift-down vehicle speeds MVu, MVd is prevented even when the compensating coefficient K considerably increases due to the delayed change in the actual intake air quantity Qm relative to the change in the calculated intake air quantity Qc upon abrupt change in the throttle opening TA. Therefore, the otherwise possible busy shifting actions of the transmission 68 can be avoided. Further, since the adjusting values $\alpha$ and $\beta$ are selectively used depending upon whether the vehicle is in the accelerating state or in the decelerating state, the shift-up and shift-down speeds Vu, Vd are compensated for only the delayed change in the actual intake air quantity Qm. The selective use of the compensating values $\alpha$ and $\beta$ assures optimum shift control of the transmission 68 depending upon the operating states of the idling control valve 38 and valve timing changing device 52.

In the present embodiment wherein the amount of compensating $|MK-KG|$ decreases with respect to the control center value KG, the adjusted compensating value MK can be held optimum irrespective of the calculating and detecting errors included in the calculated and detected quantities Qc, Qm and the chronological changes of the various elements of the control system. In other words, the required accuracy of calculation and detection of the quantities Qc, Qm is lowered.

In this respect, it is noted that the control center value KG can be calculated with higher precision where the value KG is obtained based on the compensating coefficient K, than where the value KG is obtained based on the adjusted compensating coefficient MK.

In the present eleventh embodiment of the invention, steps S7 and S12 of FIG. 2 correspond to the shift control means for shifting the transmission 68 according to the predetermined shift pattern (shift-up and shift-down boundary lines of FIGS. 4 and 5), and steps S151 through S155 correspond to the coefficient calculating means for calculating the compensating coefficient K. Further, steps S6 and S11 of FIG. 2 correspond to the coefficient compensating means for compensating the shift pattern (i.e., shift-up and shift-down vehicle speeds Vu, Vd determined by the shift-up and shift-down boundary lines and the detected throttle opening TA). Step S157 corresponds to the judging means whether the compensating coefficient (K) has changed or not, and steps S158–S160 correspond to the adjusting means for adjusting the compensating coefficient K to obtain the adjusted compensating coefficient MK, when said compensating coefficient has changed, such that the amount of compensation $|MK-KG|$ of the compensating coefficient K decreases at a predetermined rate determined depending upon whether the vehicle is in the accelerating or decelerating state.

While the eleventh embodiment is adapted such that the values $\alpha$ and $\beta$ are selectively used as the adjusting value A depending upon the accelerating or decelerating state of the vehicle, the adjusting value A may be changed depending upon whether the calculated compensating coefficient K is increasing or decreasing, or whether the engine is in the turbocharging state or in the non-turbocharging state. Further, a suitable adjusting value A may be selected from among a plurality of predetermined relationships which correspond to different running conditions of the vehicle.

Figure 36:
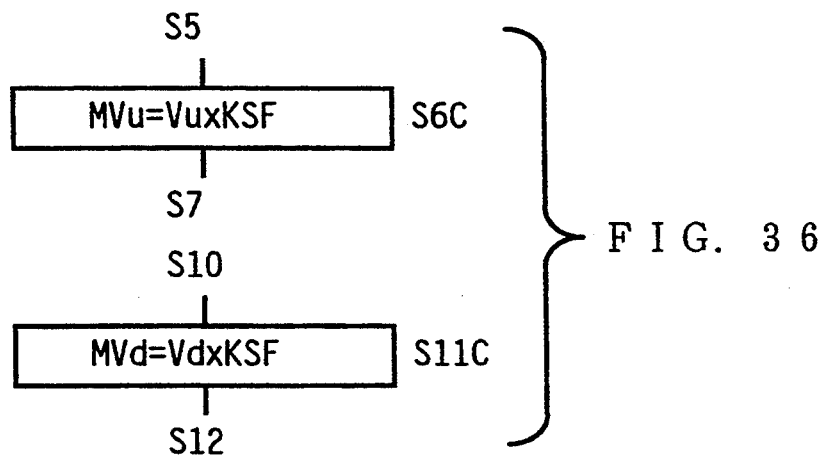
FIG. 36 is a fragmentary flow chart showing a shift control routine according to a twelfth embodiment of the invention, which corresponds to that of FIG. 2 of the first embodiment.

A twelfth embodiment of this invention will be described by reference to FIGS. 36–40. This embodiment is a modification of and an improvement over the fourth embodiment of FIGS. 12–14. Namely, steps S6C and S11C as shown in FIG. 36 are substituted for steps S6A and S11A of the shift control routine of FIG. 12, which in turn is identical with the shift control routine of FIG. 2, except for steps S6A and S11A.

In steps S6C and S11C, the shift-up and shift-down vehicle speeds Vu, Vd are multiplied by an effective compensating coefficient KSF to obtain adjusted shift-up and shift-down vehicle speeds MVu and MVd, respectively.

Figure 37:
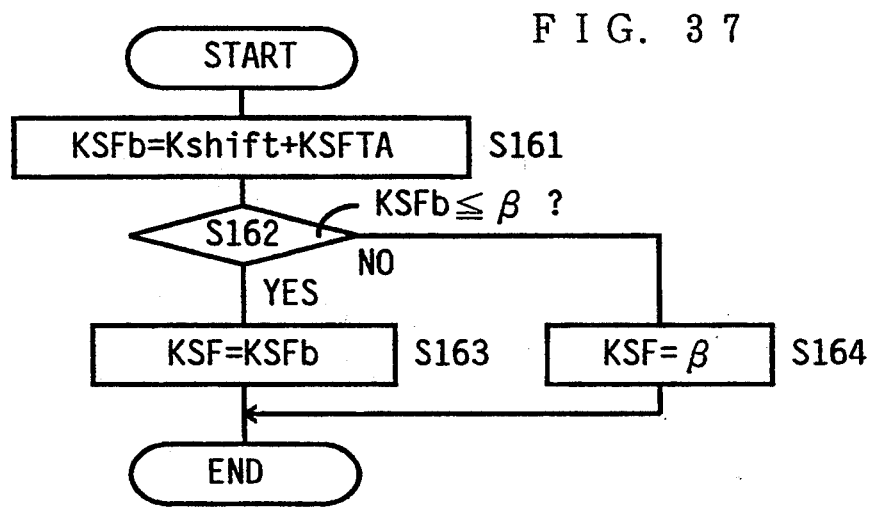
FIG. 37 is a flow chart illustrating a routine for obtaining a compensating coefficient KSF used in steps S6C and S12C of the routine of FIG. 36.

The effective compensating coefficient KSF is determined according to a routine illustrated in the flow chart of FIG. 37. This routine begins with step S161 in which a provisional compensating coefficient KSFb is calculated by adding a first compensating value Kshift to a second compensating value KSFTA. Step S161 is followed by step S162 to determine whether or not the provisional compensating coefficient KSFb is equal to or smaller than a predetermined upper limit $\beta$. This upper limit $\beta$ is a maximum permissible value of the effective compensating coefficient KSF above which the obtained compensated shift-up and shift-down vehicle speeds MVu, MVd are increased too much to permit the transmission to be shifted up even under the condition in which the transmission is allowed to be shifted down. In other words, the upper limit $\beta$ is a maximum permissible extent to which the transmission is likely to be shifted down as a result of compensation of the shift-down vehicle speed Vd by the effective compensating coefficient KSF.

If a negative decision (YES) is obtained in step S162, step S163 is implemented to set the provisional compensating coefficient KSFb as the effective compensating coefficient KSF used in steps S6C and S11C. If the KSFB is larger than the upper limit $\beta$, a negative decision (NO) is obtained in step S162, whereby step S164 is implemented to set the upper limit $\beta$ as the effective compensating coefficient KSF.

In the present twelfth embodiment, steps S6C and S11C correspond to the compensating means for compensating the shift-up and shift-down speeds Vu, Vd, and step S161 corresponds to determining means for determining the compensating coefficient KSFb. Further, step S162 corresponds to judging means for determining whether or not the compensating coefficient KSFb is larger than the predetermined upper limit $\beta$, and step S164 corresponds to coefficient changing means for replacing the compensating coefficient KSFb by the upper limit $\beta$.

Figure 38:
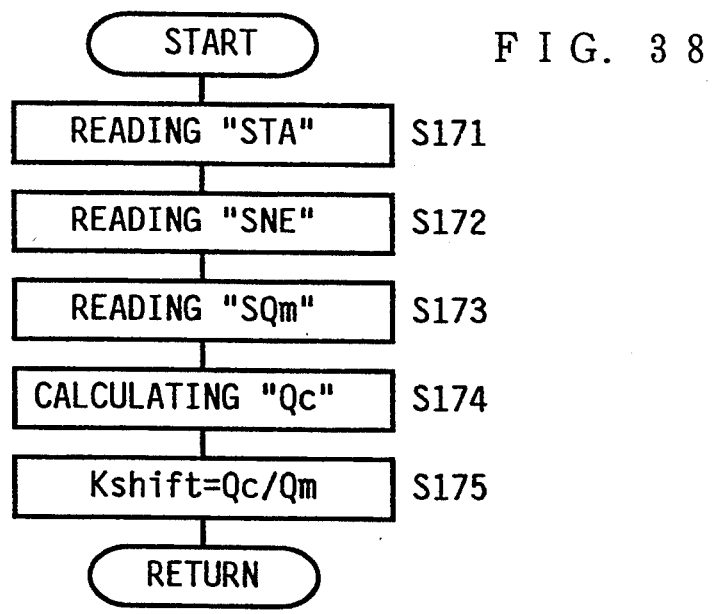
FIG. 38 is a flow chart illustrating a routine for obtaining a first compensating value Kshift used in step S161 of the routine of FIG. 36.
Figures 40A, 40B, 40C, 40D, 40E:
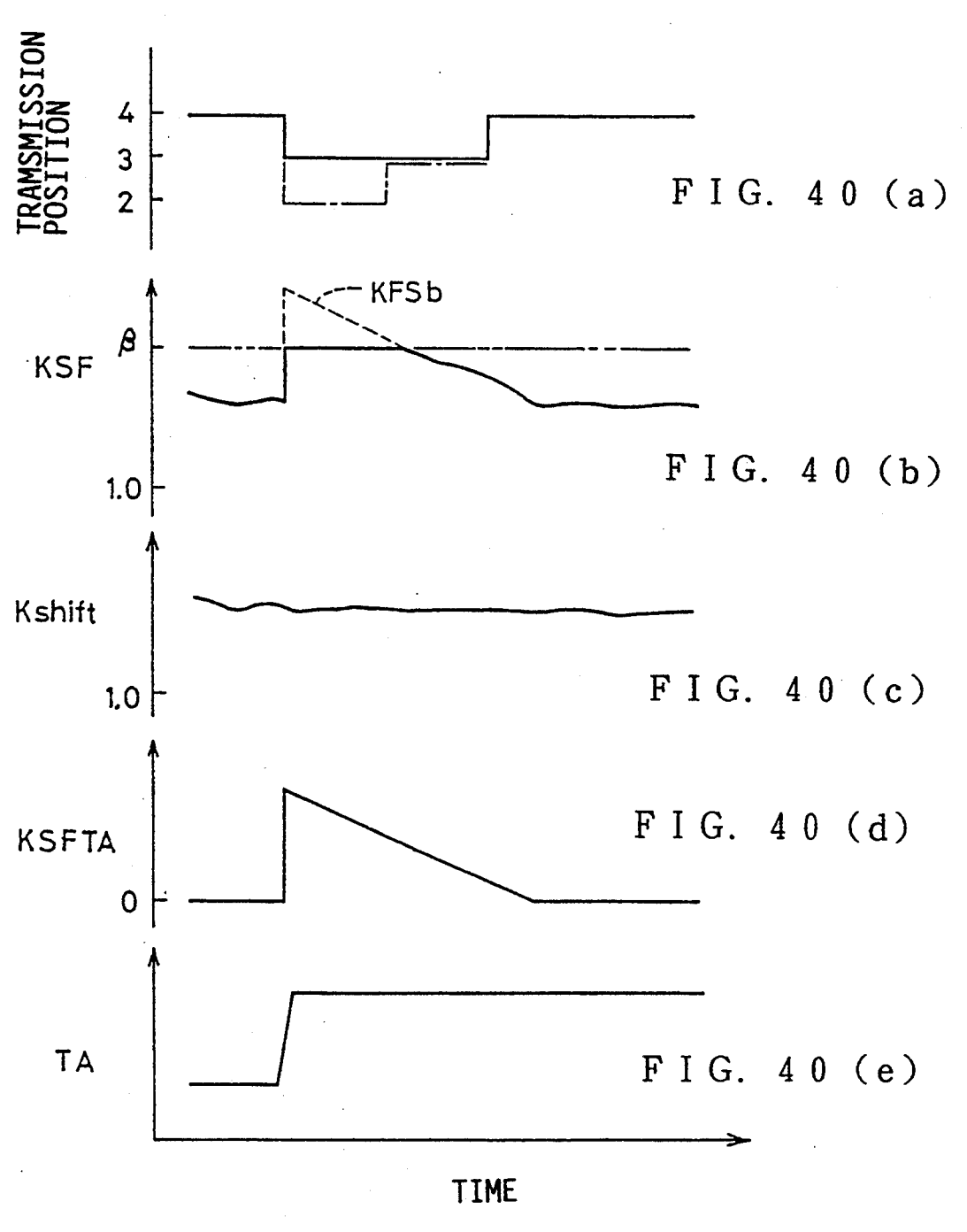

The first compensating value Kshift used in step S161 is determined according to a routine illustrated in FIG. 38, wherein steps S171–S174 are identical with steps S21–S24 of the routine of FIG. 3. Step S174 is followed by step S175 in which the first compensating value Kshift is calculated by dividing the calculated required intake air quantity Qm by the detected actual intake air quantity Qm. The first compensating value Kshift is substantially equal to 1.0 in the normal running condition of the vehicle, namely, when the idling control valve 38 and the valve timing changing device 52 are in the normal operating states and the atmospheric pressure is in the normal range. If, for example, the vehicle is running at a high altitude on a highland or plateau, the first compensating value Kshift is higher than 1.0, as indicated in FIG. 40(c), due to a low density of the ambient air, It is desirable that the actual intake air quantity Qm be detected without an influence of the air density.

It will be understood that the routine of FIG. 38 corresponds to first determining means for determining the first compensating value Kshift.

Figure 39:
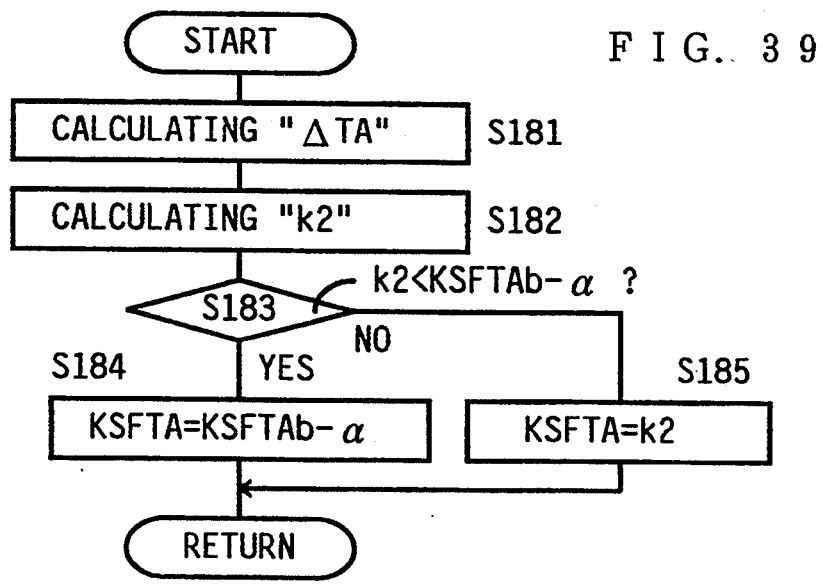
FIG. 39 is a flow chart illustrating a routine for obtaining a second compensating value KSFTA used in the step S161.

The second compensating value KSFTA also used in step S161 is determined according to a routine illustrated in the flow chart of FIG. 39, such that the effective compensating coefficient KSF increases with the extent to which the driver desires to accelerate the vehicle, so that the transmission 68 is likely to be shifted down as needed depending upon the driver's desire for the vehicle acceleration. The routine of FIG. 39 begins with step S181 to calculate the amount of change $\Delta TA$ of the throttle opening TA. Step S181 is followed by step S182 to calculate a provisional value k2 according to a predetermined relationship as shown in FIG. 15, and on the basis of the calculated amount of change $\Delta TA$ of the throttle opening TA. As described by reference to FIG. 15, the relationship is determined so that the provisional value k2 is zero (0) when the amount of change $\Delta TA$ is smaller than a given value, and increases as the amount of change $\Delta TA$ increases, as indicated in FIG. 15. Step S182 is followed by step S183 to compare the calculated provisional value k2 with a value (KSFTAb$-\alpha$), which is equal to the last second compensating value KSFTA read in the last cycle, minus a predetermined value $\alpha$. If the provisional value k2 is smaller than (KSFTAb$-\alpha$), step S183 is followed by step S184 to set the value (K2b$-\alpha$) as the effective second compensating value KSFTA. If the provisional value k2 calculated in step S182 is equal to or larger than the value (KSFTAb$-\alpha$), step S183 is followed by step S185 to set the provisional value k2 calculated in step S182, as the effective second compensating value KSFTA. According to the relationship of FIG. 15, the provisional value k2 calculated in step S182 becomes zero when the amount of change $\Delta TA$ is reduced to a value close to zero as a result of completion of depressing movement of the accelerator pedal. Even after the accelerator pedal has been operated to a desired position, the driver's desire to accelerate the vehicle is considered to remain. Steps S183–S185 are provided to reflect this continuing desire of the driver, on the second compensating value KSFTA, even after the amount of change $\Delta TA$ is zeroed. Namely, the second compensating value KSFTA is decremented by the suitable amount $\alpha$, to smoothly or gradually reduce the value KSFTA as shown in FIG. 20(d), after the amount of change $\Delta TA$ is zeroed, that is, after the accelerator pedal has been depressed to the desired position.

It will be understood that the routine of FIG. 39 corresponds to second determining means for determining the second compensating value KSFTA.

A sum of the first and second compensating values Kshift and KSFTA determined as described above is obtained as the provisional compensating coefficient KSFb in step S161, and the sum is compared with the predetermined upper limit $\beta$. If the sum KSFb is larger than the upper limit $\beta$, this upper limit $\beta$ is set in step S164 as the effective compensating coefficient KSF. According to this arrangement, when the driver depresses the accelerator pedal to increase the throttle opening TA as indicated in FIG. 40(e), for accelerating the vehicle while the transmission 68 is placed in the 4th-speed position, for example, the transmission 68 is first shifted down to the 3rd-speed position and is subsequently shifted up to the 4th-speed position, as indicated by solid line in FIG. 40(a). The transmission is held in the 3rd-speed position for a time corresponding to the degree of the driver's desire to accelerate the vehicle. If the effective compensating coefficient KSF were not limited to the upper limit $\beta$, the provisional compensating coefficient KFSb which rises far above the upper limit $\beta$ as indicated by dashed line in FIG. 40(b) would be used to compensate the shift-down vehicle speed Vd, and as a result, the transmission 68 would be shifted from the 4th-speed position down to the 2nd-speed position as indicated by one-dot chain line in FIG. 40(a). This shift-down action is beyond the driver's desire for the vehicle acceleration as expressed by the throttle opening TA, and may deteriorate the driving comfort and fuel economy of the engine 10.

The present twelfth embodiment is arranged in the light of the phenomenon which occurs where the vehicle is running at a high altitude. Namely, when the accelerator pedal is depressed while the vehicle is running on a highland, both of the first compensating value Kshift and the second compensating value KSFTA are increased, so that the transmission 68 is excessively likely to be shifted down. In the present embodiment, however, the provisional compensating coefficient KSFb which is the sum of the first and second compensating values Kshift and KSFTA is not used as the effective compensating value KSF if the provisional compensating coefficient KSFb is larger than the predetermined upper limit $\beta$, but this upper limit is used as the effective compensating coefficient KSF. Therefore, the shifting of the transmission 68 can be suitably controlled depending upon a change in the actual intake air quantity Qm, and so as to reflect the driver's desire for accelerating the vehicle, without excessive compensation of the shift-up and shift-down vehicle speeds Vu, Vd, which deteriorates the vehicle driving comfort and the fuel economy of the engine 10.

Although the INTAKE AIR QUANTITY signal SQm received from the air flow meter 16 is used in step S173 to detect the actual intake air quantity Qm for calculating the first compensating value Kshift in step S175, the intake air quantity Qm as detected by the air flow meter 16 may be suitably compensated for a delayed change in the air quantity as introduced into the combustion chamber 10 of the engine 10, with respect to a change in the air quantity at the air flow meter 16, so that the first compensating value Kshift is obtained based on the thus compensated intake air quantity Qm.

In the illustrated twelfth embodiment, the provisional compensating coefficient KSFb is obtained by summing the first and second compensating values Kshift and KSFTA. However, compensating values depending upon the other operating parameters of the vehicle may be added to these first and second compensating values Kshift, KSFTA to obtain the provisional compensating coefficient KSFb. Further, the provisional compensating coefficient KSFb may be obtained by multiplying the first compensating coefficient Kshift by the second compensating coefficient KSFTA. In this instance, the second compensating coefficient KSFTA is determined so that its average or center value is equal to 1.0.

Although the upper limit $\beta$ used in the illustrated twelfth embodiment is the maximum permissible value of the compensating coefficient KSF above which the transmission 68 is excessively likely to be shifted down. However, the upper limit $\beta$ may be determined or modified depending upon the other factors such as the gradient of the road surface, steering angle, on/off state of the air conditioner, and turbocharging/non-turbocharging condition of the engine 10.

Figure 41:
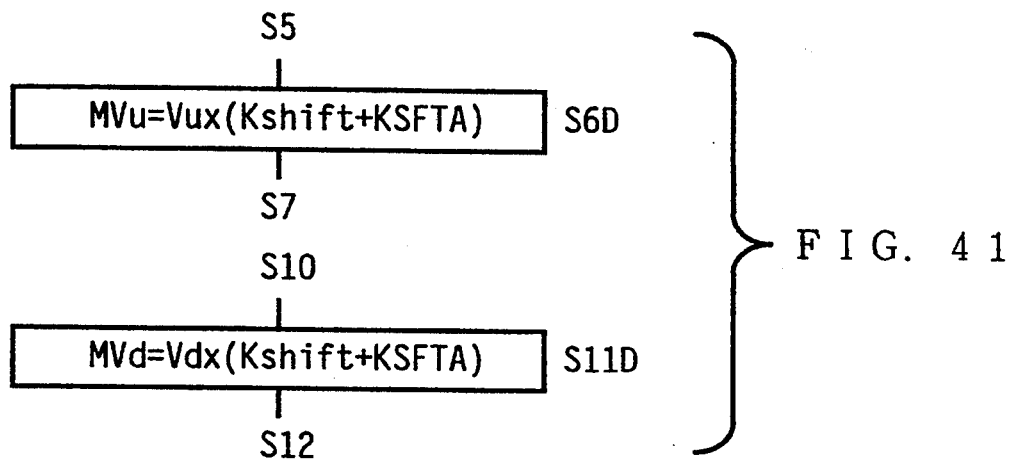
FIG. 41 is a fragmentary flow chart showing a shift control routine according to a fifteenth embodiment, which corresponds to that of FIG. 2 of the first embodiment.

Referring to FIGS. 41–44, there will be described a thirteenth embodiment of this invention, which is identical with the fourth embodiment, except for steps S6D and S11D indicated in FIG. 41, which are substituted for steps S6A and S11D of FIG. 12 of the fourth embodiment. In the steps S6D and S11D, the shift-up or shift-down vehicle speed Vu, Vd is multiplied by a compensating coefficient (Kshift+KSFTA), wherein Kshift is a first compensating value while KSFTA is a second compensating value. The first compensating value Kshift (=Qc/Qm) is calculated as illustrated in FIG. 38 of the preceding twelfth embodiment and has the same functional meaning as the first compensating value K1 used in the fourth embodiment.

Figure 42:
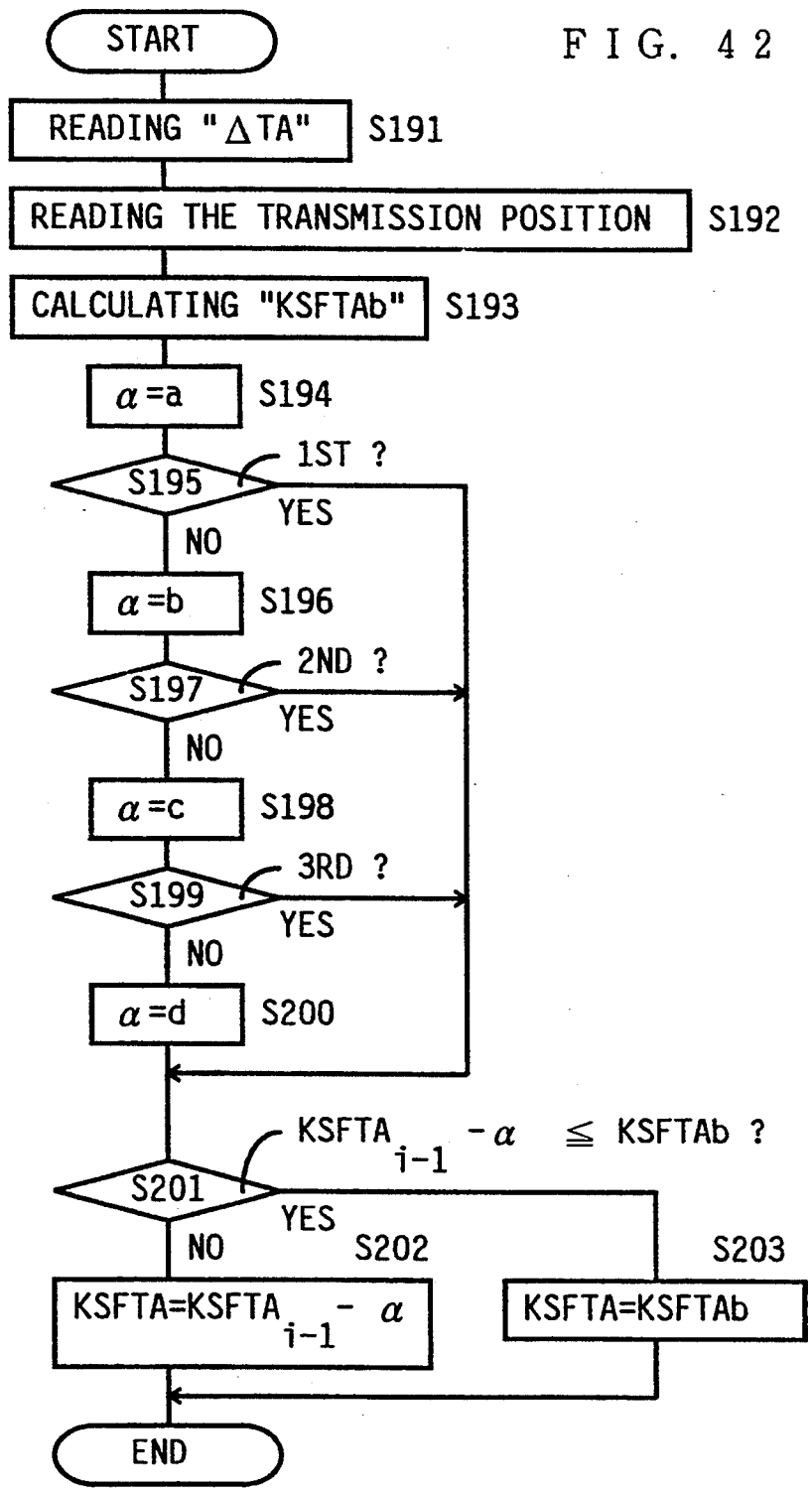
FIG. 42 is a flow chart illustrating a routine for calculating a compensating coefficient KSFTA used in steps S6D and S11D of FIG. 41.

The second compensating value KSFTA of the compensating coefficient (Kshift+KSFTA) is provided to increase the compensating coefficient (K1+K2) so that the transmission is likely to be shifted down in response to the driver's desire to accelerate the vehicle. The second compensating value KSFTA is calculated according to a routine illustrated in FIG. 42, for example. This second compensating value KSFTA is updated by execution of the routine of FIG. 42 with the same cycle time as that of the routine of FIG. 41. In the routine of FIG. 42, step S191 is initially implemented to calculate the amount of change $\Delta$TA of the throttle opening TA, in the same manner as described with respect to step S61 of FIG. 14 of the fourth embodiment. The amount of change $\Delta$TA=TA−TAb is considered to represent the degree in which the vehicle driver desires to accelerate the vehicle.

Figure 43:
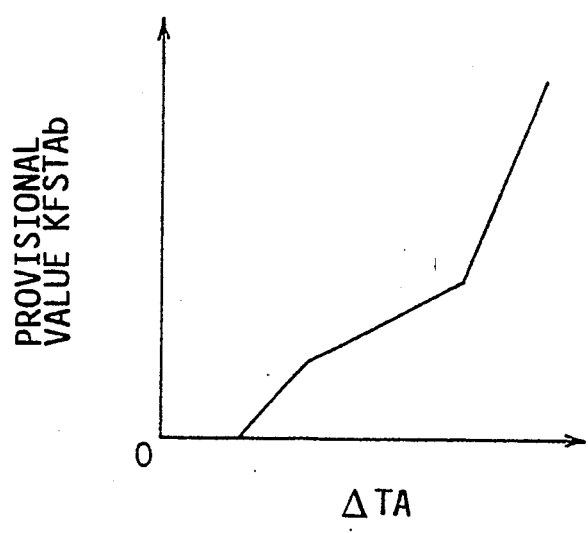
FIG. 43 is a graph showing a data map used in step S193 of the routine of FIG. 42, which represents a relationship for calculating a compensating value KSFTAb from the amount of change Δ TA of the throttle opening TA.

Step S191 is followed by step S192 to read the GEAR POSITION signal SG from the transmission position sensor 70, to detect the currently selected position of the automatic transmission 68. The control flow then goes to step S193 in which a provisional value KSFTAb according to a predetermined relationship as indicated in FIG. 43 between the provisional value KSFTAb and the amount of change $\Delta$TA of the throttle opening TA, and on the basis of the detected amount of change $\Delta$TA. This relationship, which is represented by a data map stored in the ROM of the computer 34, is determined such that the value KSFTAb is substantially zero when the amount of change $\Delta$TA is smaller than a predetermined positive value relatively close to zero, and such that the amount of change $\Delta$TA increases as the amount of change $\Delta$TA increases from the predetermined positive value.

Step S193 is followed by step S194 to set a value "a" as a decrement amount $\alpha$. Then, step S195 is implemented to determine whether or not the transmission 68 is currently placed in the 1st-speed position. If an affirmative decision (YES) is obtained in step S195, step S201 is implemented. If a negative decision (NO) is obtained in step S195, step S196 is implemented to set a value "b" as the decrement amount $\alpha$. Step S196 is followed by step S197 to determine whether or not the transmission 68 is placed in the 2nd-speed position. If an affirmative decision (YES) is obtained in step S197, step S201 is implemented. If a negative decision (NO) is obtained in step S197, step S198 is implemented to set a value "c" as the decrement amount $\alpha$. Step S198 is followed by step S199 to determine whether or not the transmission 68 is placed in the 3rd-speed position. If an affirmative decision (YES) is obtained in step S199, step S201 is implemented. If a negative decision (NO) is obtained in step S199, step S200 is implemented to set a value "d" as the decrement amount $\alpha$.

Step S201 is provided to determine whether or not the calculated provisional value KSFTAb is equal to or larger than a value (KSFTA$_{i-1}$−$\alpha$), where the value KSFTA$_{1-1}$ is the second compensating value KSFTA calculated in the last execution of step S202 or S203 described below. If a negative decision (NO) is obtained in step S201, namely, if the provisional value KSFTAb is smaller than the value (KSFTA$_{i-1}$−$\alpha$), step S202 is executed to set the value (KSFTA$_{i-1}$−$\alpha$) as the second compensating value KSFTA. That is, the second compensating value KSFTA is updated by decrementing the last value KSFTA$_{i-1}$ by the decrement amount $\alpha$. If an affirmative decision (YES) is obtained in step S201, namely, if the provisional value KSFTAb is equal to or larger than the value (KSFTA$_{i-1}$−$\alpha$), step S203 is executed to set the provisional value KSFTAb as the second compensating value KSFTA. According to the relationship of FIG. 43, the value value KSFTA calculated in step S193 becomes zero when the amount of change $\Delta$TA is reduced to the predetermined positive value close to zero as a result of completion of depressing movement of the accelerator pedal. Even after the accelerator pedal has been operated to a desired position, the driver's desire to accelerate the vehicle is considered to remain. Steps S201−S203 are provided to reflect this continuing desire of the driver, on the second compensating value KSFTA, even after the amount of change ΔTA is zeroed. Namely, the second compensating value KSFTA is decremented by the suitable amount α, to smoothly or gradually reduce the second compensating value KSFTA, after the amount of change ΔTA is zeroed, that is, after the accelerator pedal has been depressed to the desired position.

In the present thirteenth embodiment wherein the decrement amount α is set to any one of the different values "a", "b", "c" and "d", depending upon the currently selected operating position of the automatic transmission 68, which is a parameter representative of the running condition of the vehicle. The values "a", "b", "c" and "d" are determined such that "a"<"b"<"c"<"d". That is, the decrement amount α decreases with an increase in the speed reduction ratio of the transmission 68. Accordingly, when the transmission 68 is placed in the relatively low-gear position, the compensating coefficient (Kshift+KSFTA) is made relatively large with the relatively small decrement value α, so as to restrict a shift-up action of the transmission 68, for thereby permitting powerful acceleration and effective engine braking of the vehicle. In other words, the relatively large second compensating value KSFTA is effective for a relatively long time. When the transmission 68 is placed in the relatively high-gear position, the compensating coefficient (Kshift+KSFTA) is made relatively small with the relatively large decrement value α, so as to suitably permit a shift-up action of the transmission, for high-speed running of the vehicle with reduced engine vibration and noise levels. It will be understood that steps S194–S200 correspond to means for changing the decrement amount α depending upon the running condition of the vehicle, more precisely, the currently selected position of the transmission 68.

The shift control apparatus constructed as described above according to the present thirteenth embodiment of the invention uses the compensating coefficient which is the sum of the first and second compensating values Kshift and KSFTA calculated as described above, and is capable of suitably controlling the transmission 68 in accordance with a variation in the actual intake air quantity Qm and so as to reflect the driver's desire to accelerate the vehicle. The decrement amount α which influences the second compensating value KSFTA reflects the degree of the driver's desire for the vehicle acceleration, so as to assure powerful acceleration and effective engine braking of the vehicle when the transmission is placed in the 1st- or 2nd-speed position, for example, and permit quiet cruising of the vehicle when the transmission is placed in the 3rd- or 4th-speed position, for example. Thus, the present embodiment provides an improvement over the fourth embodiment of FIGS. 12–16.

Figure 44:
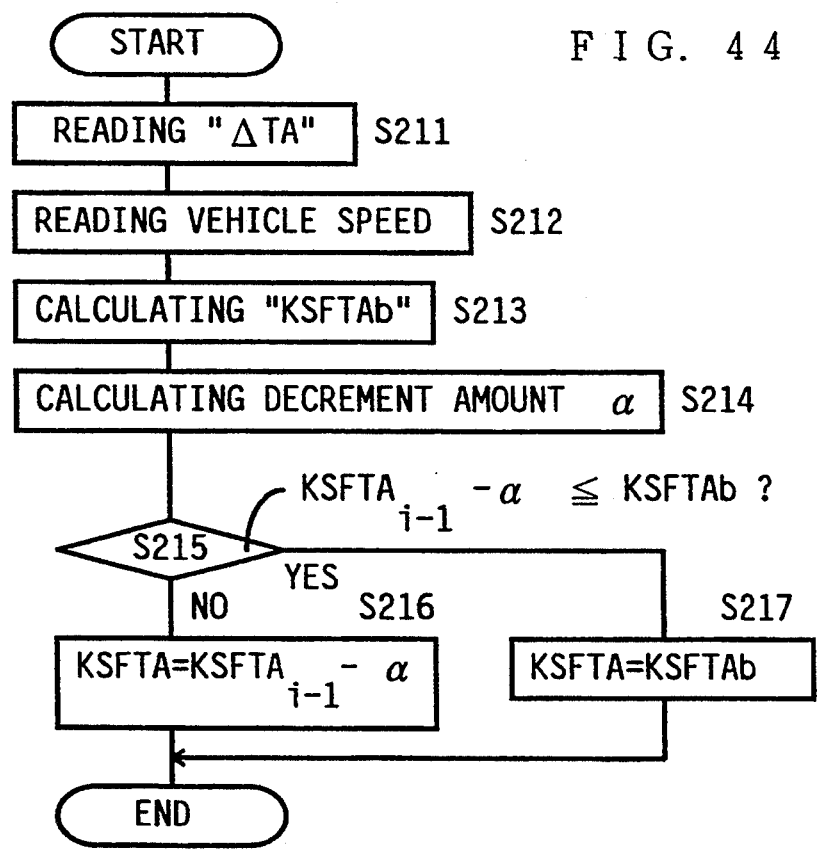
FIG. 44 is a flow chart illustrating a routine alternative to that of FIG. 42, which is used in a fourteenth embodiment of the invention.
Figure 45:
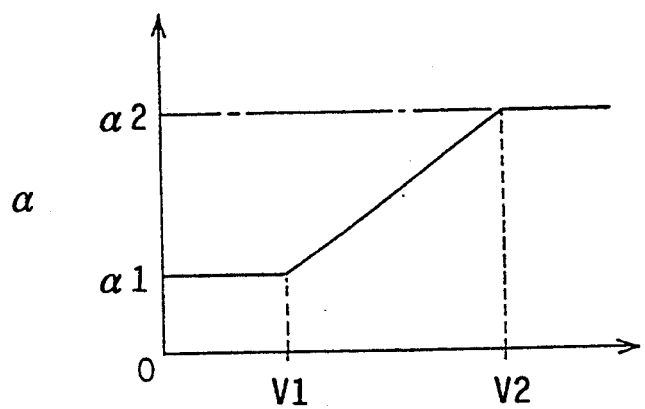
FIG. 45 is a graph showing a data map used in step S214 of the routine of FIG. 44, for obtaining a decrement value Δ from the vehicle speed V.

Referring to FIGS. 44 and 45, there will be described a fourteenth embodiment of the invention, which is different from the preceding thirteenth embodiment, in the manner of changing the decrement amount α. In this fourteenth embodiment, the second compensating value KSFTA is updated according to a routine illustrated in FIG. 44, in place of the routine of FIG. 42 of the preceding embodiment.

Step S211 of the routine of FIG. 44 is identical with step S191 of the routine of FIG. 42. Step S211 is followed by step S212 to read the VEHICLE SPEED signal SV, for detecting the current vehicle speed V. Step S212 is followed by step S213 which is identical with step S193 of the routine of FIG. 42. Step S213 is followed by step S214 to calculate the decrement amount α according to a predetermined relationship of FIG. 45 between the amount α and the vehicle speed V, and on the basis of the detected vehicle speed V. The data map representative of the predetermined relationship is formulated as follows: the decrement amount α is equal to $a_1$ when the vehicle speed V is between 0 and $V_1$. As the vehicle speed V increases from $V_1$ to $V_2$, the decrement amount α linearly increases from $a_1$ to $a_2$. When the vehicle speed V is higher than $V_2$, the decrement amount α is equal to $a_2$. In a normal running of the vehicle, the vehicle speed V falls within the range between $V_1$ and $V_2$.

Step S214 is followed by step S215 identical with step S201 of FIG. 42. If a negative decision (NO) is obtained in step S215, step S216 is implemented. If an affirmative decision (YES) is obtained in step S215, step S217 is implemented. Steps S216 and S217 are identical with steps S202 and S203 of FIG. 42.

In the present fourteen embodiment wherein the decrement amount α decreases with a decrease in the vehicle speed V, when the vehicle is running at a normal speed between $V_1$ and $V_2$. Accordingly, when the vehicle is running at a relatively low speed, the decrement value α is made relatively small, so as to restrict a shift-up action of the transmission 68, for thereby permitting powerful acceleration and effective engine braking of the vehicle. When the vehicle is running at a relatively high speed, the decrement value α is made relatively large, so as to suitably permit a shift-up action of the transmission, for quiet running of the vehicle. It will be understood that step S214 corresponds to means for changing the decrement amount α depending upon the running condition of the vehicle, more precisely, the current vehicle speed V.

Figure 46:
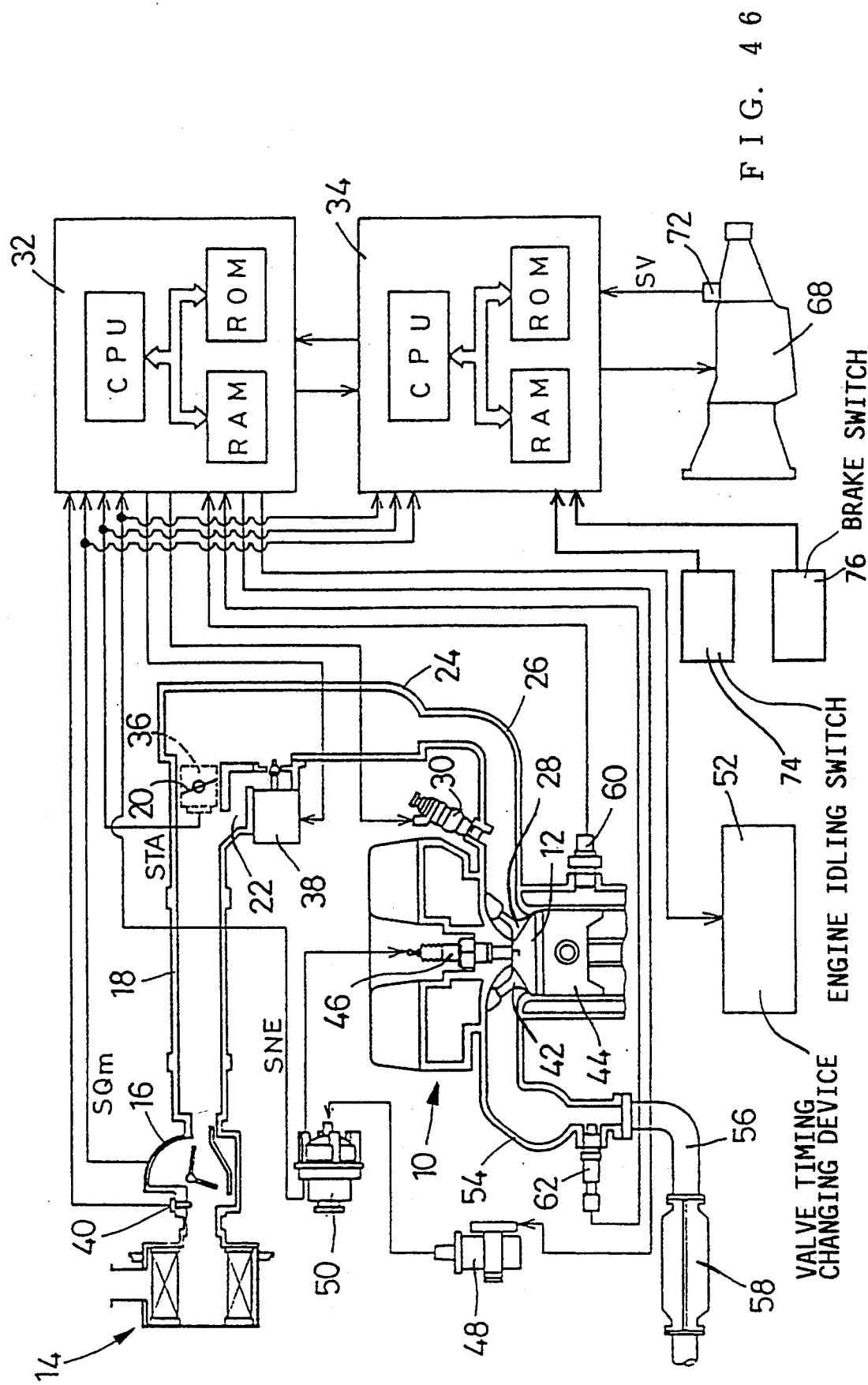
FIG. 46 is a schematic view corresponding to that of FIG. 1, which shows a vehicle engine and a transmission, and a control system therefor which incorporates a fifteenth embodiment of this invention.
Figure 47:
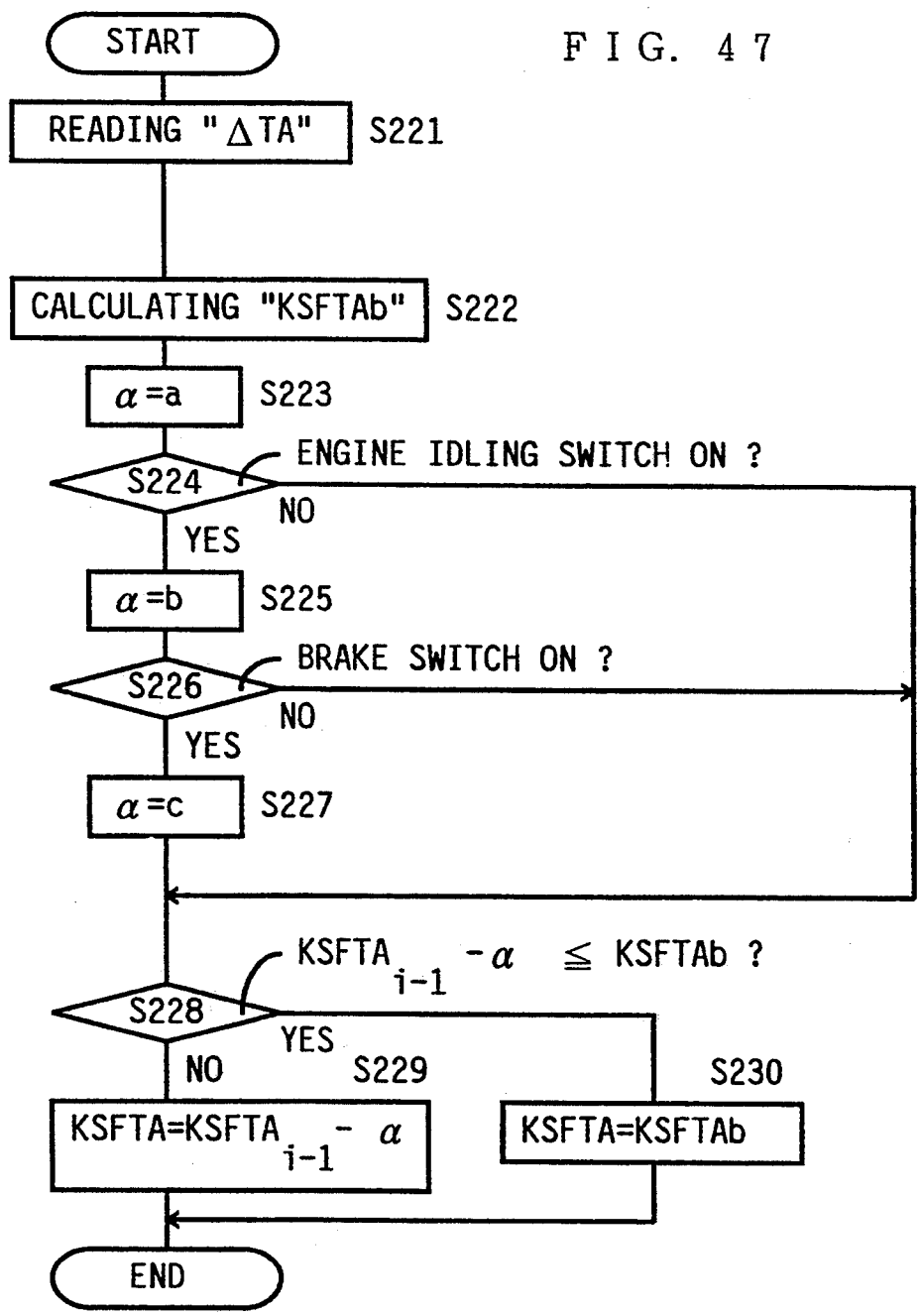
FIG. 47 is a flow chart illustrating a routine corresponding to that of FIG. 42, which is used in the fifteenth embodiment of the invention.

Reference is now made to FIGS. 46 and 47, which show a fifteenth embodiment of the present invention, in which the decrement amount α changes depending upon whether or not the vehicle is coasting, and whether or not a brake is applied to the vehicle. To this end, an ENGINE IDLING switch 74 and a BRAKE switch 76 are provided to detect an idling condition of the engine 10 and a braking operation of the vehicle. The output signals of these switches 74, 76 are fed to the transmission control computer 34, as shown in FIG. 46.

In the fifteenth embodiment, the second compensating value KSTA is updated according to a routine illustrated in FIG. 47, in which steps S211 and S222 are implemented to detect the amount of change ΔTA and the provisional value KSFTAb, in the same manner as described with respect to steps S191 and S193 of FIG. 42 of the thirteenth embodiment. Step S222 is followed by step S223 to set a value "a" as the decrement value α. Step S223 is followed by step S224 to determine whether or not the ENGINE IDLING switch 74 is on. If a negative decision (NO) is obtained in step S224, step S228 identical with step S201 of FIG. 42 is implemented. If an affirmative decision (YES) is obtained in step S224, the control flow goes to step S225 to set a value "b" as the decrement value α. Step S225 is followed by step S226 to determine whether or not the BRAKE switch 76 is on. If a negative decision (NO) is obtained in step S226, step S228 is implemented. If an affirmative decision (YES) is obtained in step S226, step S227 is implemented to set a value "c" as the decrement value α. Step S227 is followed by step S228. Depending upon the negative or affirmative decision obtained in step S228, step S229 or S230 is implemented. These steps S229, S230 are identical with steps S202 and S203 of FIG. 42.

The values "a", "b" and "c" are determined such that "a">"b">"c", so that is the decrement amount $\alpha$ is relatively small when the vehicle is running in a decelerating condition. That is, the decrement amount $\alpha$ is smaller when the vehicle is coasting with the ENGINE IDLING switch 74 in the on position with the accelerator pedal released, than when the vehicle is running with the accelerator pedal depressed. Further, the decrement amount $\alpha$ is smaller when the vehicle is coasting with brake applied, i.e., when the ENGINE IDLING switch 74 and the BRAKE switch 76 are both in the on position, than when only the ENGINE IDLING switch 74 is on. Accordingly, the present shift control apparatus permits an engine braking effect for safe coasting of the vehicle with the accelerator pedal released, and with the brake pedal in the operated or non-operated position, for example. In the present embodiment, steps S223–S227 correspond to means for changing the decrement amount $\alpha$ depending upon whether the vehicle is in the decelerating state or not, more specifically, whether the vehicle is coasting with the accelerator pedal in the fully released position, and/or with the brake pedal depressed.

Figure 48:
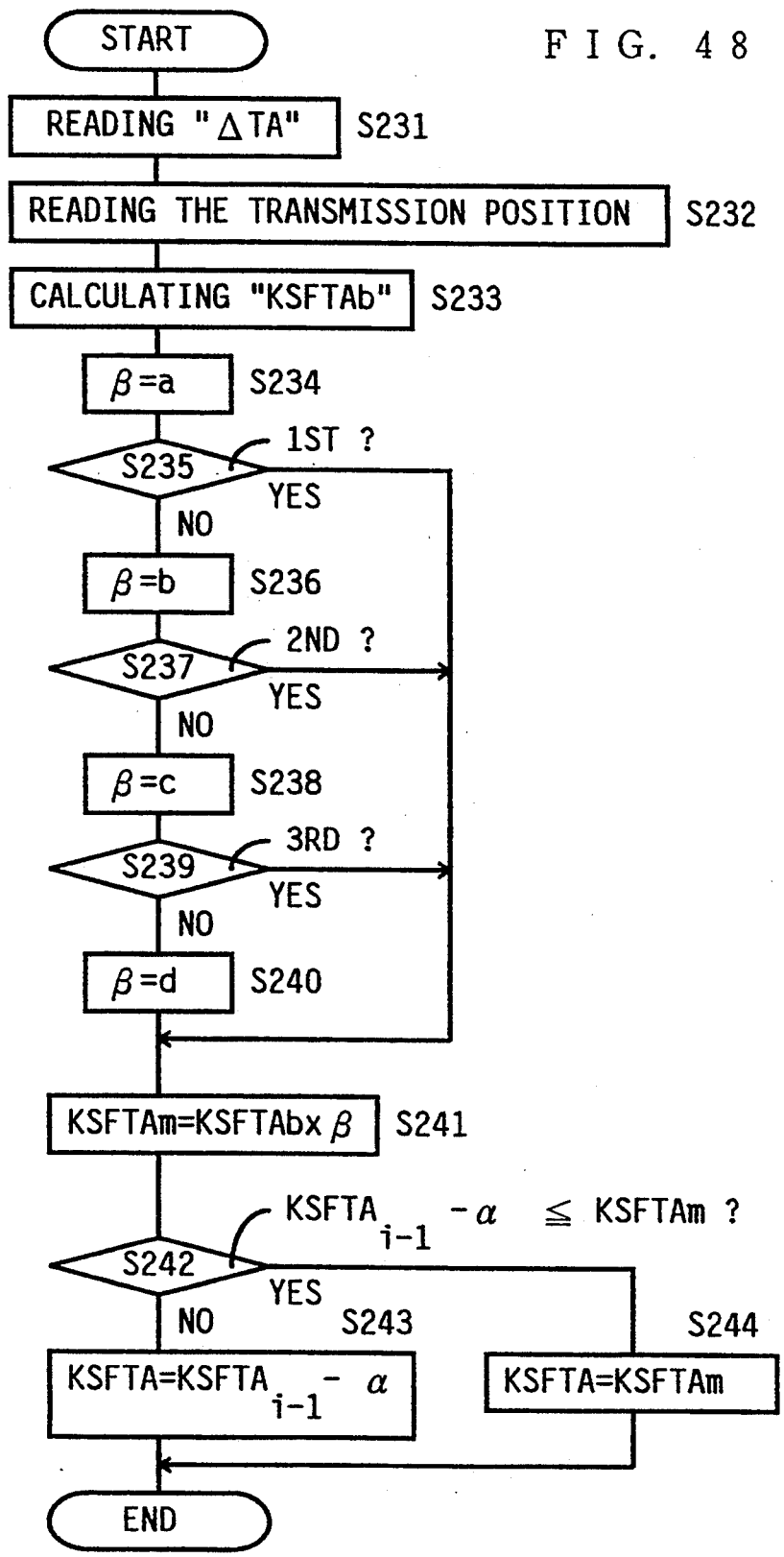
FIG. 48 is a flow chart illustrating a routine corresponding to that of FIG. 42, which is used in a sixteenth embodiment of the invention.

A sixteenth embodiment of the present invention is illustrated in FIG. 48, which shows a modified routine alternative to those of FIGS. 42, 44 and 47. In this modified embodiment, the decrement amount $\alpha$ used in step S243 is constant, while the second compensating coefficient KSFTA is changed in step S244 with an updated value KSFTAm, which changes with an adjusting value $\beta$ as described below.

The routine of FIG. 48 according to the sixteenth embodiment is initiated with steps S231–S233 which are identical with steps S191–S193 of the routine of FIG. 42. Step S233 is followed by step S234 to set a value "a" as the adjusting value $\beta$. Then, step S235 is implemented to determine whether or not the transmission 68 is currently placed in the 1st-speed position. If an affirmative decision (YES) is obtained in step S235, step S241 is implemented. If a negative decision (NO) is obtained in step S235, step S236 is implemented to set a value "b" as the adjusting value $\beta$. Step S236 is followed by step S237 to determine whether or not the transmission 68 is placed in the 2nd-speed position. If an affirmative decision (YES) is obtained in step S237, step S241 is implemented. If a negative decision (NO) is obtained in step S237, step S238 is implemented to set a value "c" as the adjusting value $\beta$. Step S238 is followed by step S239 to determine whether or not the transmission 68 is placed in the 3rd-speed position. If an affirmative decision (YES) is obtained in step S239, step S241 is implemented. If a negative decision (NO) is obtained in step S239, step S241 is implemented to set a value "d" as the adjusting value $\beta$.

In step S241, an adjusted value KSFTAm is calculated by multiplying the provisional value KSFTAb by the adjusting value $\beta$. Step S241 is followed by step S242 to determine whether or not the calculated adjusted value KSFTAm is equal to or larger than the value $(KSFTA_{i-1} - \alpha)$, where the value $KSFTA_{i-1}$ is the second compensating value KSFTA calculated in the last execution of step S243 or S244 described below. If a negative decision (NO) is obtained in step S242, namely, if the adjusted value KSFTAm is smaller than the value $(KSFTA_{i-1} - \alpha)$, step S243 is executed to set the value $(KSFTA_{i-1} - \alpha)$ as the second compensating value KSFTA. If an affirmative decision (YES) is obtained in step S242, namely, if the adjusted value KSFTAm is equal to or larger than the value $(KSFTA_{i-1} - \alpha)$, step S244 is executed to set the adjusted value KSFTAm as the second compensating value KSFTA.

Figure 49:
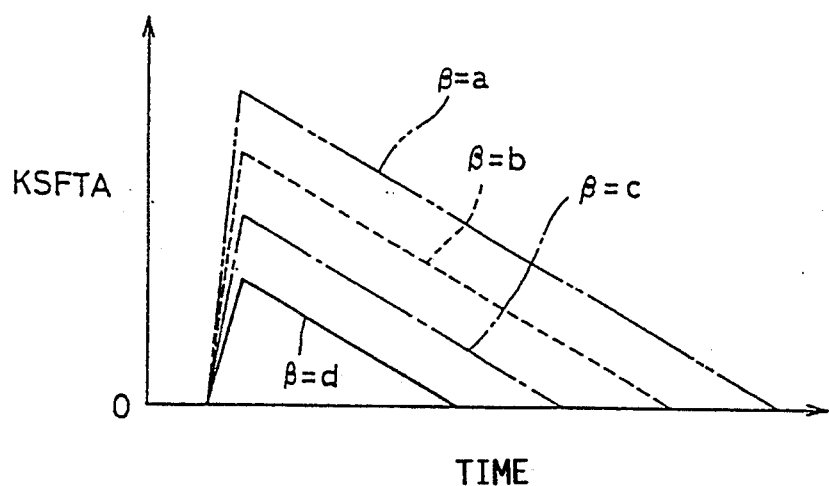
FIG. 49 is a graph showing a variation of the compensating coefficient KSFTA for each of different adjusting values β used in step S241 of the routine of FIG. 48.

In the present sixteenth embodiment wherein the adjusting value $\beta$ is set to any one of the different values "a", "b", "c" and "d", depending upon the currently selected operating position of the automatic transmission 68. The values "a", "b", "c" and "d" selectively used as the adjusting value $\beta$ are determined such that "a">"b">"c">"d". That is, the adjusting value $\beta$ increases with an increase in the speed reduction ratio of the transmission 68. The graph of FIG. 49 shows a variation of the second compensating value KSFTA for each of the four different values "a", "b", "c" and "d", which are selectively used as the adjusting value $\alpha$. Accordingly, when the transmission 68 is placed in the relatively low-gear position, the compensating coefficient (Kshift+KSFTA) is made relatively large with the relatively large second compensating value KSFTA, so as to restrict a shift-up action of the transmission 68, for thereby permitting powerful acceleration and effective engine braking of the vehicle. In other words, the relatively large second compensating value KSFTA is effective for a relatively long time. When the transmission 68 is placed in the relatively high-gear position, the compensating coefficient (Kshift+KSFTA) is made relatively small with the relatively large second compensating value KSFTA, so as to suitably permit a shift-up action of the transmission, for high-speed running of the vehicle with reduced engine vibration and noise levels. It will be understood that steps S234–S240 correspond to means for changing the second compensating coefficient KSFTA depending upon the running condition of the vehicle, more precisely, the currently selected position of the transmission 68.

In the shift control apparatus constructed as described above according to the present sixteenth embodiment of the invention, the adjusting value $\beta$ for obtaining the second compensating value KSFTA changes depending upon the currently selected position of the transmission 68, so that the compensating value KSFTA increases with an increase in the speed reduction ratio of the transmission 68, whereby the second compensating value KSFTA reflects the degree of the driver's desire for the vehicle acceleration, so as to assure powerful acceleration and effective engine braking of the vehicle when the transmission is placed in the relatively low-gear position, and permit quiet cruising of the vehicle when the transmission is placed in the relatively high-gear position. Thus, the present embodiment provides an improvement over the fourth embodiment of FIGS. 12–16.

While the amount of change $\Delta TA$ of the throttle opening TA is used in the above thirteenth through sixteenth embodiments, as a parameter which represents the extent to which the vehicle driver desires to accelerate the vehicle, other parameters such as the amount of change in the depressing movement of the accelerator pedal may be used in place of the amount of change $\Delta TA$.

The above thirteenth through sixteenth embodiments of FIGS. 42–49 are adapted to obtain the compensating coefficient (Kshift+KSFTA) which consists of the first and second compensating values Kshift and KSFTA. However, the first compensating value Kshift may be omitted or replaced by other compensating value or values which reflect the other appropriate running conditions of the vehicle. It is possible that the second compensating value KSFTA is changed such that its central or reference value is 1.0, and the compensating coefficient is obtained by multiplying the first compensating value Kshift by the second compensating value KSFTA.

Although the above embodiments of FIGS. 42–49 are adapted to apply the obtained compensating coefficient (Kshift+KSFTA) to the shift-up and shift-down vehicle speeds Vu, Vd, to calculate the compensated vehicle speeds MVu, MVd, the compensating coefficient may be applied to the actual vehicle speed V with which the calculated vehicle speeds Vu, Vd are compared, to determine the necessity of a shift-up or shift-down action of the transmission 68. In this case, the actually detected vehicle speed V is divided by the compensating coefficient (Kshift+KSFTA). Further, the compensating coefficient may be applied to the detected throttle opening TA before the corresponding shift-up and shift-down speeds Vu, Vd are calculated in steps S5 and S10 (FIG. 2). Further, one of a plurality of boundary lines for shifting the transmission 68 from one position to the next may be selected depending upon the compensating coefficient (Kshift+KSFTA) obtained in steps S202, S203, S216, S217, S229, S230, S243 and S244.

In the fourteenth embodiment of FIGS. 44 and 45, the decrement amount $\alpha$ is obtained according to the predetermined relationship as shown in FIG. 45. However, the decrement amount $\alpha$ may be changed over the entire range of the vehicle speed V.

In the sixteenth embodiment of FIGS. 48 and 49, the adjusting value $\beta$ for obtaining the adjusted value KSTAm is changed depending upon the currently selected position of the transmission 68, the adjusting value $\beta$ may be changed depending upon the vehicle speed V or the decelerating state of the vehicle, or other parameters of the vehicle.

Although the embodiments of FIGS. 42–49 area adapted to change the decrement amount $\alpha$ or adjusting value $\beta$ depending upon one of the currently selected position of the transmission 68, vehicle speed V or decelerating condition of the vehicle, various changes and modifications may be made to these embodiments. For instance, both the decrement amount $\alpha$ and the adjusting value $\beta$ may be changed depending upon a selected one of those running conditions of the vehicle, or the decrement amount $\alpha$ or adjusting value $\beta$ may be changed depending upon a desired combination of two or more running conditions of the vehicle.

Figure 50:
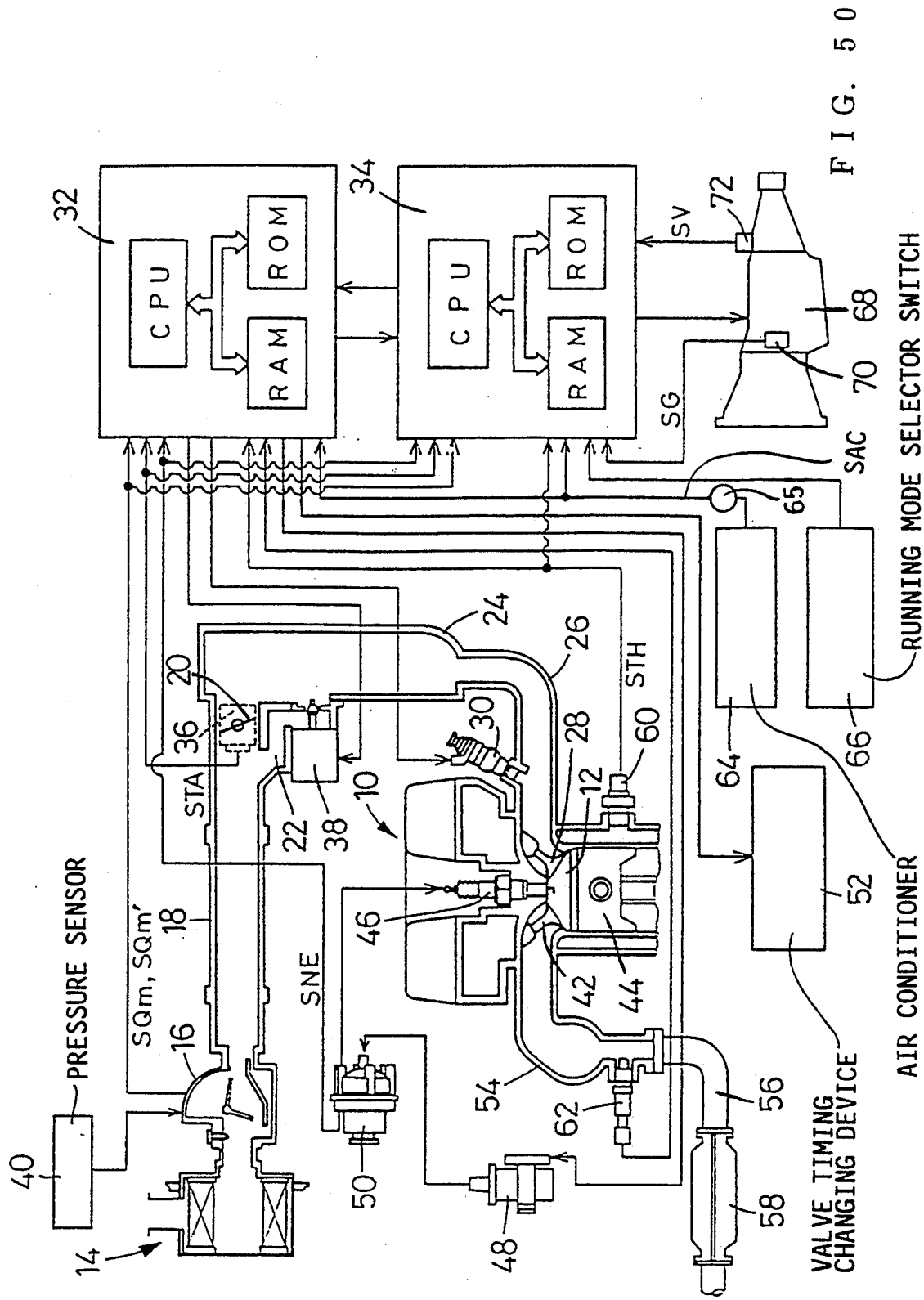
FIG. 50 is a schematic view corresponding to that of FIG. 1, which shows a vehicle engine and a transmission, and a control system therefor which incorporates a seventeenth embodiment of this invention.

Referring next to FIGS. 50–54, there will be described a seventeenth embodiment of the present invention. In the present embodiment, a pressure sensor 41 for detecting the pressure of the atmosphere is provided as shown in FIG. 50, so that an original intake air quantity Qm' represented by an ORIGINAL INTAKE AIR QUANTITY signal SQm' generated by the air flow meter 16 is compensated by the atmospheric pressure detected by the pressure sensor 41, so as to obtain a compensated intake air quantity Qm represented by a COMPENSATED INTAKE AIR QUANTITY signal SQm. This compensated intake air quantity Qm is free of an influence of the density of the ambient air, and is the quantity at 1 atm (760 mmHg (Torr). The COMPENSATED INTAKE AIR QUANTITY signal SQm as well as the ORIGINAL INTAKE AIR QUAN-TITY signal SQm' is fed to the engine control computer 32 and the transmission control computer 34. Thus, the pressure sensor 41 cooperates with the air flow meter 16 to function as means for detecting the compensated intake air quantity Qm (hereinafter referred to simply as "actual intake air quantity Qm).

In the present embodiment, the transmission control computer 34 receives an output signal of a RUNNING MODE selector switch 78, which is operated by the vehicle driver, to select a desired one of different running modes of the vehicle, such as a POWER DRIVE mode suitable for powerful acceleration of the vehicle, and an ECONOMY mode suitable for quiet running of the vehicle with reduced fuel consumption.

Figure 51:
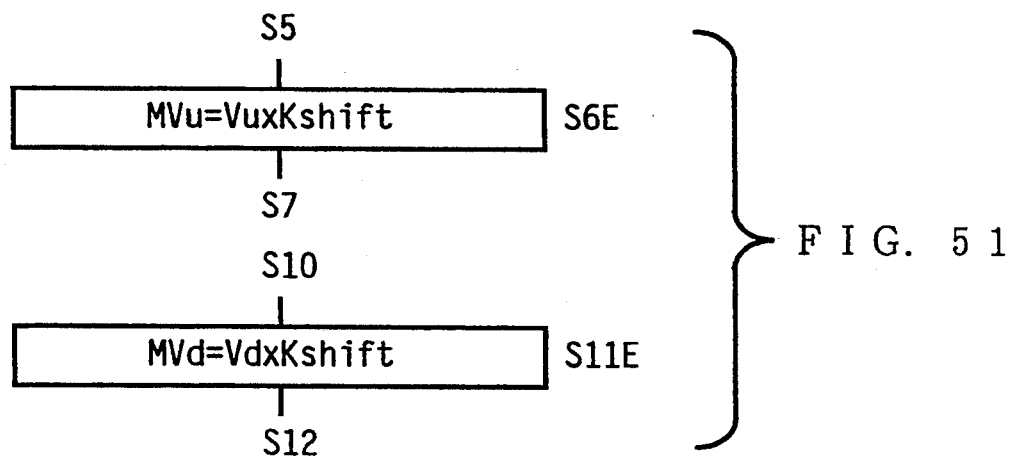
FIG. 51 is a fragmentary flow chart showing a shift control routine according to the seventeenth embodiment, which corresponds to that of FIG. 2 of the first embodiment.

The shift control routine used in this seventeenth embodiment is identical with that of FIG. 2 of the first embodiment, except for steps S6E and S11E illustrated in FIG. 51, which are substituted for steps S6 and S11 of FIG. 2. In these steps S6E and S11E, the shift-up and shift-down vehicle speeds Vu, Vd are multiplied by a compensating coefficient Kshift, to obtain the compensated shift-up and shift-down speeds MVu, MVd, respectively.

Figure 52:
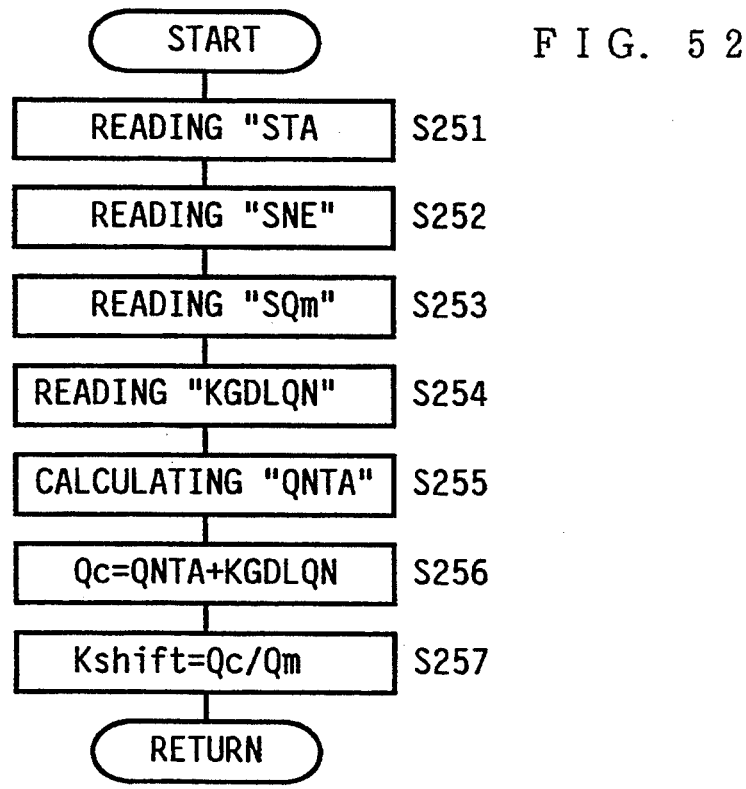
FIG. 52 is a flow chart illustrating a routine for obtaining a compensating coefficient Kshift used in steps S6E and S11E of the routine of FIG. 51.

The compensating coefficient Kshift is determined according to a routine illustrated in the flow chart of FIG. 52. In this routine, steps S251–S253 are initially implemented to detect the throttle opening TA, engine speed NE and actual intake air quantity Qm based on the THROTTLE OPENING signal STA, ENGINE SPEED signal SNE and COMPENSATED INTAKE AIR QUANTITY signal SQm, respectively. Step S253 is followed by step S254 to read an adjusting value KGDLQN representative of an amount of change in the actual intake air quantity Qm which is caused by an increase in the friction loss of the engine 10 and other chronological changes of the engine. This adjusting value KGDLQN is determined according to a routine of FIG. 53. Step S254 is followed by step S255 to calculate a provisional required intake air quantity QNTA on the basis of the throttle opening TA and engine speed NE represented by the respective signals STA and SNE, and according to a stored data map representative of a predetermined relationship between the parameters TA and NE, as illustrated in FIG. 54, by way of example.

The control flow then goes to step S256 in which an adjusted required intake air quantity Qc is obtained by adding the calculated provisional required intake air quantity QNTA to the adjusting value KGDLQN. Step S256 is followed by step S257 in which the compensating coefficient Kshift is obtained by dividing the adjusted required intake air quantity Qc by the detected actual intake air quantity Qm.

Figure 54:
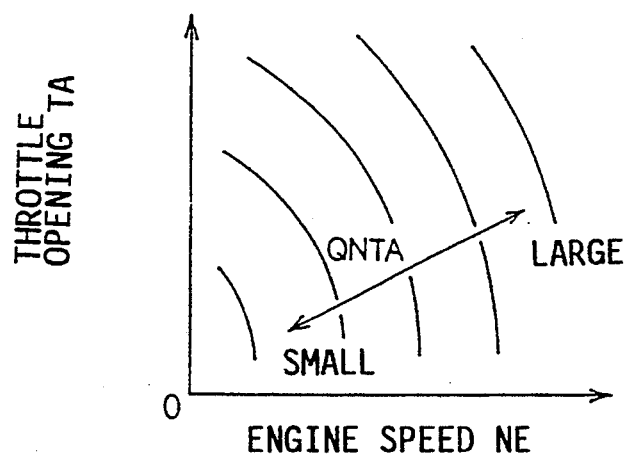
FIG. 54 is a view depicting a data map representative of a relationship used in step S255 of the routine of FIG. 52, for obtaining a provisional required intake air quantity QNTA from the engine speed NE and the throttle opening TA.

The relationship illustrated in FIG. 54 is determined based on an experiment, so that the provisional required intake air quantity QNTA represents the actual intake air quantity Qm changes as a function of the throttle opening TA and engine speed NE, where the engine 10 operates in the normal condition, namely, at the standard altitude or at 1 atm (760 mmHg or Torr) while the idling control valve 38 and valve timing changing device 52 are in the normal operating states. If there were no chronological change or deterioration of the engine 10, the provisional required intake air quantity QNTA is substantially equal to the actual intake air quantity Qm, and the adjusting value KGDLQN is substantially zero whereby the compensating coefficient Kshift is substantially equal to 1.0, when the engine 10 operates in the normal operating condition of the engine 10.

As the output torque characteristics of the engine 10 change due to the increase in the friction and pumping losses, for example, the idling control valve 38 is regulated by the engine control computer 32, so that the engine 10 provides the nominal output torque. Accordingly, the actual intake air quantity Qm varies. Since the adjusting value KGDLQN corresponds to the amount of change in the actual intake air quantity Qm which is caused by the regulation of the idling control valve 38, the compensating coefficient Kshift which is the sum of the adjusting value KGDLQN and the provisional required intake air quantity QNTA reflects the amount of change in the actual intake air quantity Qm due to the chronological change of the engine 10. In this respect, it is noted that the actual intake air quantity Qm is the amount of air introduced into the engine 10 per revolution, which is obtained by compensating the original intake air quantity Qm' as detected by the air flow meter 16, for the variation in the atmospheric pressure (altitude of the road surface) detected by the pressure sensor 41.

Figure 53:
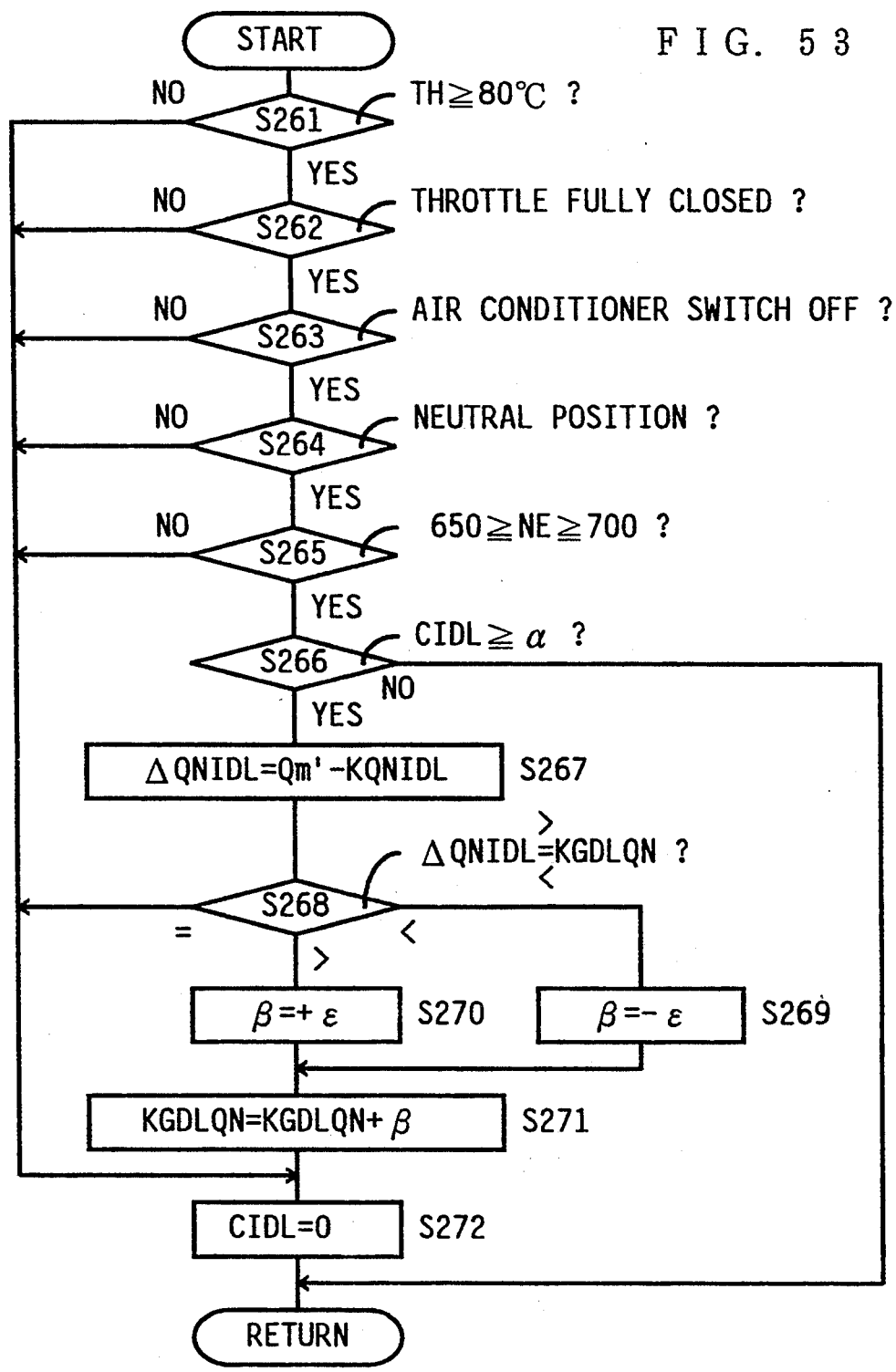
FIG. 53 is a flow chart illustrating a routine for obtaining an adjusting value KGDLQN read in step S254 of the routine of FIG. 52.

There will next be described the routine of FIG. 53 for determining the adjusting value KGDLQN. Initially, step S261 is implemented to determine whether or not the coolant temperature TH represented by the WATER TEMP. signal STH from the water temperature sensor 60 is equal to or higher than 80° C. If an affirmative decision (YES) is obtained in step S261, step S262 is implemented to determine, based on the THROTTLE OPENING signal STA, whether or not the throttle valve 20 is fully closed. If an affirmative decision (YES) is obtained in step S262, the control flow goes to step S263 to determine, based on the AIR CON. signal SAC, whether or not the AIR CONDITIONER switch 65 is on, that is, whether or not the air condition 64 is in operation. If an affirmative decision (YES) is obtained in step S263, step S264 is implemented to determine, based on the GEAR POSITION signal SG, whether or not the transmission 68 is placed in the neutral position N. If an affirmative decision (YES) is obtained in step S264, step S265 is implemented to determine whether or the engine speed NE represented by the ENGINE SPEED signal SNE falls within a range between 650 r.p.m. (inclusive) and 700 r.p.m. (inclusive). If an affirmative decision (YES) is obtained in step S265, the control flow goes to step S266 to determine whether or not the content of a timer CIDL is equal to or larger than a value $\alpha$ corresponding to a predetermined time duration. Steps S261-S266 are provided to check to see if the engine 10 is in the predetermined non-load idling condition. The provisional required intake air quantity QNTA obtained in step S256 is substantially equal to the original intake air quantity Qm' as detected by the air flow meter 16, if the engine 10 is in the non-load idling condition with the affirmative decision (YES) made in all of the above steps S261-S265, provided the engine 10 is in the initial state without any chronological change or deterioration. If the friction loss of the engine 10 is increased, for example, the idling control valve 38 is activated by the engine control computer 32 to maintain the engine 10 in the nominal idling condition, whereby the compensated and original intake air quantities Qm Qm' accordingly are changed.

Step S272 is implemented to reset the timer CIDL to zero if a negative decision (NO) is obtained any one of the above steps S261-S265, and the control flow goes back to step S261 to repeat the routine. The routine is repeated also when a negative decision (NO) is obtained in step S266. If the decisions in steps S262-S266 are affirmative (YES), namely, if the non-load idling condition of the engine 10 continues for the time represented by the predetermined value $\alpha$, the control flow goes to step S267 in which a difference $\Delta$QNIDL is obtained by subtracting a predetermined idling intake air quantity KQNIDL from the original intake air quantity Qm' represented by the ORIGINAL INTAKE AIR QUANTITY signal SQm'. The idling intake air quantity KQNIDL is the original intake air quantity Qm' when the engine 10 is in the initial state without any chronological change and in the non-load idling condition with the affirmative decision (YES) obtained in steps S261-S266. On the other hand, the difference $\Delta$QNIDL represents an amount of change in the original intake air quantity Qm', which is necessary to maintain the engine 10 in the nominal idling condition when the engine 10 is not in the initial state, that is, when the engine has chronological changes. Although the original intake air quantity Qm' rather than the compensated intake air quantity Qm is used, the compensated intake air quantity Qm may be used for calculating the difference $\Delta$QNIDL. In this case, the standard altitude or 1 atm (760 mmHg) of the atmospheric pressure is also the condition for the non-load idling condition of the engine 10.

Step S267 is followed by step S268 to compare the difference $\Delta$QNIDL with the currently effective adjusting value KGDLQN. If the difference $\Delta$QNIDL is smaller than the adjusting value KGDLQN, step S269 is implemented to set $-\epsilon$ as an updating value $\beta$. If the difference $\Delta$QNIDL is larger than the adjusting value KGDLQN, step S270 is implemented to set $+\epsilon$ as an updating value $\beta$. If the difference $\Delta$QNIDL is equal to the adjusting value KGDLQN, the control flow goes to step S272. Steps S269 and S270 are followed by step S271 in which the adjusting value KGDLQN is updated by adding the updating value $\beta$ to the current adjusting value KGDLQN. The value $\epsilon$ is for avoiding an abrupt change in the adjusting value KGDLQN due to errors such as the detecting error included in the actual intake air quantity Qm. This value $\epsilon$ is a comparatively small positive value that permits the adjusting value KGDLQN to follow the chronological change of the engine 10, so that the adjusting value KGDLQN substantially coincides with the difference $\Delta$QNIDL.

In the present seventeenth embodiment, the difference $\Delta$QNIDL between the original intake air quantity Qm' as detected by the air flow meter 16 and the predetermined idling intake air quantity KQNIDL is obtained in the non-load idling condition of the engine 10, and the adjusting value KGDLQN is updated depending upon the difference $\Delta$QNIDL. The compensating coefficient Kshift is obtained from the compensated actual intake quantity Qm, and the required intake air quantity Qc which is obtained by adding the updated adjusting value KGDLQN to the provisional required intake air quantity QNTA. This arrangement assures the compensating coefficient Kshift which reflects a change in the output torque characteristics of the engine 10 due to an increase in the friction loss and other chronological change of the engine. The thus determined compensating coefficient Kshift is multiplied by the shift-up and shift-down vehicle speeds Vu, Vd to obtain the compensated shift-up and shift-down vehicle speeds MVu, MVd which are used in determining the necessity of shift-up and shift-down actions of the transmission 68. Accordingly, the transmission can be suitably controlled irrespective of the chronological change or deterioration of the engine 10.

In the present embodiment, steps S6E and S11E of the routine of FIG. 51 correspond to the compensating means for compensating the shift pattern (Vu, Vd), and steps S251–S257 of the routine of FIG. 52 correspond to coefficient determining means for determining the compensating coefficient Kshift. Further, step S256 of the routine of FIG. 52 and steps S269–S271 of the routine of FIG. 53 correspond to adjusting means for adjusting the provisional required intake air quantity QNTA to obtain the compensated required intake air quantity Qc, and steps S261–S266 of the routine of FIG. 53 correspond to judging means for determining whether or not the engine 10 is in the predetermined non-load idling condition. Steps S267 and S268 correspond to quantity change determining means for determining an amount of change in the intake air quantity Qm' due to the chronological change of the engine 10.

In the illustrated seventeenth embodiment, steps S261–266 are implemented to determine whether the engine 10 is in the predetermined non-load idling condition, before the difference ΔQNIDL is calculated. However, the condition of the engine 10 that should be satisfied before step S267 is implemented may be suitable modified depending upon the characteristics of the engine and the manner of controlling the engine. For instance, where the intake air mass is used in place of the intake air quantity Qm' in step S267, a step should be added to determine whether the altitude of the road surface or the atmospheric pressure is in a predetermined normal range whose center is the sea level or 1 atm (760 mmHg). In this case, the detected intake air mass may be converted into the intake air quantity at the seal level or at 1 atm.

In the seventeenth embodiment, the adjusting value KGDLQN is incremented or decremented by the predetermined amount ε in step S271. However, the difference ΔQNIDL may be set as the adjusting value KGDLQN in step S271. Further, the average value of the difference ΔQNIDL may be used as the adjusting value KGDLQN if the difference ΔQNIDL is in a given range for more than a predetermined time length. The adjusting value KGDLQN may be otherwise updated.

Although the predetermined idling intake air quantity KQNIDL is subtracted from the original intake air quantity Qm' in step S267, the idling intake air quantity KQNIDL may be replaced by the provisional required intake air quantity QBFEA calculated in step S255.

While the updated adjusting value KGDLQN is added to the provisional required intake air quantity QNTA in step S256 to obtain the adjusted required intake air quantity Qc used in step S257 to obtain the compensating coefficient Kshift, it is possible that the compensating coefficient Kshift is first obtained from the provisional required intake air quantity QNTA and the compensated actual intake air quantity QTn, and the thus obtained compensating coefficient Kshift is adjusted depending upon the adjusting value KGDLQN.

In step S257, the compensating coefficient Kshift is calculated by dividing the adjusted required intake air quantity Qc by the compensated actual intake air quantity Qm. However, the compensating coefficient Kshift may be determined based on the difference (Qc−Qm) between these quantities Qc and Qm.

What is claimed is:

1. A shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of said operating parameters, (b) detecting means for detecting a speed (NE) of said engine, an opening (TA) of said throttle valve and an intake air quantity (Qm) of said engine, (c) coefficient calculating means for calculated a required intake air quantity (Qc) of said engine from the detected speed of the engine and the detected opening of the throttle valve, and calculating a compensating coefficient (K) by dividing the calculating required intake air quantity by the detected intake air quantity, and (d) compensating means for compensating one of said shift pattern and at least one of said actually detected values of the operating parameters, depending upon said compensating coefficient, wherein the improvement comprises:

judging means for determining whether or not said compensating coefficient (K) has changed; and adjusting means for adjusting said compensating coefficient by a predetermined amount (α1, β1, α2, β2, β3), each time said judging means determines that said compensating coefficient has changed, whereby an adjusted compensating coefficient (MK) is obtained so that said compensating means operates according to said adjusted compensating coefficient.

2. A shift control apparatus according to claim 1, wherein said detecting means further detects a running speed (V) of said vehicle, and said operating parameters consist of said opening (TA) of said throttle valve and the running speed (V) of said vehicle.

3. A shift control apparatus according to claim 2, wherein said predetermined shift pattern consists of at least one shift boundary line each representing a relationship between said opening (TA) of the throttle valve and said running speed (V) of the vehicle.

4. A shift control apparatus according to claim 2, wherein said compensating means compensates a shifting value (Vu, Vd) of said running speed which corresponds to the opening (TA) of the throttle valve detected by said detecting means, said shift control means determining a shifting action of said automatic transmission, by comparing the running speed (V) of the vehicle detected by said detecting means, with said shifting value (MVu, MVd) of the running speed as compensated by said compensating means.

5. A shift control apparatus according to claim 1, wherein said adjusting means changes said compensating coefficient (K) by changing said adjusted compensating coefficient (MK) by said predetermined amount (α1, β1, α2, β2, β3), each time said judging means determines that said compensating coefficient has changed.

6. A shift control apparatus according to claim 1, further comprising:

first determining means for determining whether or not the vehicle is in a process of acceleration, if said compensating coefficient (K) has increased;

second determining means for determining whether or not the vehicle is in a process of deceleration, if the compensating coefficient has decreased;

first setting means for setting a first increment-decrement value ($\alpha 2$) as said predetermined amount, if said first determining means determines that the vehicle is in the process of acceleration; and second setting means for setting a second increment-decrement value ($\beta 2$) as said predetermined amount, if said second determining means determines that the vehicle is in the process of deceleration, and wherein said adjusting means incrementing said adjusted compensating coefficient (MK) by said first increment-decrement value if said first determining means determines that the vehicle is in the process of acceleration, and decrementing said adjusted compensating coefficient by said second increment-decrement value if said second determining means determines that the vehicle is in the process of deceleration.

7. A shift control apparatus according to claim 1, further comprising:

determining means for determining whether said engine is in a turbocharging state or in a non-turbocharging state;

first setting means for setting a first increment-decrement value ($\alpha 3$) as said predetermined amount, if said determining means determines that the engine is in said turbocharging state; and second setting means for setting a second increment-decrement value ($\beta 3$) as said predetermined amount, if said determining means determines that the engine is in said non-turbocharging state, and wherein said adjusting means increments said adjusted compensating coefficient (MK) by said first increment-decrement value if said determining means determines that the engine is in the turbocharging state, and decrementing said adjusted compensating coefficient by said second increment-decrement value if said determining means determines that the engine is in the non-turbocharging state.

8. A shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of said operating parameters, (b) detecting means for detecting a speed (NE) of said engine, an opening (TA) of said throttle valve and an intake air quantity (Qm) of said engine, (c) coefficient calculating means for calculated a required intake air quantity (Qc) of said engine from the detected speed of the engine and the detected opening of the throttle valve, and calculating a compensating coefficient (K) by dividing the calculating required intake air quantity by the detected intake air quantity, and (d) compensating means for compensating one of said shift pattern and at least one of said actually detected values of the operating parameters, depending upon said compensating coefficient, wherein the improvement comprises:

judging means for determining whether or not said compensating coefficient (K) is larger than a predetermined maximum value (Kmax), and determining whether or not said compensating coefficient is smaller than a predetermined minimum value (Kmin); and adjusting means for adjusting said compensating coefficient to obtain an adjusted compensating coefficient (MK), such that said maximum value (Kmax) is set as said adjusted compensating coefficient if said judging means determines that said compensating coefficient (K) is larger than said maximum value, and such that said minimum value (Kmin) is set as said adjusted compensating coefficient if said judging means determines that said compensating coefficient is smaller than said minimum value, said compensating means operating according to said adjusted compensating coefficient (MK).

9. A shift control apparatus according to claim 8, wherein said detecting means further detects a running speed (V) of said vehicle, and said operating parameters consist of said opening (TA) of said throttle valve and the running speed (V) of said vehicle.

10. A shift control apparatus according to claim 9, wherein said predetermined shift pattern consists of at least one shift boundary line each representing a relationship between said opening (TA) of the throttle valve and said running speed (V) of the vehicle.

11. A shift control apparatus according to claim 9, wherein said compensating means compensates a shifting value (Vu, Vd) of said running speed which corresponds to the opening (TA) of the throttle valve detected by said detecting means, said shift control means determining a shifting action of said automatic transmission, by comparing the running speed (V) of the vehicle detected by said detecting means, with said shifting value (MVu, MVd) of the running speed as compensated by said compensating means.

12. A shift control apparatus according to claim 8, wherein said adjusting means sets said compensating coefficient (K) as said adjusted compensating coefficient (MK) when said judging means determines that said compensating coefficient is within a range between said maximum and minimum values (Kmax, Kmin).

13. A shift control apparatus according to claim 8, wherein said judging means comprises first determining means for determining said maximum value (Kmax) on the basis of an amount of change ($\Delta TA$) of said opening (TA) of the throttle valve such that said maximum value is decreased after said amount of change is changed from a positive value to zero, and second determining means for determining said minimum value (Kmin) on the basis of said amount of change such that said minimum value is increased after said amount of change is changed from a negative value to zero.

14. A shift control apparatus according to claim 13, wherein said judging means further comprises calculating means for obtaining a control center value (KG) by calculating a moving average (KGn) of successive values of said compensating coefficient (K) which have been calculated by said coefficient calculating means, said first and second determining means of said judging means decreasing and increasing said maximum and minimum values (Kmax, Kmin), respectively, on the basis of said control center value calculated by said calculating means.

15. A shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of said operating parameters, (b) detecting means for detecting a speed (NE) of said engine, an opening (TA) of said throttle valve and an intake air quantity (Qm) of said engine, (c) coefficient calculating means for calculated a required intake air quantity (Qc) of said engine from the detected speed of the engine and the detected opening of the throttle valve, and calculating a compensating coefficient (K) by dividing the calculating required intake air quantity by the detected intake air quantity, and (d) compensating means for compensating one of said shift pattern and at least one of said actually detected values of the operating parameters, depending upon said compensating coefficient, wherein the improvement comprises:

judging means for determining whether or not said compensating coefficient (K) has changed; and
   adjusting means for adjusting said compensating coefficient to obtain an adjusted compensating coefficient (MK) such that an amount of compensation ($|K-KG|$) of said compensating coefficient decreases at a predetermined rate (A), when said judging means determines that said compensating coefficient has changed,
   said compensating means operating according to said adjusted compensating coefficient.

16. A shift control apparatus according to claim 15, wherein said detecting means further detects a running speed (V) Of said vehicle, and said operating parameters consist of said opening (TA) of said throttle valve and the running speed (V) Of the vehicle.

17. A shift control apparatus according to claim 16, wherein said predetermined shift pattern consists of at least one shift boundary line each representing a relationship between said opening (TA) of the throttle valve and said running speed (V) of the vehicle.

18. A shift control apparatus according to claim 16, wherein said compensating means compensates a shifting value (Vu, Vd) of said running speed which corresponds to the opening (TA) of the throttle valve detected by said detecting means, said shift control means determining a shifting action of said automatic transmission, by comparing the running speed (V) of the vehicle detected by said detecting means, with said shifting value (MVu, MVd) of the running speed as compensated by said compensating means.

19. A shift control apparatus according to claim 15, wherein said judging means comprises determining means whether said vehicle is in an accelerating state or in a decelerating state, and said adjusting means decreases said amount of compensation ($|K-KG|$) of said compensating coefficient (K) at a first predetermined value ($\alpha$) as said predetermined rate (A) when said determining means determines that said vehicle is in said accelerating state, and by a second predetermined value ($\beta$) as said predetermined rate (A) when said determining means determines that said vehicle is in said decelerating state.

20. A shift control apparatus according to claim 19, wherein said determining means of said judging means operates on the basis of an amount of change ($\Delta TA$) per unit time of said opening (TA) of the throttle valve.

21. A shift control apparatus according to claim 15, wherein said adjusting means comprises determining means for determining said predetermined rate (A), said adjusting means further comprising calculating means for calculating said adjusted compensating coefficient (MK) depending upon said predetermined rate (A).

22. A shift control apparatus according to claim 21, wherein said adjusting means further comprises means for obtaining a control center value (KG) by calculating a moving average (KGn) of successive values of said compensating coefficient (K) which have been calculated by said coefficient calculating means, said calculating means of said adjusting means calculating said adjusted compensating coefficient (MK) according to an equation $MK=(K1-KG) \times A+KG$.

23. A shift control apparatus for an automatic transmission of a motor vehicle with an engine, having shift control means for automatically shifting the automatic transmission according to a predetermined shift pattern representing a relationship of operating parameters of the vehicle, and on the basis of actually detected values of said operating parameters, said shift control apparatus comprising:

coefficient calculating means for calculating a compensating coefficient (K1+K2; K) depending upon an extent to which a driver of the vehicle desires to accelerate the vehicle, wherein said compensating coefficient at least in part comprises a ratio of a calculated required intake air quantity (Qc) of the engine to an actual intake of air quantity (Qm) of the engine; and
   compensating means for compensating one of said shift pattern (Vu, Vd) and at least one of said actually detected values of the operating parameters (TA, V), depending upon said compensating coefficient, so that said shift control means is more likely to command said transmission to be shifted down.

24. A shift control apparatus according to claim 23, wherein said engine has a throttle valve, said shift control apparatus further comprising detecting means for detecting a running speed (V) of said vehicle, said operating parameters consisting of an opening (TA) of said throttle valve and said running speed of the vehicle.

25. A shift control apparatus according to claim 24, wherein said predetermined shift pattern consists of at least one shift boundary line each representing a relationship between said opening (TA) of said throttle valve and said running speed (V) of the vehicle.

26. A shift control apparatus according to claim 24, wherein said compensating means compensates a shifting value (Vu, Vd) of said running speed which corresponds to the opening (TA) of the throttle valve detected by said detecting means, said shift control means determining a shifting action of said transmission, by comparing the running speed (V) of the vehicle detected by said detecting means, with said shifting value (MVu, MVd) of the running speed as compensated by said compensating means.

27. A shift control apparatus according to claim 24, wherein said coefficient calculating means comprises first calculating means for calculating a first compensating value (K1), second calculating means for calculating a second compensating value (K2), and third calculating means for obtaining said compensating coefficient (K1+K2) by adding said first compensating value (K1) to said second compensating value (K2), said first compensating value representing the ratio of a calculated required intake air quantity (Qc) of said engine to an actual intake air quantity (Qm) of the engine, said second compensating value representing said extent to which the driver desires to accelerate the vehicle.

28. A shift control apparatus according to claim 27, wherein said second calculating means of said coefficient calculating means calculates said second compensating value (K2) on the basis of a change (ΔTA) in the opening (TA) of said throttle valve detected by said detecting means.

29. A shift control apparatus according to claim 27, wherein said detecting means further detects an amount of change (ΔTA) of said opening (TA) of the throttle valve per unit time, and said coefficient calculating means calculates said compensating coefficient (K) according to a predetermined relationship between said compensating coefficient (K) and said amount of change (ΔTA) of said opening (TA) of the throttle valve unit time, and on the basis of said amount of change (ΔTA) per unit time detected by said detecting means, said predetermined relationship being determined so that said compensating coefficient (K) is almost equal to 1.0 when said amount of change (ΔTA) per unit time is zero.

30. A shift control apparatus for an automatic transmission of a motor vehicle with an engine, having shift control means for automatically shifting the automatic transmission according to a predetermined shift pattern representing a relationship of operating parameters of the vehicle, and on the basis of actually detected values of the operating parameters, said shift control apparatus comprising:
coefficient calculating means for calculating a compensating coefficient (Kshift+KSFTA) which consists of at least a compensating value (KSFTA) which changes depending upon an extent to which a driver of the vehicle desires to accelerate the vehicle, said compensating value (KSFTA) being decremented by a predetermined decrement amount (α) after said extent has become smaller than a predetermined level, wherein said compensating coefficient further comprises a ratio of a calculated required intake air quantity (Qc) of the engine to an actual intake of air quantity (Qm) of the engine;
adjusting means for changing at least one of said compensating value (KSFTA) and said predetermined decrement amount (α), depending upon a running condition of the vehicle; and
compensating means for compensating one of said shift pattern (Vu, Vd) and at least one of said actually detected values of the operating parameters, depending upon said compensating coefficient (Kshift+KSFTA), so that said shift control means is more likely to command said transmission to be shifted down.

31. A shift control apparatus according to claim 30, wherein said engine has a throttle valve, said apparatus further comprising detecting means for detecting a speed (NE) of said engine, an opening (TA) of said throttle valve, and an intake air quantity (Qm) of said engine, said compensating coefficient consisting of a first compensating value (Kshift), and a second compensating value as said compensating value (KSFTA) which changes depending upon said extent, said coefficient calculating means calculating a required intake air quantity (Qc) of said engine from the detected speed (NE) of the engine and the detected opening (TA) of said throttle valve, said coefficient calculating means further calculating said first compensating value as said ratio (Kshift) by dividing said required intake air quantity by said detected intake air quantity.

32. A shift control apparatus according to claim 30, wherein said adjusting means comprises means for changing said predetermined decrement amount (α) depending upon a currently selected position of said transmission, such that said decrement amount decreases with an increase in a speed reduction ratio of the transmission placed in said currently selected position.

33. A shift control apparatus according to claim 30, wherein said adjusting means comprises means for changing said predetermined decrement amount (α) depending upon a running speed (V) of the vehicle, such that said decrement amount decreases with a decrease in said running speed of the vehicle.

34. A shift control apparatus according to claim 30, wherein said adjusting means comprises means for changing said predetermined decrement amount (α) depending upon whether or not the vehicle is in a decelerating state, such that said decrement amount is smaller when said vehicle is in said decelerating state than when said vehicle is not in said decelerating state.

35. A shift control apparatus according to claim 34, wherein said means for changing said predetermined decrement amount (α) comprises first determining means for determining whether or not said engine is in an idling state, said means for changing said predetermined decrement amount setting a smaller value as said decrement amount when said engine is in said idling state than when said engine is not in said idling state.

36. A shift control apparatus according to claim 35, wherein said means for changing said predetermined decrement amount (α) further comprises second determining means for determining whether or not said engine is in said idling state with a brake being applied to the vehicle, said means for changing said predetermined decrement amount setting a smaller value as said decrement amount when said engine is in said idling state with the brake being applied to the vehicle than when said engine is in said idling state without the brake being applied to the vehicle.

37. A shift control apparatus according to claim 30, wherein said adjusting means comprises means for changing said compensating value (KSFTA) depending upon said running condition of the vehicle.

38. A shift control apparatus according to claim 37, wherein said means for changing said compensating value (KSFTA) changes said compensating value depending upon a currently selected position of the transmission, such that said compensating value increases with an increase in a speed reduction ratio of said transmission placed in said currently selected position.

39. A shift control apparatus according to claim 37, wherein said means for changing said compensating value (KSFTA) comprises means for determining an adjusting value (β) depending upon the running condition of the vehicle, and calculating means for calculating said compensating value on the basis of said adjusting value (β).

40. A shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of said operating parameters, (b) detecting means for detecting a speed (NE) of said engine, an opening (TA) of said throttle valve and an intake air quantity (Qm) of said engine, (c) coefficient calculating means for calculating a required intake air quantity (Qc) of the engine from the detected speed of the engine and the detected opening of the throttle valve, and calculating a nominal compensating coefficient (K1) by dividing the calculated required intake air quantity by the detected intake air quantity, and (d) compensating means for compensating one of said shift pattern (MVu, MVd) and at least one of said actually detected values of the operating parameters (TA, V), depending upon said compensating coefficient, wherein the improvement comprises:

adjusting means for adjusting said nominal compensating coefficient (K1) to obtain an adjusted compensating coefficient (MK, K3) depending upon said detected intake air quantity (Qm) such that an amount of adjustment of said nominal compensating coefficient is smaller when said detected intake air quantity (Qm) is relatively small than when said detected intake air quantity is relatively large; and said compensating means operating according to said adjusted compensating coefficient (MK, K3).

41. A shift control apparatus according to claim 40, wherein said detecting means further detects a running speed (V) of said vehicle, and said operating parameters consist of said opening (TA) of said throttle valve and the running speed (V) of the vehicle.

42. A shift control apparatus according to claim 41, wherein said predetermined shift pattern consists of at least one shift boundary line each representing a relationship between said opening (TA) of the throttle valve and said running speed (V) of the vehicle.

43. A shift control apparatus according to claim 41, wherein said compensating means compensates a shifting value (Vu, Vd) of said running speed which corresponds to the opening (TA) of the throttle valve detected by said detecting means, said shift control means determining a shifting action of said automatic transmission, by comparing the running speed (V) of the vehicle detected by said detecting means, with said shifting value (MVu, MVd) of the running speed as compensated by said compensating means.

44. A shift control apparatus according to claim 40, said adjusting means comprises determining means for determining an adjusting coefficient (KH) such that said adjusting coefficient is smaller when said detected intake air quantity (Qm) is relatively small than when said detected intake air quantity is relatively large, said adjusting means further comprising calculating means for calculating said adjusted compensating coefficient (MK) depending upon said adjusting coefficient (KH).

45. A shift control apparatus according to claim 44, wherein said determining means determines said adjusting coefficient (KH) such that said adjusting coefficient is equal to 1.0 when said detected intake air quantity (Qm) is larger than a predetermined value, and such that said adjusting coefficient is smaller than 1.0 when said detected intake air quantity is between zero and said predetermined value.

46. A shift control apparatus according to claim 44, wherein said adjusting means further comprises means for obtaining a control center value (KG) by calculating a moving average (KGn) of successive values of said nominal compensating coefficient (K1) which have been calculated by said coefficient calculating means in a normal running condition of said vehicle, said calculating means of said adjusting means calculating said adjusted compensating coefficient (MK) according to an equation $MK=(K1-KG) \times KH+KG$.

47. A shift control apparatus according to claim 40, wherein said adjusting means comprises first calculating means for calculating a difference (Qa) between said required intake air quantity (Qc) and said detected intake air quantity (Qm), determining means for determining a compensating value (X) such that said compensating value changes with said difference (Qa), and calculating means for calculating said adjusted compensating coefficient (K3) depending upon said compensating value (X).

48. A shift control apparatus according to claim 47, wherein said calculating means of said adjusting means calculates said adjusted compensating coefficient (K3) according to an equation $K3=Qc/(Qm+X)$.

49. A shift control apparatus for an automatic transmission of a motor vehicle having an engine with a throttle valve, and an air conditioner, the apparatus including (a) shift control means for automatically shifting the automatic transmission according to a predetermined shift pattern representing a relationship of operating parameters of the vehicle, and on the basis of actually detected values of said operating parameters, (b) detecting means for detecting a speed (NE) of said engine, an opening (TA) of said throttle valve and an intake air quantity (Qm) of said engine, (c) coefficient calculating means for calculating a required intake air quantity (Qc) of the engine from the detected speed of the engine and the detected opening of the throttle valve, and calculating a compensating coefficient (K) by dividing the calculated required intake air quantity by the detected intake air quantity, and (d) compensating means for compensating one of said shift pattern (MVu, MVd) and at least one of said actually detected values of the operating parameters (TA, V), depending upon said compensating coefficient, wherein the improvement comprises:

judging means for determining whether or not said air conditioner is in operation;

adjusting means for adjusting said compensating coefficient (K) so that said shift control means is less likely to con, hand said automatic transmission to be shifted up, when said judging means determines that said air conditioner is in operation; and said compensating means operating according to said compensating coefficient (K) adjusted by said adjusting means.

50. A shift control apparatus according to claim 49, wherein said detecting means further detects a running speed (V) of said vehicle, and said operating parameters consist of said opening (TA) of said throttle valve and the running speed (V) of the vehicle.

51. A shift control apparatus according to claim 50, wherein said predetermined shift pattern consists of at least one shift boundary line each representing a relationship between said opening (TA) of the throttle valve and said running speed (V) of the vehicle.

52. A shift control apparatus according to claim 50, wherein said compensating means compensates a shifting value (Vu, Vd) of said running speed which corresponds to the opening (TA) of the throttle valve detected by said detecting means, said shift control means determining a shifting action of said automatic transmission, by comparing the running speed (V) of the vehicle detected by said detecting means, with said shifting value (MVu, MVd) of the running speed as compensated by said compensating means.

53. A shift control apparatus according to claim 49, said adjusting means comprises determining means for determining an adjusting value (Qa) on the basis of said detected intake air quantity (Qm), said adjusting means adjusting said compensating coefficient (K) depending upon said adjusting value.

54. A shift control apparatus according to claim 53, wherein said adjusting means subtracts said adjusting value (Qa) from said detected intake air quantity (Qm) before said coefficient calculating means calculates said compensating coefficient.

55. A shift control apparatus for an automatic transmission of a motor vehicle having an engine with a throttle valve, and an air conditioner, the apparatus including (a) shift control means for automatically shifting the automatic transmission according to a predetermined shift pattern representing a relationship of operating parameters of the vehicle, and on the basis of actually detected values of said operating parameters, (b) detecting means for detecting a speed (NE) of said engine, an opening (TA) of said throttle valve and an intake air quantity (Qm) of said engine, (c) coefficient calculating means for calculating a required intake air quantity (Qc) of the engine from the detected speed of the engine and the detected opening of the throttle valve, and calculating a compensating coefficient (K) by dividing the calculated required intake air quantity by the detected intake air quantity, and (d) compensating means for compensating one of said shift pattern (MVu, MVd) and at least one of said actually detected values of the operating parameters (TA, V), depending upon said compensating coefficient, wherein the improvement comprises:

judging means for determining whether or not said compensating coefficient (K) calculated by said coefficient calculating means is outside a predetermined range;

coefficient changing means for replacing said compensating coefficient by a reference value (KG) when said judging means determines that said compensating coefficient is outside said predetermined range; and said compensating means operating according to said reference value when said compensating coefficient is outside said predetermined range.

56. A shift control apparatus according to claim 55, wherein said detecting means further detects a running speed (V) of said vehicle, and said operating parameters consist of said opening (TA) of said throttle valve and the running speed (V) of the vehicle.

57. A shift control apparatus according to claim 56, wherein said predetermined shift pattern consists of at least one shift boundary line each representing a relationship between said opening (TA) of the throttle valve and said running speed (V) of the vehicle.

58. A shift control apparatus according to claim 56, wherein said compensating means compensates a shifting value (Vu, Vd) of said running speed which corresponds to the opening (TA) of the throttle valve detected by said detecting means, said shift control means determining a shifting action of said automatic transmission, by comparing the running speed (V) of the vehicle detected by said detecting means, with said shifting value (MVu, MVd) of the running speed as compensated by said compensating means.

59. A shift control apparatus according to claim 55, wherein said judging means comprises first determining means for determining whether or not said compensating coefficient (K) is smaller than a predetermined upper limit ($\alpha$), and a second determining means for determining whether or not said compensating coefficient is larger than a predetermined lower limit ($\beta$).

60. A shift control apparatus according to claim 59, wherein said judging means further comprises third determining means for determining whether said compensating coefficient (K) is outside said predetermined range for more than a predetermined time duration.

61. A shift control apparatus according to claim 60, wherein said third determining means comprises a counter which is incremented each time said first and second determining means determine that said compensating coefficient (K) is not smaller than said upper limit ($\alpha$) is not larger than said lower limit ($\beta$).

62. A shift control apparatus according to claim 55, wherein said coefficient changing means comprises determining means for determining an average value (KG) as said reference value by calculating a moving average (KGn) of successive values of said compensating coefficient (K) which have been calculated by said coefficient calculating means in a normal running condition of the vehicle.

63. A shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of said operating parameters, (b) detecting means for detecting a speed (NE) of said engine, an opening (TA) of said throttle valve and an intake air quantity (Qm) of said engine, and (c) calculating means for calculating a required intake air quantity (Qc) of said engine from the detected speed of the engine and the detected opening of the throttle valve, said apparatus comprising:

first determining means for determining a first compensating value (Kshift) on the basis of a ratio (Qc/Qm) of the calculated required intake air quantity (Qc) to the detected intake air quantity (Qm);

second determining means for determining a second compensating value (KSFTA) depending upon an extent to which a driver of the vehicle desires to accelerate the vehicle;

coefficient determining means for determining a compensating coefficient (KSFb) on the basis of said first and second compensating values (Kshift, KSFTA);

compensating means for compensating one of said shift pattern (Vu, Vd) and at least one of said actually detected values of the operating parameters (TA, V), depending upon said compensating coefficient (KSFb);

judging means for determining whether said compensating coefficient (KSFb) is larger than a predetermined upper limit ($\beta$) which is a permissible maximum value of said compensating coefficient for causing said shift control means to be likely to command said transmission to be shifted down; and coefficient changing means for replacing said compensating coefficient (KSFb) by said upper limit ($\beta$) when said judging means determines that said compensating coefficient is larger than the predetermined upper limit, said compensating means operating according to said upper limit when said compensating coefficient is larger than the predetermined upper limit.

64. A shift control apparatus according to claim 63, wherein said coefficient determining means determines said compensating coefficient (KSFb) by obtaining a sum of said first compensating value (Kshift) and said second compensating value (KSFTA), said apparatus further comprising means for setting said sum as an effective compensating coefficient (KSF) when said judging means determines that said sum is not larger than said predetermined upper limit.

65. A shift control apparatus according to claim 63, wherein said second determining means determines said second compensating value (KSFTA) on the basis of a change ($\Delta TA$) in the opening (TA) of said throttle valve detected by said detecting means.

66. A shift control apparatus according to claim 63, wherein said detecting means further detects a running speed (V) of said vehicle, and said operating parameters consist of said opening (TA) of said throttle valve and the running speed (V) of the vehicle.

67. A shift control apparatus according to claim 66, wherein said predetermined shift pattern consists of at least one shift boundary line each representing a relationship between said opening (TA) of the throttle valve and said running speed (V) of the vehicle.

68. A shift control apparatus according to claim 66, wherein said compensating means compensates a shifting value (Vu, Vd) of said running speed which corresponds to the opening (TA) of the throttle valve detected by said detecting means, said shift control means determining a shifting action of said automatic transmission, by comparing the running speed (V) of the vehicle detected by said detecting means, with said shifting value (MVu, MVd) of the running speed as compensated by said compensating means.

69. A shift control apparatus for an automatic transmission of a motor vehicle having an engine with a throttle valve, including (a) shift control means for automatically shifting the automatic transmission according to a predetermined shift pattern representing a relationship of operating parameters of the vehicle, and on the basis of actually detected values of said operating parameters, (b) detecting means for detecting a speed (NE) of said engine, an opening (TA) of said throttle valve and an intake air quantity (Qm, Qm') of said engine, (c) coefficient calculating means for calculated a required intake air quantity (QNTA) of said engine from the detected speed of the engine and the detected opening of the throttle valve, and calculating a compensating coefficient (Kshift) by dividing the calculated required intake air quantity by the detected intake air quantity, and (d) compensating means for compensating one of said shift pattern (Vu, Vd) and at least one of said actually detected values of the operating parameters (TA, V), depending upon said compensating coefficient, wherein the improvement comprises:

judging means for determining whether or not said engine is in a predetermined operating condition;

quantity change determining means, operable when said judging means determines that said engine is in said predetermined operating condition, for determining an amount of change ($\Delta QNIDL$) in said intake air quantity (Qm, Qm') detected by said detecting means, which amount of change occurs due to a chronological change of said engine from an initial state of the engine; and adjusting means for adjusting said compensating coefficient (Kshift) depending upon said amount of change ($\Delta QNIDL$) in said intake air quantity.

70. A shift control apparatus according to claim 69, wherein said judging means determines whether said engine is in a non-load idling condition as said predetermined operating condition.

71. A shift control apparatus according to claim 70, wherein said judging means comprises means for determining whether or not said opening (TA) of said throttle valve is substantially zero, and means for determining whether or not said speed (NE) of said engine is in a predetermined idling speed range.

72. A shift control apparatus according to claim 71, wherein said judging means comprises means for determining whether or not said engine is operating with said transmission placed in a neutral position.

73. A shift control apparatus according to claim 69, wherein said quantity change determining means for calculating as said amount of change ($\Delta QNIDL$) in said detected intake air quantity (Qm, Qm') a difference between said detected intake air quantity and a predetermined idling intake air quantity (KQNIDL) which is required for maintaining the engine in a predetermined idling condition irrespective of said chronological change of said engine.

74. A shift control apparatus according to claim 69, wherein said adjusting means comprises first determining means for determining an adjusting value (KGDLQN) on the basis of said amount of change ($\Delta QNIDL$) in said detected intake air quantity (Qm, Qm'), and second determining means for determining an adjusted required intake air quantity (Qc) on the basis of said adjusting value (KGDLQN) and said required intake air quantity (QNTA) calculated by said coefficient calculating means.

75. A shift control apparatus according to claim 74, wherein said coefficient calculating means calculates said compensating coefficient (Kshift) by dividing said adjusted required intake air quantity (Qc) determined by said second determining means of said adjusting means, by said intake air quantity (Qm, Qm') detected by said detecting means, whereby said compensating coefficient (Kshift) is adjusted depending upon said amount of change ($\Delta QNIDL$) in said detected intake air quantity (Qm, Qm') which is determined by said quantity change determining means.

* * * * *

UNITED STATES PATENT AND TRADEMARK OFFICE
CERTIFICATE OF CORRECTION

PATENT NO. : 5,341,295
DATED : August 23, 1994
INVENTOR(S) : Norihisa NAKAGAMA et al.

It is certified that error appears in the above-indentified patent and that said Letters Patent is hereby corrected as shown below:

On the title page, Item [54], the title, should read:

--SHIFT CONTROL APPARATUS FOR AN AUTOMATIC TRANSMISSION INCLUDING ADJUSTMENT OF COMPENSATING COEFFICIENT USED IN DETERMINING SHIFTING OF THE TRANSMISSION--

Signed and Sealed this

Thirteenth Day of February, 1996

*Attest:*

BRUCE LEHMAN

*Attesting Officer*   Commissioner of Patents and Trademarks